US012568891B2

(12) United States Patent
Prinster et al.

(10) Patent No.: US 12,568,891 B2
(45) Date of Patent: Mar. 10, 2026

(54) PLANT GROWING SYSTEM AND METHODS OF USING THE SAME

(71) Applicant: OMS Investments, Inc., Los Angeles, CA (US)

(72) Inventors: Mark Gerard Prinster, Marysville, OH (US); Bradley Alan Schultz, Powell, OH (US); Kimberly Ann Rygielski, Powell, OH (US); Matthew L. Phillips, Litchfield, CT (US); Robert H. Bruno, Avon, CT (US); Philip J. Nathan, Royal Oak, MI (US); Tara Marie Zasadzinski, Marysville, OH (US); Ashley E. Alexander, Dublin, OH (US); Sara Ann Gordon, Powell, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 17/509,398

(22) Filed: Oct. 25, 2021

(65) Prior Publication Data

US 2022/0110269 A1 Apr. 14, 2022

Related U.S. Application Data

(63) Continuation of application No. 16/832,866, filed on Mar. 27, 2020, now Pat. No. 11,154,015, which is a
(Continued)

(51) Int. Cl.
*A01G 9/02* (2018.01)
*A01G 9/029* (2018.01)

(52) U.S. Cl.
CPC ........... *A01G 9/021* (2013.01); *A01G 9/0291* (2018.02)

(58) Field of Classification Search
CPC ...... A01G 9/0297; A01G 9/0295; A01G 9/16; A01G 9/0291; A01G 27/06; A01G 7/045; A01G 9/1423
See application file for complete search history.

(56) References Cited

U.S. PATENT DOCUMENTS

| 1,880,136 A | 9/1932 | Hickok |
| 1,948,117 A | 2/1934 | Kadow |
| | (Continued) | |

FOREIGN PATENT DOCUMENTS

| CN | 101548637 A | 10/2009 |
| CN | 101810111 A | 8/2010 |
| | (Continued) | |

OTHER PUBLICATIONS

International Preliminary Report on Patentability for International Patent App. No. PCT/US2013/026511; dated Aug. 28. 2014.
(Continued)

*Primary Examiner* — Christopher D Hutchens
(74) *Attorney, Agent, or Firm* — FBT Gibbons LLP

(57) ABSTRACT

A system includes a base plate, a stand, an adjustable lighting fixture that overhangs the base plate and is attached to the stand, and a growing container that fits within the base plate. The growing container accommodates a plant growing system. The plant growing system includes a biodegradable outer shell, a rooting media, a fertilizer or nutrient, and a removable lid.

19 Claims, 62 Drawing Sheets

Related U.S. Application Data continuation of application No. 14/379,116, filed as application No. PCT/US2013/026511 on Feb. 15, 2013, now Pat. No. 10,602,673.

(60) Provisional application No. 61/715,088, filed on Oct. 17, 2012, provisional application No. 61/648,982, filed on May 18, 2012, provisional application No. 61/637,193, filed on Apr. 23, 2012, provisional application No. 61/600,565, filed on Feb. 17, 2012.

(56) References Cited

U.S. PATENT DOCUMENTS

| | | | | |
|---|---|---|---|---|
| 1,983,806 A | * | 12/1934 | Norman | A01G 9/1423 |
| | | | | 47/18 |
| 3,095,670 A | * | 7/1963 | Raab | A01C 1/02 |
| | | | | 47/79 |
| 3,106,801 A | * | 10/1963 | Risacher | A01G 9/16 |
| | | | | 219/385 |
| 3,223,518 A | | 12/1965 | Hansen | |
| 3,273,284 A | | 9/1966 | Anagnostou | |
| 3,386,608 A | * | 6/1968 | Diller | A01G 9/0295 |
| | | | | 47/87 |
| 3,576,613 A | | 4/1971 | Fleming | |
| 3,660,934 A | * | 5/1972 | Pollack | A01G 9/0295 |
| | | | | 229/120.07 |
| 3,932,319 A | | 1/1976 | Clendinning et al. | |
| 4,019,890 A | | 4/1977 | Fujita et al. | |
| 4,047,329 A | | 9/1977 | Holt | |
| 4,118,892 A | * | 10/1978 | Nakamura | A01G 9/033 |
| | | | | 47/33 |
| 4,170,844 A | * | 10/1979 | Steele | A01G 31/06 |
| | | | | 47/29.1 |
| 4,291,494 A | * | 9/1981 | Knablein | A01G 9/16 |
| | | | | 47/87 |
| 4,336,669 A | | 6/1982 | Gordon | |
| 4,420,903 A | | 12/1983 | Ritter et al. | |
| 4,549,897 A | | 10/1985 | Seng et al. | |
| 4,793,097 A | * | 12/1988 | Whitcomb | A01G 9/0297 |
| | | | | 211/74 |
| D323,415 S | * | 1/1992 | Iverson | D3/313 |
| 5,186,732 A | | 2/1993 | Thompson et al. | |
| 5,470,434 A | | 11/1995 | Terasawa et al. | |
| 6,038,813 A | | 3/2000 | Moore et al. | |
| 6,218,321 B1 | | 4/2001 | Lorcks et al. | |
| 6,581,329 B1 | | 6/2003 | Eriksson | |
| 2001/0047617 A1 | * | 12/2001 | Blossom | A01G 31/02 |
| | | | | 47/62 R |
| 2002/0134013 A1 | | 9/2002 | Obonai et al. | |
| 2003/0005865 A1 | | 1/2003 | Washburn | |
| 2003/0041516 A1 | | 3/2003 | Cook | |
| 2007/0271841 A1 | | 11/2007 | Bissonnette et al. | |
| 2008/0078118 A1 | | 4/2008 | Bissonnette et al. | |
| 2008/0155897 A1 | | 7/2008 | Van de Wetering et al. | |
| 2008/0202026 A1 | | 8/2008 | Bong Kyun | |
| 2009/0272033 A1 | | 11/2009 | Paleari | |
| 2011/0277381 A1 | | 11/2011 | Paternostre et al. | |
| 2016/0235017 A1 | | 8/2016 | Davis | |

FOREIGN PATENT DOCUMENTS

| | | | |
|---|---|---|---|
| DE | 29806806 U1 | 10/1999 |
| EP | 500155 A1 | 8/1992 |
| FR | 2707451 A1 | 1/1995 |
| GB | 2418587 A | 4/2006 |
| JP | 09023756 A | 1/1997 |
| JP | 10127181 A | 5/1998 |
| JP | 2000308401 A | 11/2000 |
| JP | 2000342016 A | 12/2000 |
| JP | 2005270087 A | 10/2005 |
| JP | 2012005427 A | 1/2012 |

OTHER PUBLICATIONS

International Search Report and Written Opinion for International Patent App. No. PCT/US2013/026511; dated Jun. 18. 2013.

* cited by examiner

<u>100</u>

100

100

100

100

115

114

100

100

100

106A

106A

106A

110

106A

106B

106B

108

106B

106B

106C

106C

106C

106D

106D

120A

100

100

120B

120C

120D

120E

120F

312

320

304

326

324

324

326

1900

2000

2100

2100

2100

2100

2100

2100

PLANT GROWING SYSTEM AND METHODS OF USING THE SAME

RELATED APPLICATIONS

The present application is a continuation of U.S. application Ser. No. 16/832,866, filed Mar. 27, 2020, now U.S. Pat. No. 11,154,015, issued Oct. 26, 2021, which is a continuation of U.S. application Ser. No. 14/379,166, filed Aug. 15, 2014, now U.S. Pat. No. 10,602,673, issued Mar. 31, 2020, which is a national phase application of International Patent Application No. PCT/US2013/026511, filed Feb. 15, 2016, which claims priority to and the benefit of the following provisional applications: (1) U.S. Provisional Application No. 61/600,565, filed Feb. 17, 2012, (2) U.S. Provisional Application No. 61/637,193, filed Apr. 23, 2012, (3) U.S. Provisional Application No. 61/648,982, filed May 18, 2012, and (4) U.S. Provisional Application No. 61/715,088, filed Oct. 17, 2012. The contents of each of these applications are incorporated by reference in their entirety.

The present application also claims priority to and the benefit of the following design applications: (1) U.S. application Ser. No. 29/418,920, filed Apr. 23, 2012, (2) U.S. application Ser. No. 29/422,347, filed May 18, 2012, (3) U.S. application Ser. No. 29/428,679, filed Aug. 2, 2012, and (4) U.S. application Ser. No. 29/434,848, filed Oct. 17, 2012. The contents of each of these design applications are incorporated by reference in their entirety.

The present application is related to U.S. application Ser. No. 29/413,720, filed Feb. 17, 2012, now U.S. Pat. No. D671,028, the contents of which are incorporated by reference in their entirety.

FIELD OF THE TECHNOLOGY

Exemplary embodiments relate to a seed planting system that incorporates an outer shell, a plant growing or rooting media, seed(s), fertilizer, and a lid, as well as methods of using this plant growing system. Exemplary embodiments also relate to an indoor growing unit having an integral water and light source. The indoor growing unit is configured for use with the seed planting system.

SUMMARY

Exemplary embodiments provide a seed pod, seed cone, planting cone, and/or a planting system that simplifies the seed planting process.

Exemplary embodiments provide a seed pod, seed cone, planting cone, and/or planting system that include all of the necessary components for growing a plant with minimal effort.

Exemplary embodiments include that when the seed pod, seed cone, planting cone, and/or planting system is planted and watered, there is no need for any additional nutrients, fertilizers, or plant treatments for the successful growth of the plant.

Exemplary embodiments provide that when the seed pod, seed cone, planting cone, and/or planting system is planted, there is no need to determine the appropriate depth for seed planting nor any need for determining the proper planting distance between each of the seed pods, seed cones, planting cones, and/or planting systems.

Another exemplary embodiment provides a seed pod, seed cone, planting cone and/or planting system that have an outer shell, a plant growing or rooting media, seeds, fertilizer and/or nutrients, and a lid.

Another exemplary embodiment provides an outer shell made of composted, molded, formed, and/or shapeable materials.

Yet another exemplary embodiment provides an outer shell that is molded into a form that provides maximum rigidity for penetration into a surface. Additionally, the outer shell should be of a sufficient size and circumference to sustain the early stages of plant growth.

Yet another exemplary embodiment provides an outer shell that incorporates a flange to aid in proper depth placement, thereby allowing the end user to position the seed pod, seed cone, planting cone and/or planting system at the proper and optimal growing depth.

Yet another exemplary embodiment provides plant growing or rooting media that is inserted into or within the outer shell.

Yet another exemplary embodiment provides plant growing media or rooting media that is molded or formed and shaped to fit integrally within the outer shell.

Yet another exemplary embodiment provides plant growing media or rooting media that has external ribs and gaps there between, such that the gaps form one or more channels between the inner wall of the outer shell and the plant growing media or rooting media. In one embodiment, the channels formed by the gaps are open and extend throughout the length of the inner wall of the outer shell such that water flows freely to the bottom of the seed pod, seed cone, planting cone, and/or planting system. In another exemplary embodiment, one or more of the gaps are closed such that one or more of the channels are formed below the upper surface of the rooting media (i.e. the channel does not extend throughout the length of the inner wall of the outer shell) such that the flow of water to the bottom of the seed pod, seed cone, planting cone, and/or planting system may be reduced. In another exemplary embodiment, the gaps form closed channels that open at the top and continue for only part of the length of the inner wall of the outer shell.

Yet another exemplary embodiment provides external ribs on the plant growing media or rooting media that allow the flow of water below the plant growing media or rooting media to access fertilizer located within and at the bottom of the outer shell. The external ribs also allow the water to accumulate at the bottom of the shell and ultimately wick back up to provide moisture to the seed, through absorption by the rooting media.

Yet another exemplary embodiment provides plant growing media or rooting media that has dibbles, recesses, concavities, or holes for positioning or housing of the seed(s). There may be one or more dibbles, recesses, concavities, or holes present in the plant growing media or rooting media. Once the seeds are placed within the formed dibbles, recesses, concavities or holes the seed may be covered or overlaid with a plug or lid to seal the seed within the media.

Yet another exemplary embodiment provides that the planting growing media or rooting media comprises slits for placement of the seeds. In another exemplary embodiment, the fertilizer may be admixed or integrated into the plant growing media or rooting media.

Exemplary embodiments provide within the bottom of the outer shell an amount of a fertilizer or nutrient to help sustain the growth and/or establishment of the seeds.

Yet another exemplary embodiment provides fertilizer or nutrient that is a controlled release nutrient. These nutrients may comprise nitrogen, phosphorus, potassium, secondary nutrients, and/or micronutrients.

Another exemplary embodiment is that the seed pod, seed cone, planting cone and/or planting system includes a lid that seals the contents within the outer shell.

Yet another exemplary embodiment provides a lid that is made of a biodegradable material. The lid may be configured to fit onto the outer shell, fit into the outer shell, or may be adhered onto the outer shell.

An additional exemplary embodiment is a seed pod, seed cone, planting cone and/or planting system that includes seed(s) of plant(s). These plants may include vegetables, flowers, fruits, herbs, grass, trees, or perennial plant parts (e.g., bulbs, roots, crown, stem, tubers, etc.).

Yet another exemplary embodiment provides a seed pod, seed cone, planting cone and/or planting system that can be configured as individual units or assembled into a conglomeration of different units comprising the same or different seed pod, seed cone, planting cone and/or planting system. This assembly may be packaged into a tray.

Yet another exemplary embodiment provides a seed pod, seed cone, planting cone and/or planting system that may be used in a method of planting a seed.

Another exemplary embodiment includes a method of growing plants using the seed pod, seed cone, planting cone and/or planting system.

Yet another exemplary embodiment is a seed pod, seed cone, planting cone, and/or planting system that is integrated, adapted, and/or packaged together with an indoor growing unit, such that the indoor growing unit readily accommodates the seed pod, seed cone, planting cone, and/or planting system to provide sufficient light and a water source for the establishment of a plant. The indoor growing unit is configured to include an adjustable light source as well as an integral water supply. The seed pod, seed cone, planting cone, and/or planting system may be placed into holders included with the indoor growing unit to facilitate the growth of the seed(s).

Exemplary embodiments include a plant growing system having a biodegradable outer shell, a rooting media, a fertilizer or nutrient, seeds, and a removable lid. The outer shell is formed from a molded material, a formed material, a composted material, a shaped material, or combinations thereof; and the rooting media includes soil, coir, vermiculite, compost, perlite, bark fines, peat, wood shavings, mulch, or combinations thereof.

Another exemplary embodiment is a system that includes a base plate, an adjustable lighting fixture that overhangs the base plate, one or more growing containers that fit within the base, and a water reservoir that automatically dispenses water to the one or more growing containers via the base plate. Additionally the system may include one or more pod trays for use with the growing containers.

Another exemplary embodiment includes a method of using the indoor growing unit. Seed pods or seeds are planted in the indoor growing unit. The seed pods are placed in a pod tray in a growing container. Seeds are planted directly into a growing container into an appropriate growing media contained in the growing container. The seed pods or seeds germinate with the unit providing light and water. Plants started in the unit can be either transplanted outdoors, or can be grown directly to harvest. Alternatively, the stand and lighting fixture may be removed and the base plate, water reservoir, and growing containers may be transported outside for continued growing.

Yet another exemplary embodiment is a system that includes a base plate, an adjustable lighting fixture that overhangs the base plate, one or more growing containers that fit within the base, and a water reservoir that automatically dispenses water to the one or more growing containers via the base plate. Additionally the system may include one or more pod trays for use with the growing containers. The system may also include one or more capillary mats located in the bottom of the growing containers to facilitate the wicking or transport of water from the base plate to one or more seed pods located in a pod tray that is seated in the growing container. The capillary mat may be held in place with a securing mechanism that mates with the growing container. An optional bridge piece may be used as an interface between the capillary mat and the pod tray to further facilitate transport of the water to the seed pod in the pod tray.

Exemplary embodiments include a plant system having a biodegradable outer shell, a rooting media, a fertilizer or nutrient, seeds, and a removable lid, with the outer shell comprising a molded material, a formed material, a composted material, a shaped material, or combinations thereof; and the rooting media including soil, coir, vermiculite, compost, perlite, bark fines, peat, wood shavings, mulch, or combinations thereof.

Another exemplary embodiment includes a system, having a base plate; a stand; an adjustable lighting fixture that overhangs the base plate and is attached to the stand; one or more growing containers that fit within the base plate.

Another exemplary embodiment includes a method of planting a seed that includes pushing the planting system into a planting surface, and watering said plant growing system, where the planting system is pushed into a prepared surface, into a surface adapted for receiving the planting system, or into an unprepared surface.

Yet another exemplary embodiment includes a method of growing a garden that includes planting the plant growing system and watering said plant growing system.

These and other embodiments and advantages of the preferred embodiments, not specifically mentioned above, will be apparent to those of ordinary skill in the art having the present drawings, specifications, and claims. It is intended that all such additional embodiments and advantages be included within this description, be within the scope of the disclosure and be protected by the preferred embodiments.

DETAILED DESCRIPTION

Figure 1:
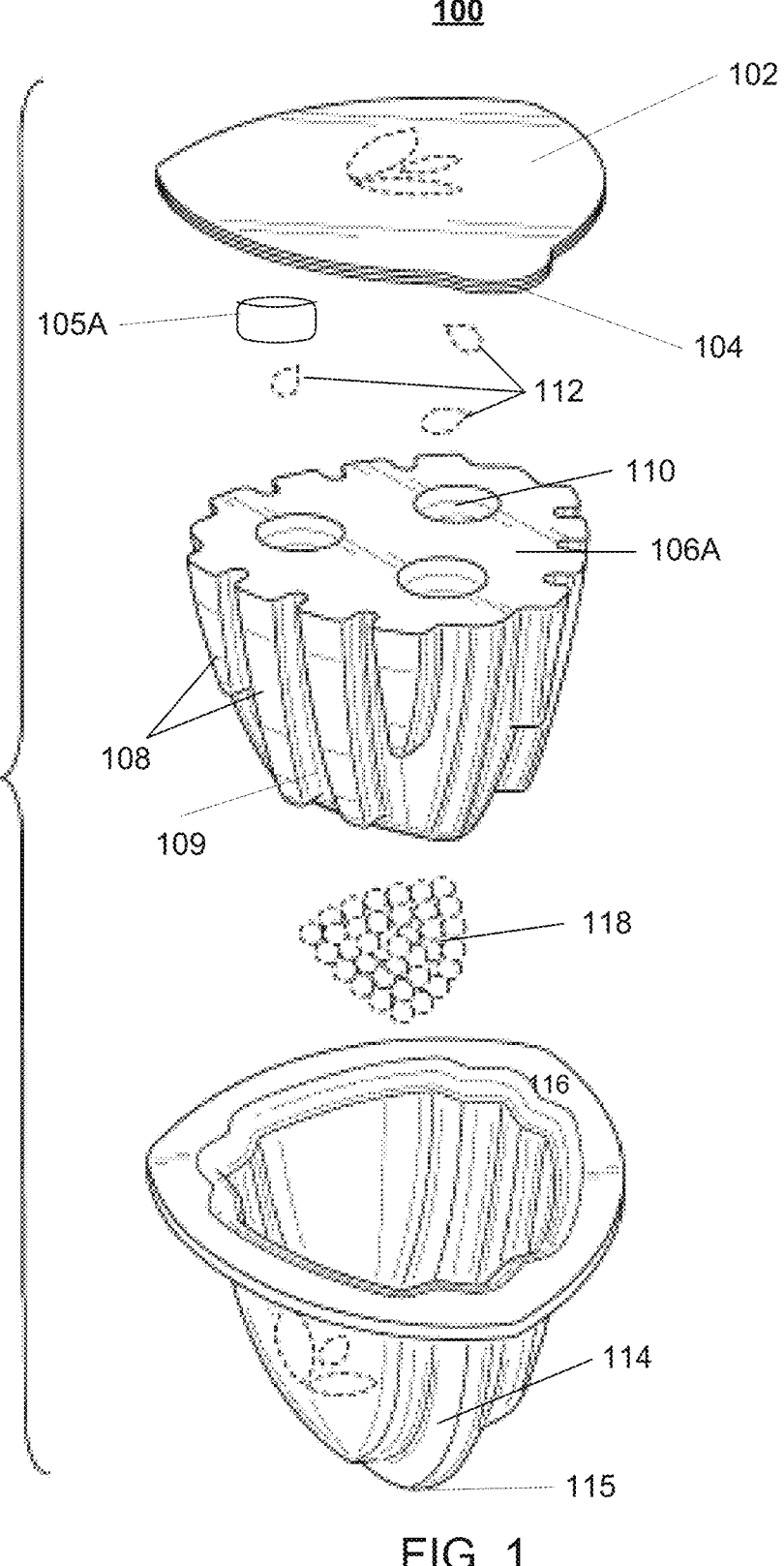
FIG. 1 depicts an exploded view of the components of a planting system according to exemplary embodiments.

It will be readily understood by those persons skilled in the art that the preferred embodiments described herein are capable of broad utility and application. Accordingly, while exemplary embodiments described herein in detail in relation to the exemplary embodiments, it is to be understood that this disclosure is illustrative and exemplary of embodiments, and is made to provide an enabling disclosure of the exemplary embodiments. The disclosure is not intended to be construed to limit the embodiments or otherwise to exclude any other such embodiments, adaptations, variations, modifications and equivalent arrangements.

The figures depict various functionalities and features associated with exemplary embodiments. While a single illustrative feature, device, or component is shown, these illustrative features, devices, or components may be multiplied for various applications or different application environments. In addition, the features, devices, or components may be further combined into a consolidated unit or divided into sub-units. Further, while a particular structure or type of feature, device, or component is shown, this structure is meant to be exemplary and non-limiting, as other structure may be able to be substituted to perform the functions described.

It has been found in accordance exemplary embodiments that the seed pod, seed cone, planting cone and/or planting system provides for an easy, productive, and efficient means for growing plants. When inserted into a surface, the seed pod, seed cone, planting cone and/or planting system is able to produce plants without the difficulty, confusion, and inconvenience of planting individual seeds into the planting surface.

Exemplary embodiments simplify and remove the general difficulties experienced by novice and seasoned gardeners. These difficulties might include the depth of seed placement, the distance between seeds, the type of fertilizer or nutrient required for proper plant growth, the amount of nutrient need for plant growth, the amount of water needed for plant growth, and the general trial and error associated with gardening. The seed pod, seed cone, planting cone and/or planting system removes the guess work out of gardening and only requires inserting the seed pod, seed cone, planting cone and/or planting system into a surface and watering.

A. Definitions

"Seed pod," "seed cone," "planting cone," and "planting system" (hereafter collectively referred to as "seed pod") refer to an assembly or system according to exemplary embodiments that includes an outer shell, plant growing or rooting media housed within the outer shell, seed(s) of plant(s), fertilizer or nutrients, and a lid. The seed pod may be a plant growing system. An exemplary representation of a seed pod according to exemplary embodiments is depicted, for example, in FIGS. 1-11 and 16-17.

"Outer shell" refers to an outer layer which has an apex at the bottom and an opening at the top to allow insertion of the plant growing media or rooting media. An exemplary representation of an outer shell can be seen, for example, in FIGS. 1 and 2, for example.

"Triangular acorn shape" is the shape assumed by the seed pod, seed cone, planting cone and/or planting system and as referenced in FIGS. 1-10, for example.

"Plant growing media," "rooting media," or "inner plug," (hereafter collectively referred to as "rooting media") refer to a media in which a seed(s) is placed and allowed to germinate into a plant and is housed within the outer shell. An exemplary representation of an inner plug can be seen in FIGS. 12-15 and 18-26, for example.

"Dibbles," "recesses," "concavities," or "holes" (hereafter collectively referred to as "dibbles") refer to a depression of shallow to medium depth formed in a surface. An exemplary representation of a dibble can be seen, for example, on the tops of the rooting media, in FIGS. 1, 2, 12, 18, and 26, for example.

"Indoor growing unit," "indoor planting unit," and the like refer to a unit and/or system configured to be used indoors to germinate and/or grow plants. The unit is designed to be modular, self-contained, and house or provide the necessary growing conditions for plants (e.g., light, water, fertilizer, soil, etc.), such as through the use of a seed pod or planting system as defined above. The use of a seed pod is not required however, as seeds may be planted directly into growing media contained within the indoor growing unit. An exemplary embodiments of the indoor growing unit can be seen, for example, in FIGS. 33, 42, 43, 44, 46, 50, and 59.

FIGS. 1-11 depict a seed pod 100 according to exemplary embodiments. The seed pod 100 may have a lid 102, rooting media 106, and an outer shell 114. The lid 102 may be made of one or more layers 104, such as 104A and 104B. The lid 102 seals the contents of the seed pod 100 within the outer shell 114. The lid 102 may be made of a biodegradable material and is configured to fit onto the outer shell 114, fit into the outer shell 114, or be adhered onto a flange 116 of the outer shell 114. The top of the lid layers 104 may be constructed such that the top layer 104A may be peeled back to reveal a second layer 104B. The second layer 104B may have printed instructions thereon or other information relating to the seed pod 100 and its use. The use of multiple layers according to exemplary embodiments allows for a consumer to review information relating to seed pod 100 while enabling the seed pod 100 to remain sealed. According to exemplary embodiments, the seed pod 100 may be 94% biodegradable.

The outer shell 114 provides a protective housing unit for the rooting media 106, the seed(s) 112, and fertilizer 118 and/or nutrient 118 from the external environment surrounding the seed pod 100.

The rooting media 106 has one or more dibbles 110 and external ribs 108. In between each of the external ribs 108 is a gap 109. The rooting media 106 may be formed or shaped into a cone, spike, acorn, triangular acorn, or flower pot. Exemplary embodiments of the rooting media 106A, 106B, 106C, and 106D can be found in FIGS. 12-15, 18-26, respectively.

B. Outer Shell

The outer shell 114 of the seed pod 100 provides a protective housing unit for the rooting media 106, the seed or seeds 112, and fertilizer 118 and/or nutrient 118 from the external environment surrounding the seed pod 100. During the early stages of plant growth, the seed pod 100 creates a microenvironment with sufficient nutrients to allow for the successful germination of the plant. Additionally, the outer shell 114 is configured in such a manner that it provides a mechanism or platform for inserting the seed(s) 112 into the planting surface. However, after the initial germination process, the outer shell 114 should be capable of allowing the growing plant to take root in the surrounding external environment. Thus, the outer shell 114 may be sufficiently rigid for initial insertion and protection of the young seed 112 and also permeable enough to allow the growing plant to take root in the surrounding environment.

As described above, the outer shell 114 should be sufficiently rigid and also biodegradable to allow for root penetration. The materials that are suitable for accomplishing this object may include formed, moldable, composted, and/or shapeable materials. Such materials may include manure, peat moss, brown sugarcane fibers, coir, corn stover, sunflower stem, white sugarcane fibers or combinations thereof. In one embodiment, the outer shell 114 is composed of a formed, molded, and/or composted material. This might include composted and molded or formed peat moss. In another embodiment, the outer shell 114 is composed of formed or molded manure. Manure can be derived from any animal source, but in one embodiment, the manure is derived from a cow, bull, or horse, preferably a cow. In another embodiment, the outer shell 114 is composed of material derived from poultry feathers. It should be appreciated that the materials used in the fabrication of the outer shell 114 can also be derived from organic and/or natural sources. As such, plants or vegetables that germinate from the seed pod 100 may be classified and rated as organic.

The outer shell 114 of the seed pod 100 is designed to be inserted into a surface. For example, the surface may be soil. Typically, gardeners desire to pre-dig a hole in the planting surface to accommodate a plant or seed 112. The outer shell 114 eliminates the need, in some instances, for pre-digging a hole to receive the seed pod 100. This is accomplished by forming the outer shell 114 into a specific shape that optimizes penetration into a surface, such as, but not limited to, dirt, soil, container, raised bed, clay, rocks, gravel, sand, or a tray specifically adapted to receive the seed pod 100. As such, various shapes of the outer shell 114 may be used to meet this function.

In one embodiment, the outer shell 114 is shaped like a cone, an acorn, or a combination thereof. It has been found that when the outer shell 114 is shaped as a cone, it provides the best penetration of the seed pod 100 into the planting surface. It has also been found that when the outer shell 114 of the seed pod 100 is shaped as an acorn, it provides the best surface area for germinating the seed. Accordingly, exemplary embodiments seek to combine the benefits of both the cone shape and the acorn shaped. Thus, in an embodiment, the seed pod 100 is shaped as a triangular acorn shape.

The overall thickness of the outer shell 114 plays an important role in the establishment and/or growth of the seed 112 in the seed pod 100. To optimize the protective environment of the outer shell 114, while also allowing penetration of the roots from a growing plant, the outer shell 114 may have a particular thickness that withstands insertion into the planting surface and allows for root penetration. In an embodiment, the thickness of the outer shell 114 is conserved throughout the entire outer shell 114. This thickness may be in the range of about 0.025 to 0.25 inches, more preferably in the range of about 0.05 to about 0.15 inches, and even more preferably in the range of about 0.09 to about 0.13 inches. In another embodiment, the thickness of the outer shell 114 may also be in the range of about 0.08 to about 0.11 inches. In yet another embodiment, the thickness of the outer shell 114 is 0.11 inches.

Because soil or dirt may differ from region to region, insertion of the seed pod 100 into the planting surface may cause the outer shell 114 to collapse or crack upon insertion. Accordingly, the tip or apex 115 of the outer shell 114 may be reinforced. One type of reinforcement is to provide a thicker apex or tip 115 such that when the tip 115 of the outer shell 114 is inserted into the planting surface, it is more rigid than the remainder of the outer shell 114 and is capable of withstanding a greater impact force. Thus, in one embodiment, the tip 115 of the outer shell 114 is fabricated or molded by thickening only the tip portion and graduating the sides of the outer shell 114 with less thickness, such that it preserves the ability of the plant to extend its roots. Alternatively, the tip 115 may be reinforced with a thickening agent or solidifying agent, such that it is sufficiently rigid when dry, but biodegradable after sufficient hydration or moisture.

The seed pod 100 can be virtually any circumference. It should be appreciated that the potential size of the plant generated from the seed 112 as well as the nutritional requirements of the seed may dictate the overall circumferential size of the seed pod 100. Thus, some of the factors that may dictate the circumference of the seed pod 100 may include, for example, the amount of fertilizer 118 or nutrient 118 supply provided in the seed pod 100, the types of seeds 112 planted, or the types of plant that germinates from the seed pod 100. The foregoing list of factors is not intended to be an exhaustive list of factors, but a representation of some of the factors that may dictate the circumferential size of the outer shell 114.

Proper depth placement also plays an important role in the successful germination of a seed. To aid in this process, the seed pod 100 integrates a seed depth indicator into the outer shell 114. In one embodiment, the seed depth indicator is the flange 116 that is located at the top of the seed pod 100. The flange 116 forms a lip that guides the user to insert the seed pod 100 to the proper seed 112 depth. By inserting the pod 100 until the flange 116 is level with the surrounding soil or dirt, it will indicate to the user that the seed 112 has been properly positioned for optimal seed germination and growth. Thus, in one embodiment, the flange 116 extends along the top of the entire periphery of the outer shell 114. The flange 116 may also serve as an area or surface onto which the lid 102 is fastened, secured, or adhered.

C. Rooting Media

FIGS. 12-15 and 18-26 depict exemplary embodiments of rooting media 106. Located and housed within the outer shell 114 is the rooting media 106 which provides a substrate in which the seed will grow. The rooting media 106 may be made of a variety of materials. These might include, for example, coir (compressed, non-compressed, screened, coir dust, and/or coir pith), peat, peat moss (for example, sphagnum peat moss), peat humus, vermiculite, compost perlite, bark, bark fines, composted bark fines, wood shavings, saw dust, mulch, a modified cornstarch, corn stover, sunflower stem, composted rice hulls, reed sedge peat, composted manure, composted forest products, coffee grounds, composted paper fiber, digested manure fiber, composted tea leaves, bagasse, yard waste compost, cotton derivatives, wood ash, bark ash, vegetative by-products, agricultural by-products, or combinations thereof. In other embodiments, the rooting media may include fertilizers or fertilizing agents. These materials may also be formed and/or molded into a solid form. In an embodiment, the rooting media 106 is molded into a cone, acorn, triangular acorn, flower pot, or spike form. In another embodiment, the rooting media 106 is the Q-PLUG® or EXCEL-PLUG® manufactured and sold by International Horticultural Technologies, Inc. Hollister, CA 95024. In another embodiment, the Q-PLUG® or EXCEL-PLUG® is molded and shaped into a cone, acorn, triangular acorn, flower pot, or spike shape. In another embodiment, the molded and/or formed rooting media 106 is adapted to fully or partially fill the interior space defined by the outer shell 114. Thus, in one embodiment, the rooting media 106 may be formed or shaped into a truncated cone, spike, acorn, triangular acorn, or flower pot such that it leaves a void at the bottom interior space of the outer shell 114. Similar to the outer shell 114, the components of the rooting media 106 may be derived from natural or organic sources. As such, plants or vegetables that are produced from the seed pods 100 may be classified and rated as organic.

Exemplary embodiments include a rooting media 106 in which the molded or formed shape provides a means to control and retain water for an extended period of time. The rooting media 106 has been shaped and configured to comprise external ribs that create pockets or channels between the inner wall of the outer shell 114 and the rooting media 106. In one embodiment, the external ribs 108 are adapted to frictionally engage the interior wall of the outer shell 114 such that it holds the rooting media 106 in place, and/or permits the migration of water into a lower interior chamber, which is created by a truncated rooting media 106. In another embodiment, the external ribs 108 form open channels or gaps 109 that allow the flow of water to the bottom of the seed pod 100. In yet another embodiment, external ribs 108 form closed channels that reduce the flow of water to the bottom of the seed pod 100. In yet another embodiment, the external ribs 108 form closed channels that open at the top and continue for only part of the length of the inner wall of the outer shell 114.

Without being bound by any particular theory, the channels created by the external ribs 108 allow the flow of water to rooting media 106 as well as the outer shell 114. This provides an accelerated hydration of the entire seed pod 100 that allows for enhanced or rapid germination of a seed 112. In one embodiment, the shaped and molded rooting media 106 comprises between 1, 2, 3, 4, 5, 6, 7, 8, 9, 10, 11, 12, 13, 14, 15, and 16 external ribs 108 or gaps 109. In another embodiment, the shaped and molded rooting media 106 may comprise 4 external ribs 108 or gaps 109.

The external ribs 108 and gaps 109 may also provide other functions. First, the external ribs 108 may act as friction points with the outer shell 114 to prevent the rooting media 106 from falling out when it is dry. Second, the gaps 109 may provide water channels and water retention within the channels during the watering and growing phases of the seed. When users water the seed pod 100, water will travel through the channels and fill the fertilizer area that is located beneath the rooting media 106 in the apex 115 of the seed pod 100. As water accumulates, the water will travel back through the channels and may accumulate in these channels until it is further absorbed by either the seed, rooting media 106, or fertilizer 118, or diffuses out of the seed pod 100. Third, it serves a functional role by preventing buoyancy of the rooting media 106 from lifting out of the outer shell 114. The gaps 109 act as air release valves which allow pressure within the fertilizer chamber to be released.

In another embodiment, the rooting media 106 may be recessed from the top flange 116 of the outer shell 114 to provide a water holding reservoir. While not being bound by any particular theory, as a user waters the seed pod 100, the recessed area may hold additional quantities of water that will funnel through the channels created by the external ribs 108 molded into the rooting media. This reservoir provides extended hydration to the seeds 112 within the seed pod 100. In another embodiment, the rooting media 106 may comprise a water absorbent polymer to aid in the retention of water over a duration of time.

Figure 22:
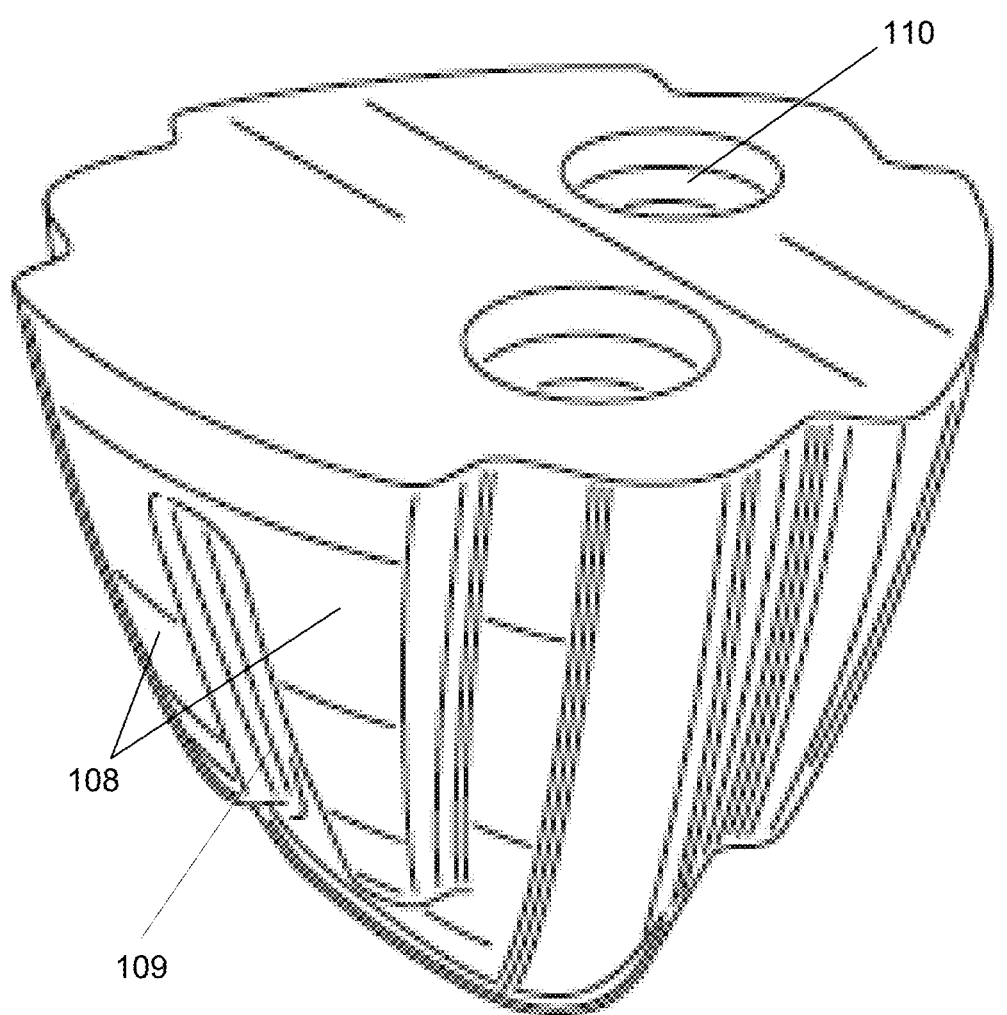
FIG. 22 depicts a perspective view of a third embodiment of the internal plug removed from the planting system.
Figure 23:
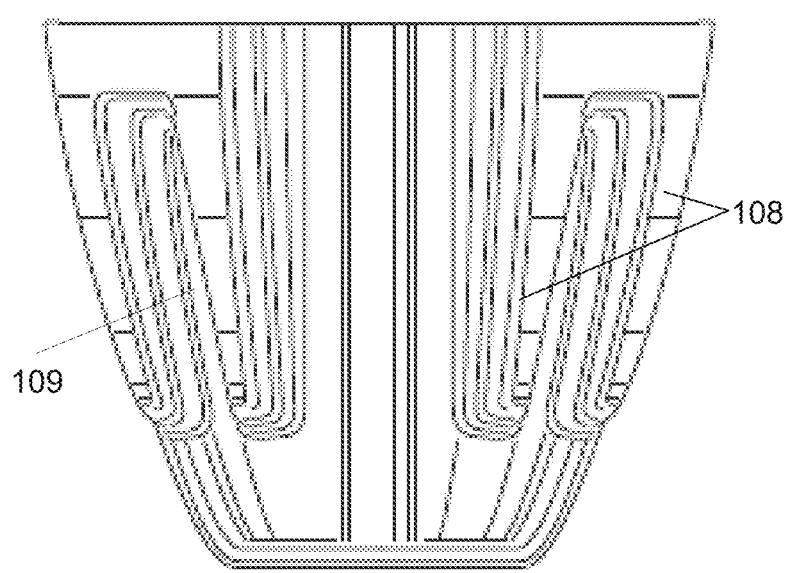
FIG. 23 is a rear elevational view thereof.
Figure 24:
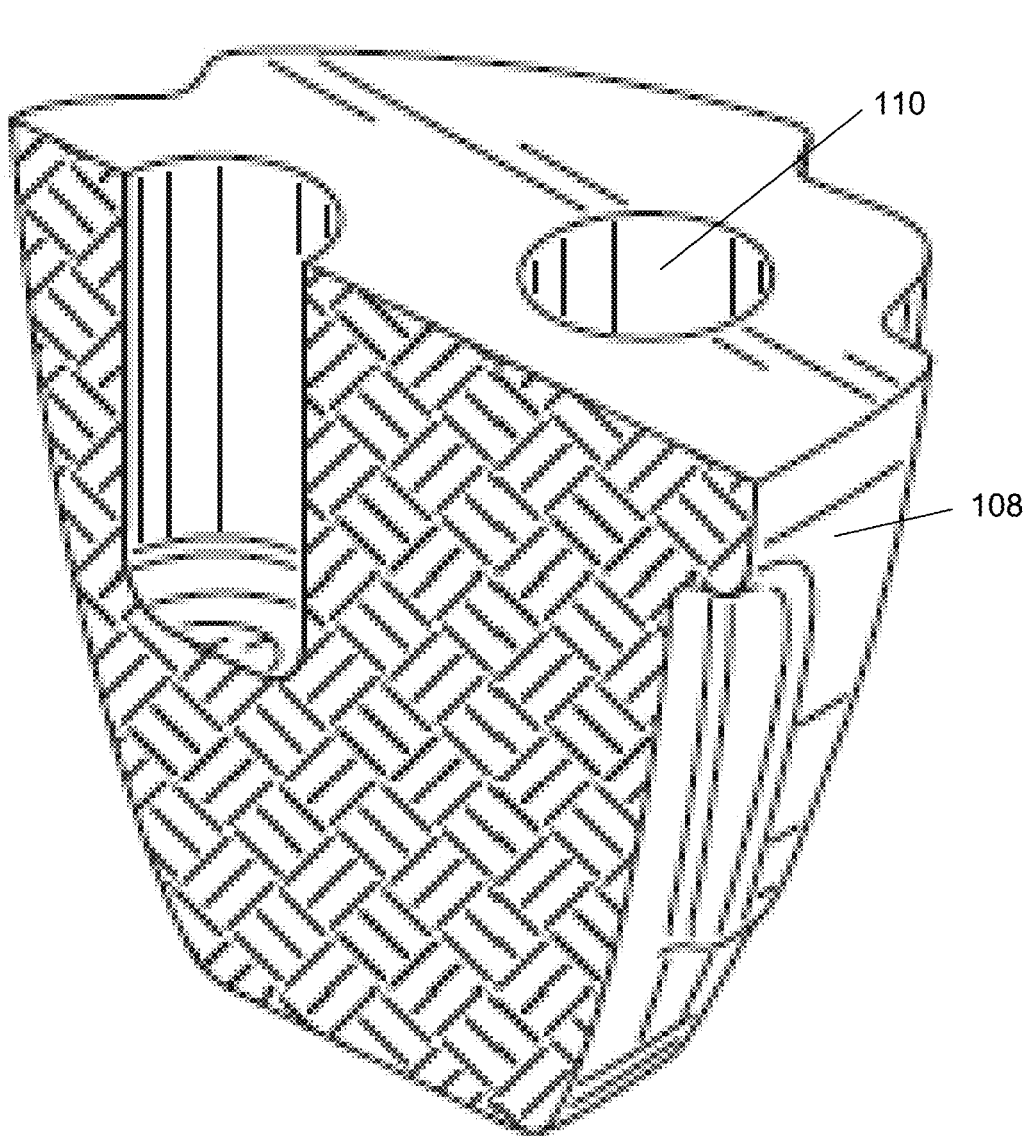
FIG. 24 depicts a cut-away view thereof.
Figure 25:
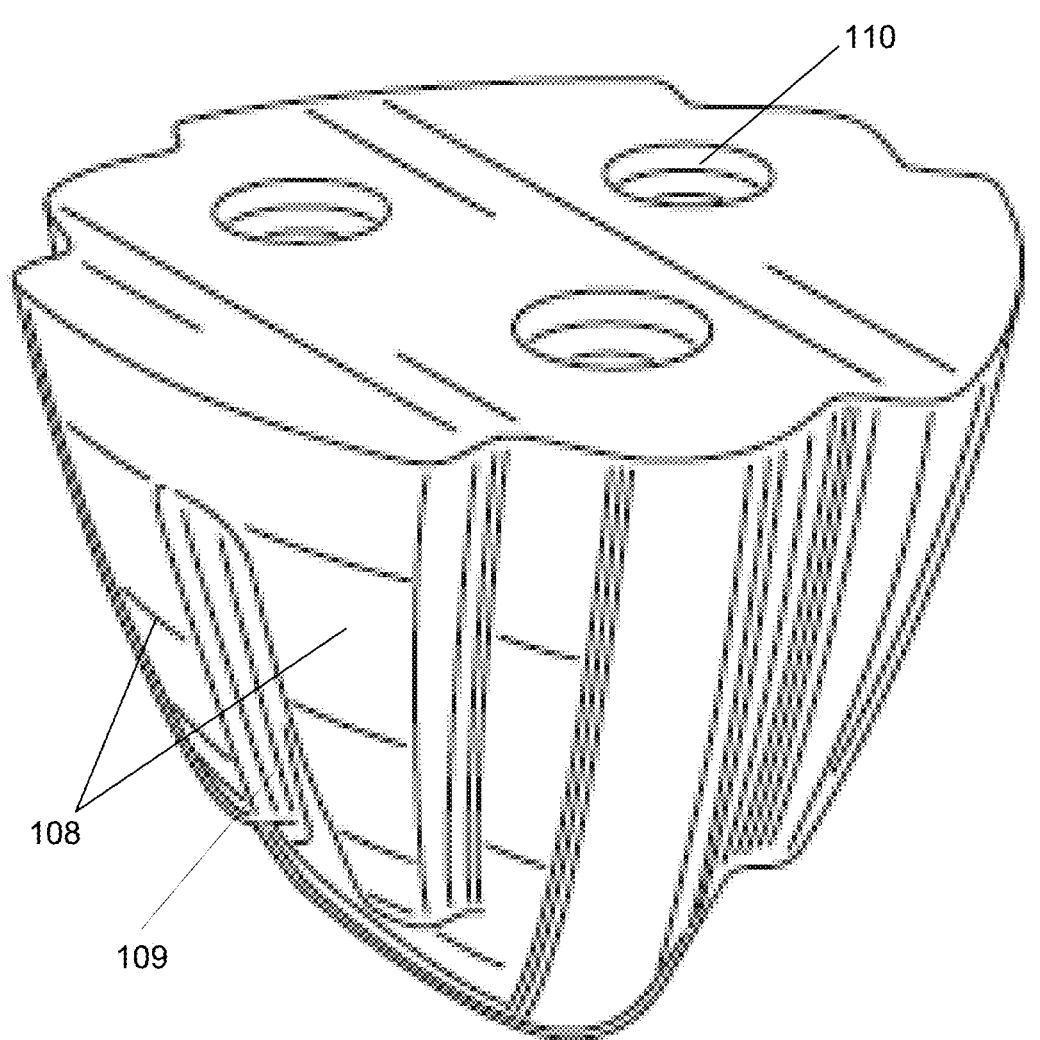
FIG. 25 depicts a perspective view of fourth embodiment of the internal plug removed from the planting system.
Figure 26:
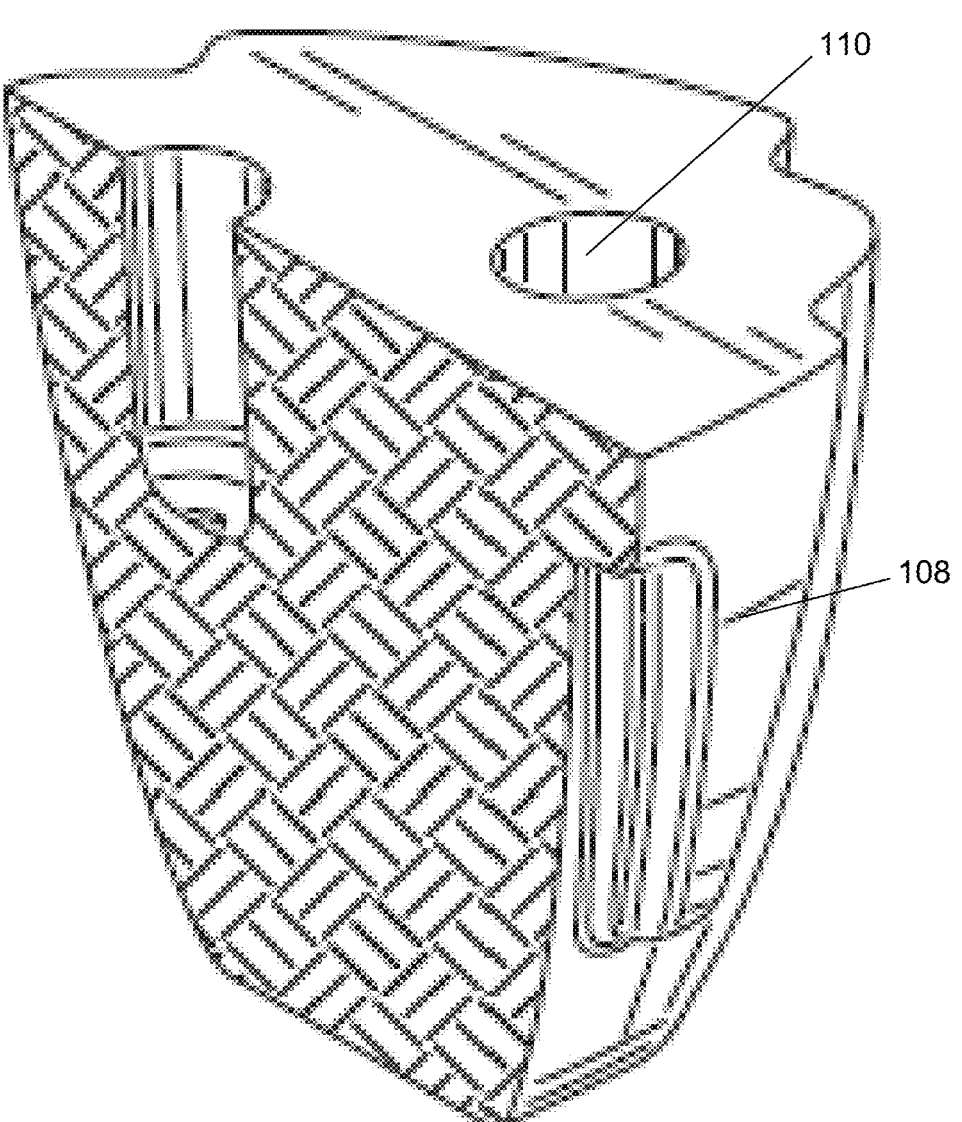
FIG. 26 depicts a cut-away view thereof.
Figure 27:
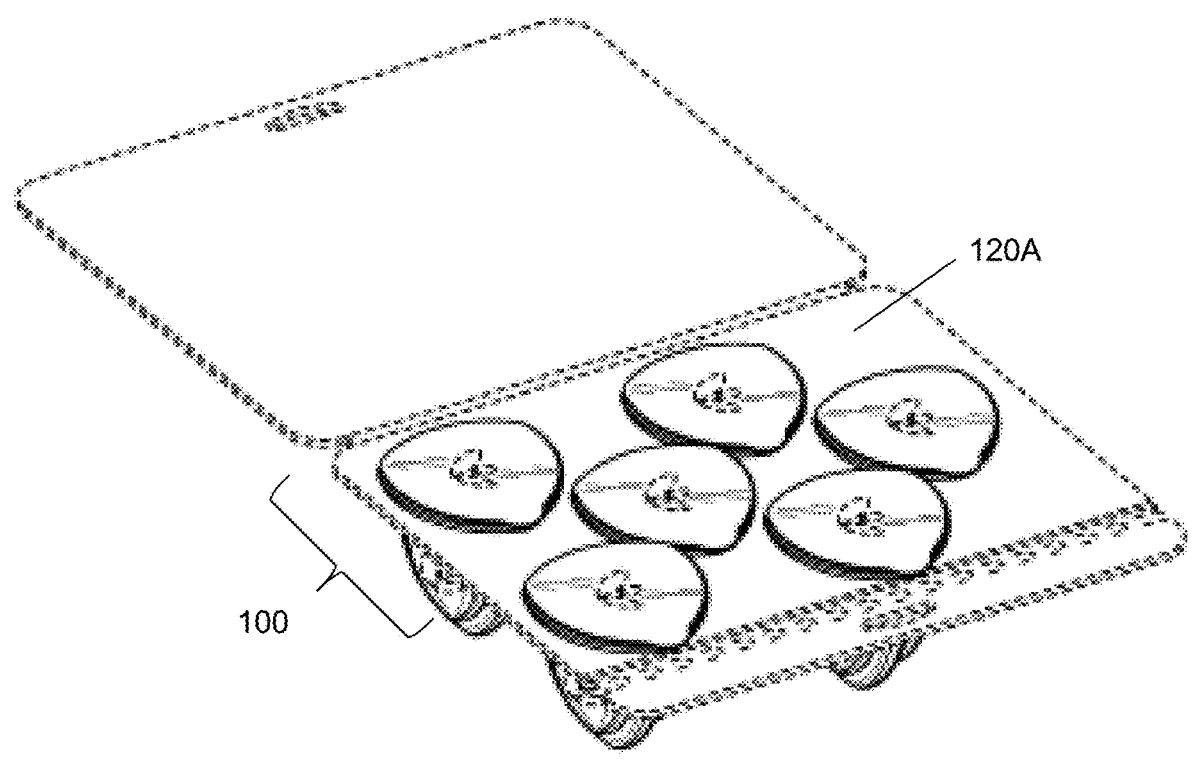
FIG. 27 depicts a perspective view of the planting system in a carrying tray according to exemplary embodiments.
Figure 28:
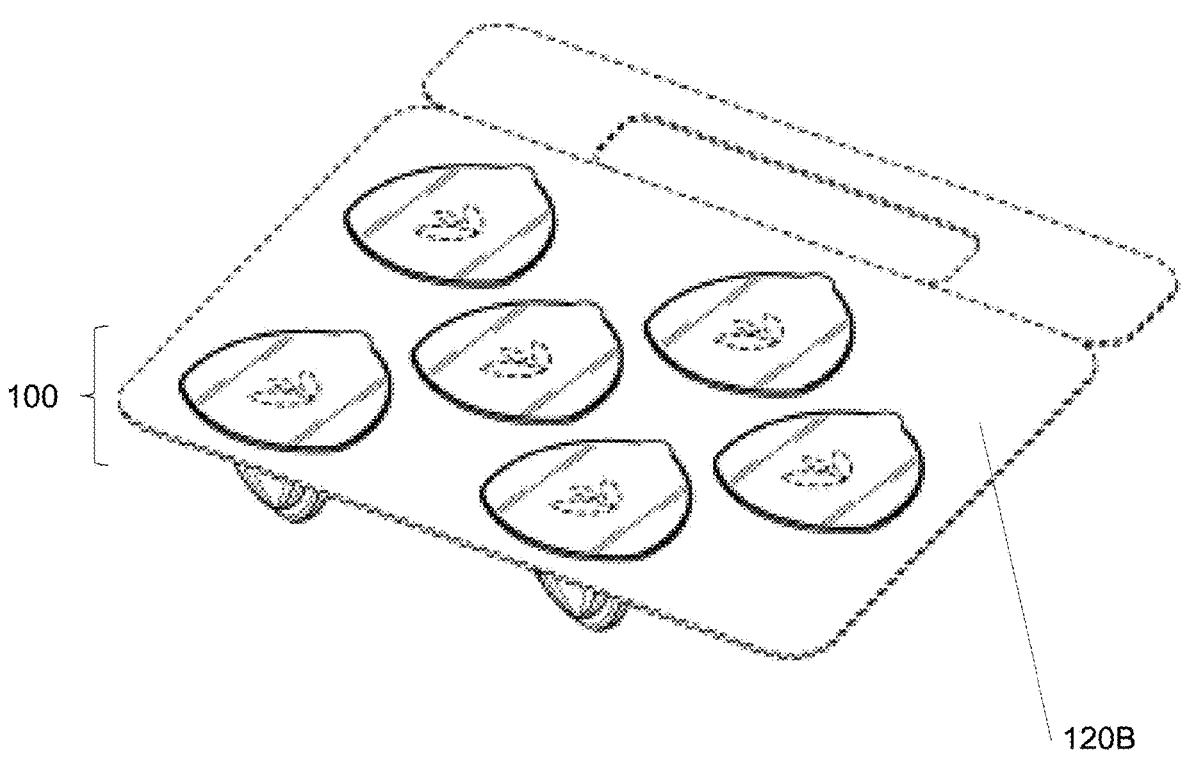
FIG. 28 depicts a perspective view of the planting system in a second carrying tray according to exemplary embodiments.
Figure 29:
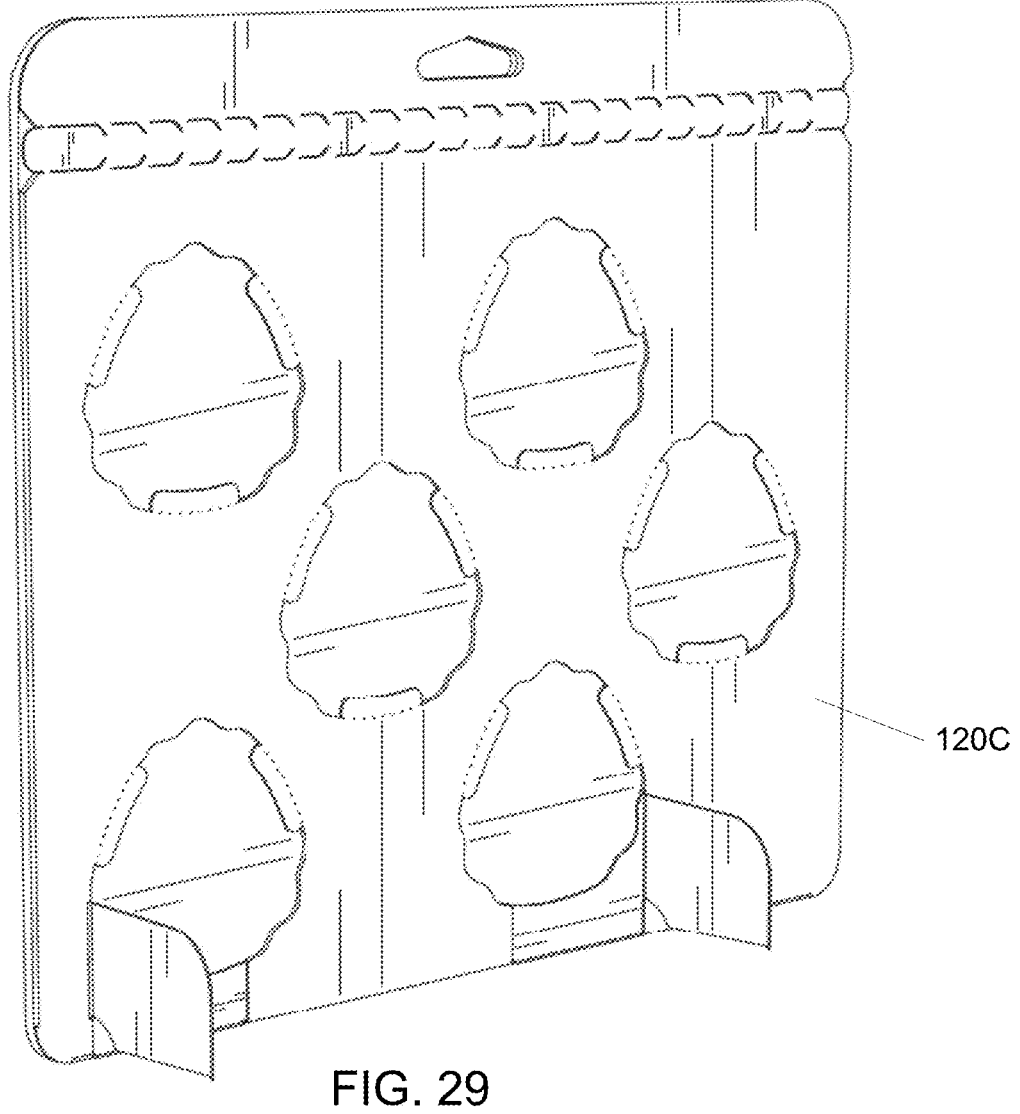
FIG. 29 depicts a perspective view of the planting system in a third carrying tray according to exemplary embodiments.
Figure 30:
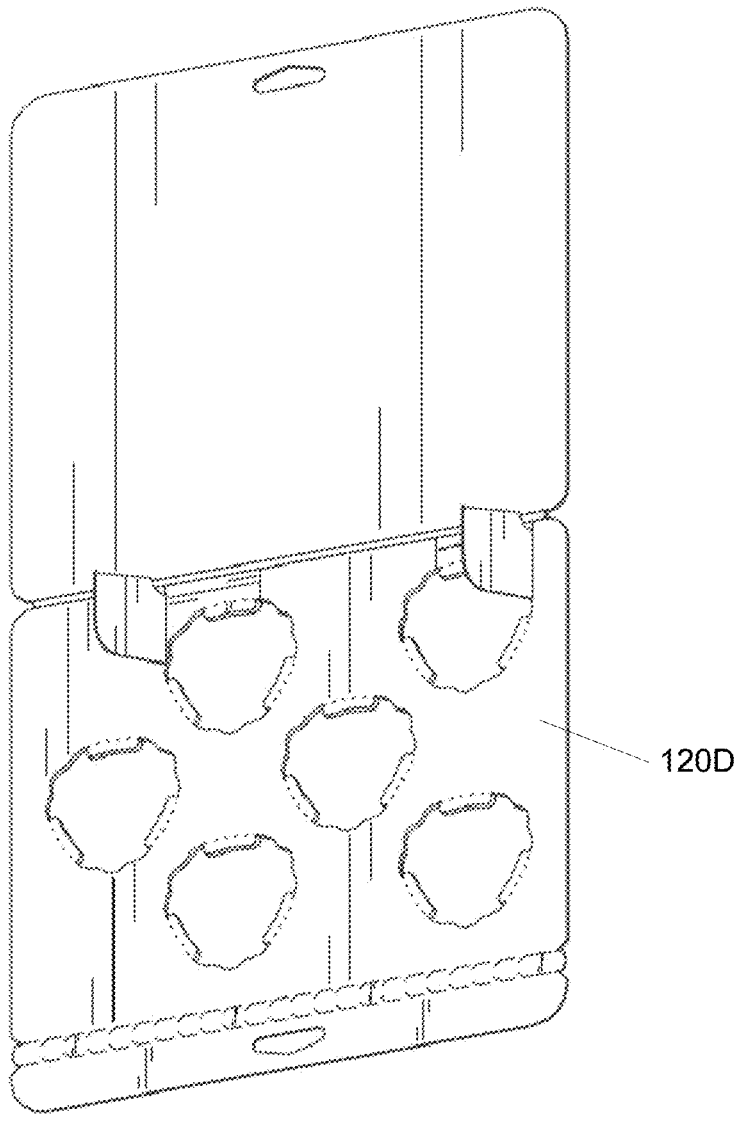
FIG. 30 depicts a perspective view of the planting system in a fourth carrying tray according to exemplary embodiments.
Figure 31:
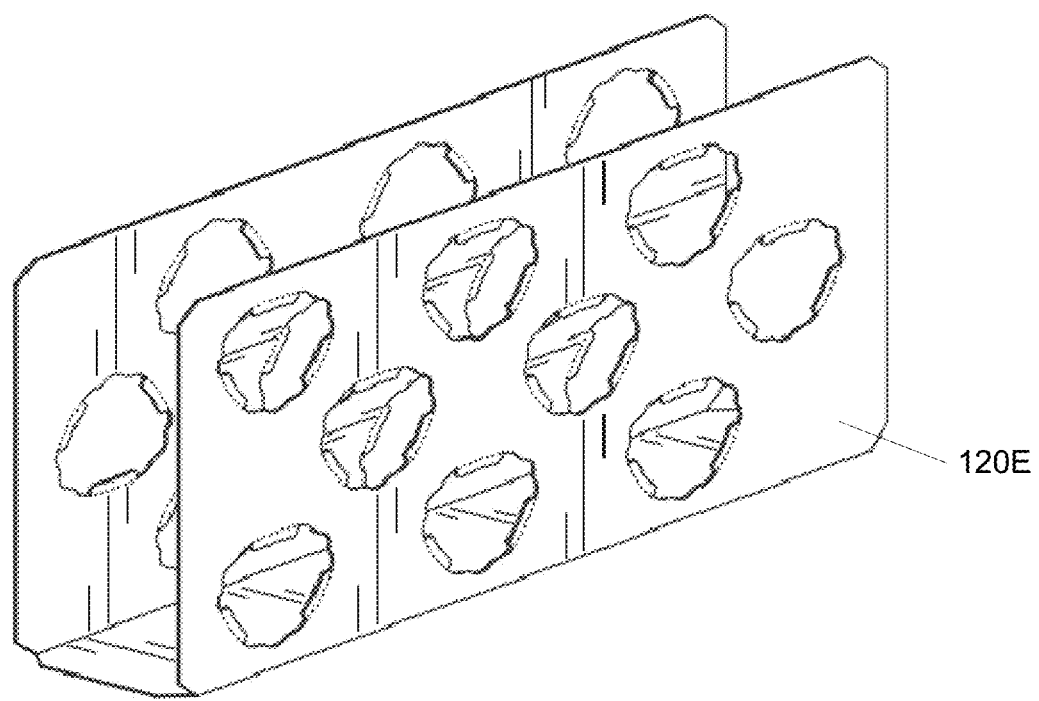
FIG. 31 depicts a perspective view of the planting system in a fifth carrying tray according to exemplary embodiments.
Figure 32:
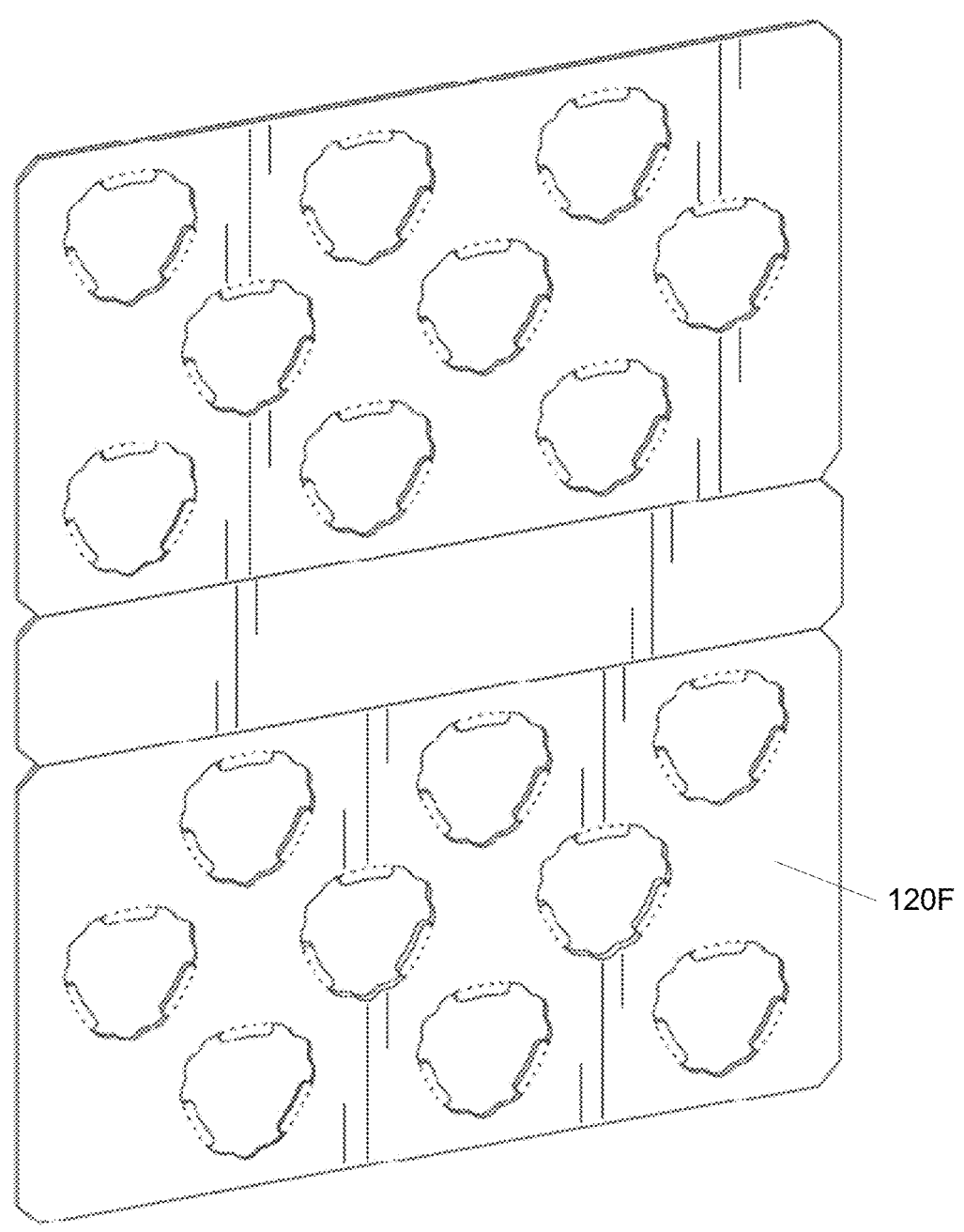
FIG. 32 depicts a perspective view of the planting system in a sixth carrying tray according to exemplary embodiments.

According to exemplary embodiments, the rooting media 106 may comprise dibbles 110 that provide areas for seed positioning, housing, or receiving. It should be appreciated that the number of dibbles 110 made in the rooting media 106 will depend on the seed 112 types planted. In an embodiment, there are three dibbles 110 in the surface of the rooting media 106, such as shown in FIG. 1, for example. In yet another embodiment, there may be two dibbles 110 in the surface, such as shown in FIG. 22, for example. Other numbers and configurations of dibbles are possible. In another embodiment the rooting media 106 may comprise slits for positioning, housing or receiving a seed 112. In another embodiment, the rooting media 106 may comprise up to four slits.

Once the seed 112 is placed within the dibble 110, the seed may be covered or overlaid by a variety of materials to prevent the seed 112 from falling out of the dibble 110. In an embodiment, the cover for the dibble 110 may be a biodegradable plug, a biodegradable lid, a water permeable adhesive, coir dust admixed with an adhesive material (e.g., EnviroHold®, polyvinyl acetate coating, starched based), or combinations thereof. An exemplary cover 105A is depicted in FIG. 1 in the form of a cylindrical plug. This is meant to be exemplary and non-limiting since a variety of cover types and shapes may be used as described herein. For example, the cover 105A may be conically shaped or flat. Furthermore, a single cover 105A is depicted. It should be appreciated ciated that each of the dibbles 110 may have a cover 105A. In a particular embodiment, the cover 105A that overlays each of the dibbles 110 may be inserted into the dibbles 110 and plugged in a wine-cork fashion and held in place by friction. In another embodiment, the dibble filler, plug, lid, or cover 105A may be held in place by an adhesive substance, which may be made of polymers or from natural products.

Figure 2:
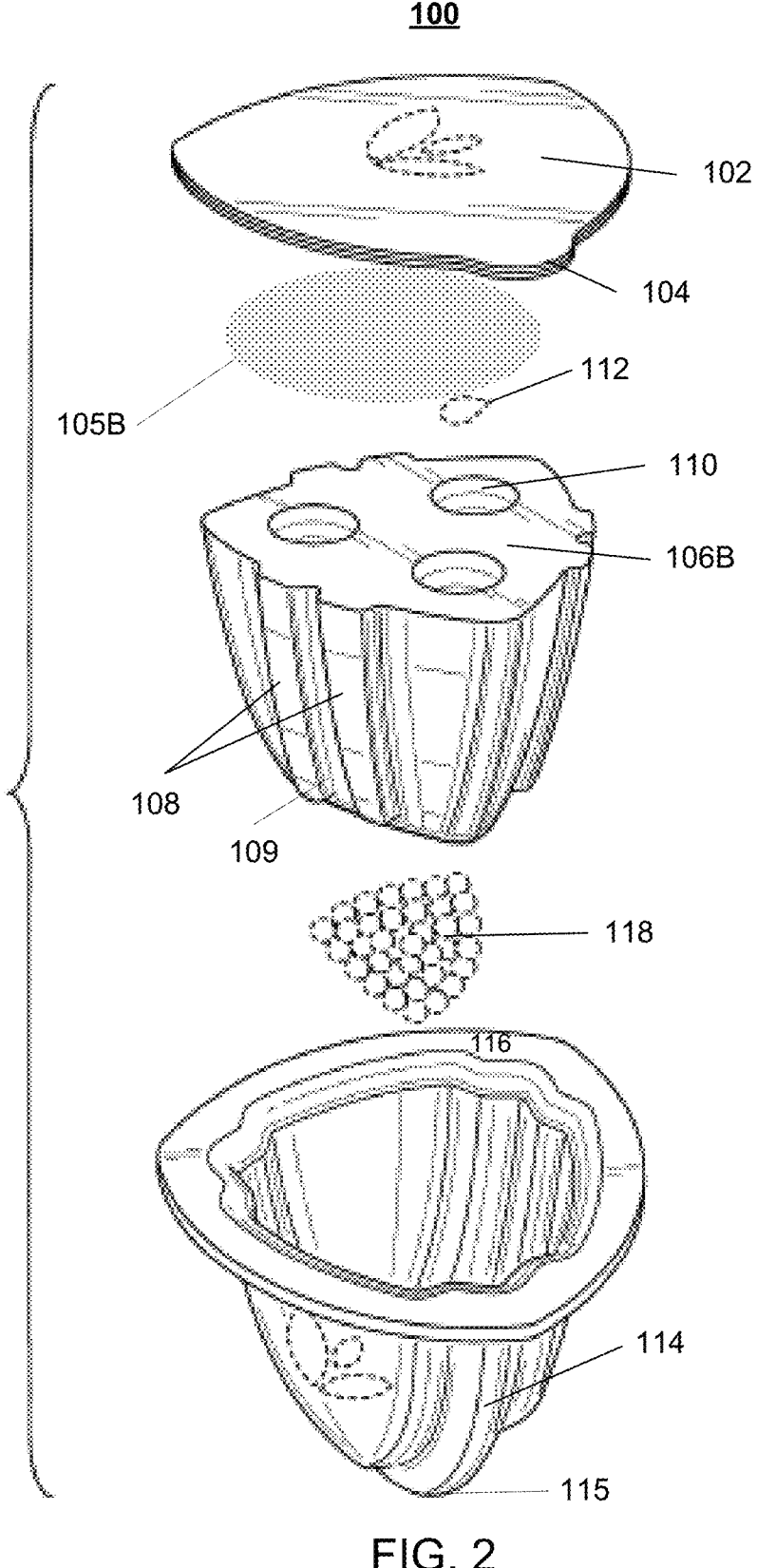
FIG. 2 depicts an exploded view of an alternative embodiment of a planting system according to exemplary embodiments.
Figure 3:
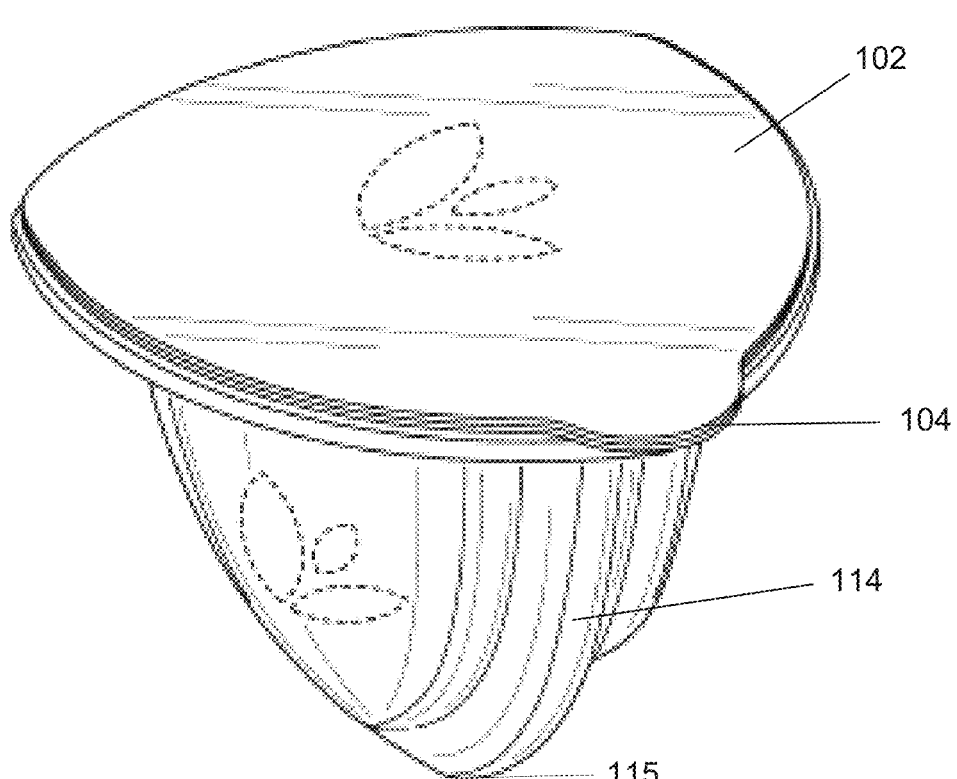
FIG. 3 depicts a perspective view of a planting system according to exemplary embodiments.
Figure 4:
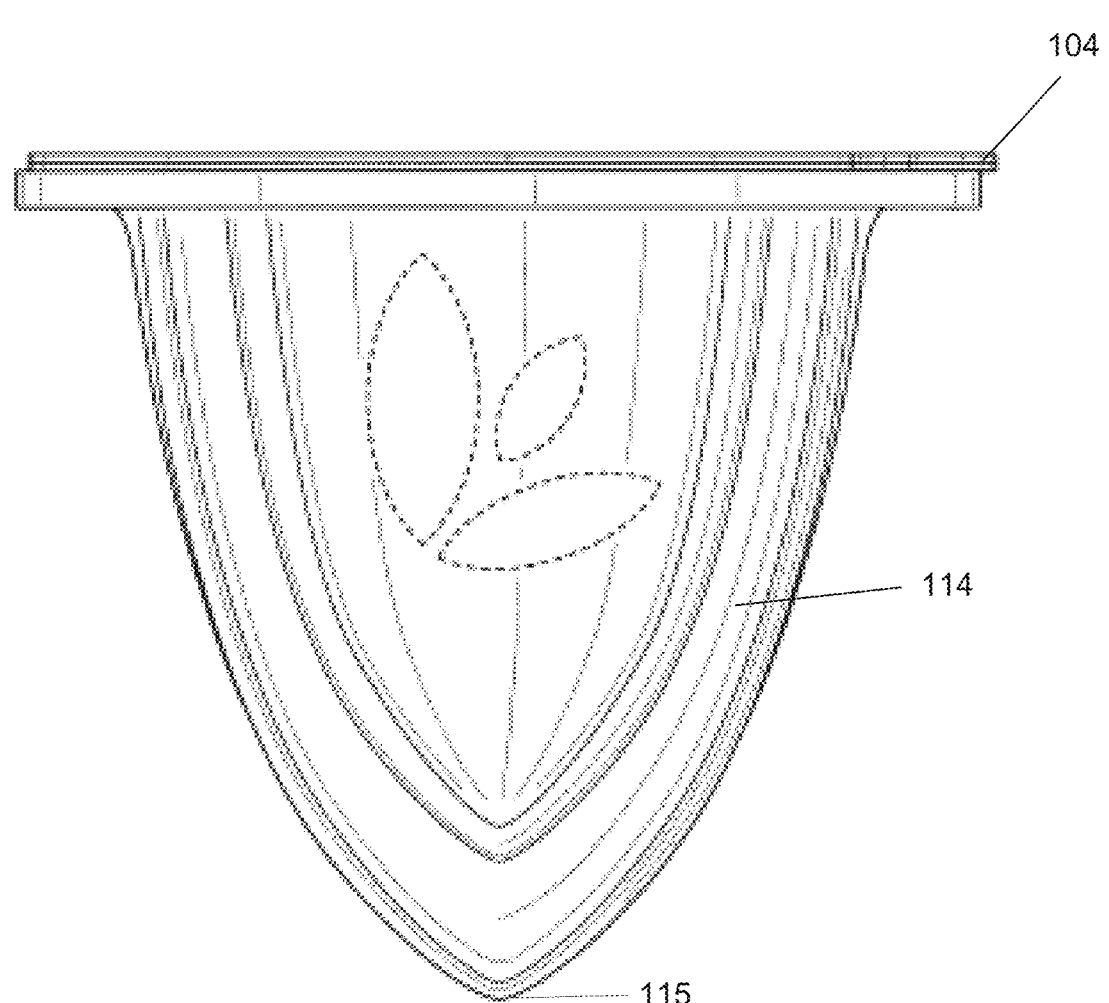
FIG. 4 is a front elevational view thereof.
Figure 5:
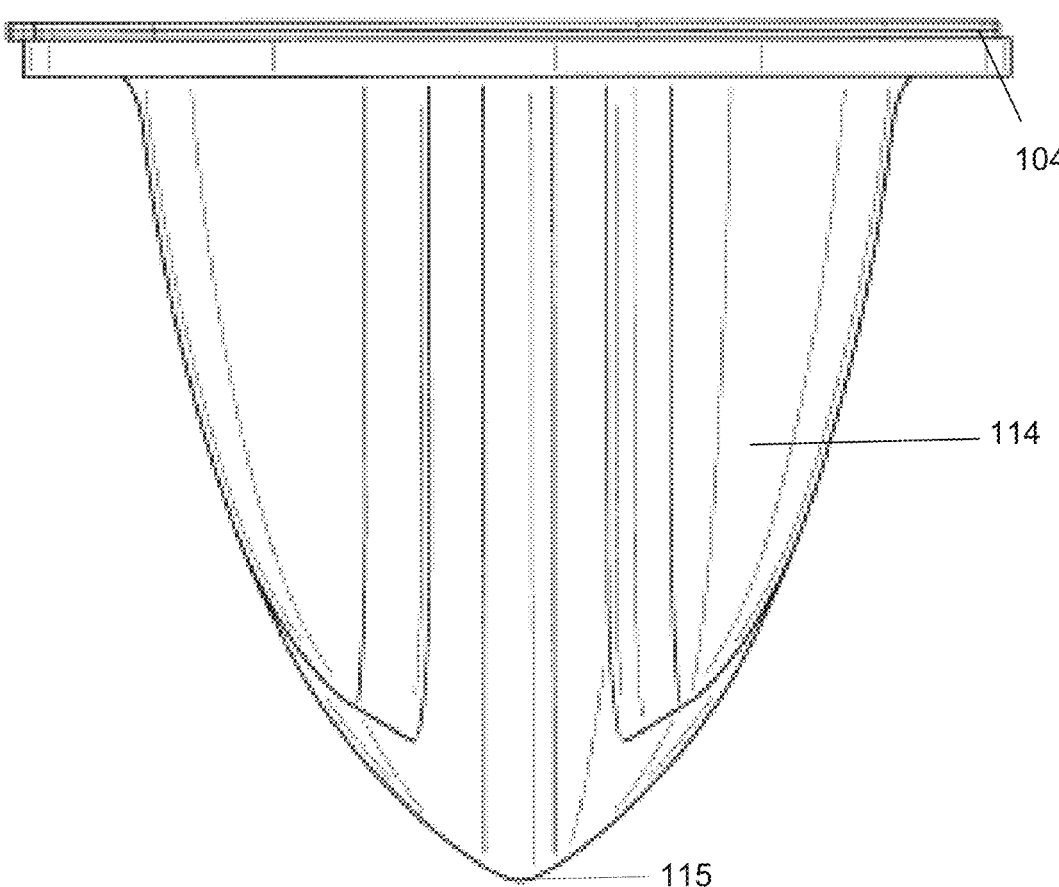
FIG. 5 is a rear elevational view thereof.
Figure 6:
FIG. 6 is a bottom plan view thereof.
Figure 6:
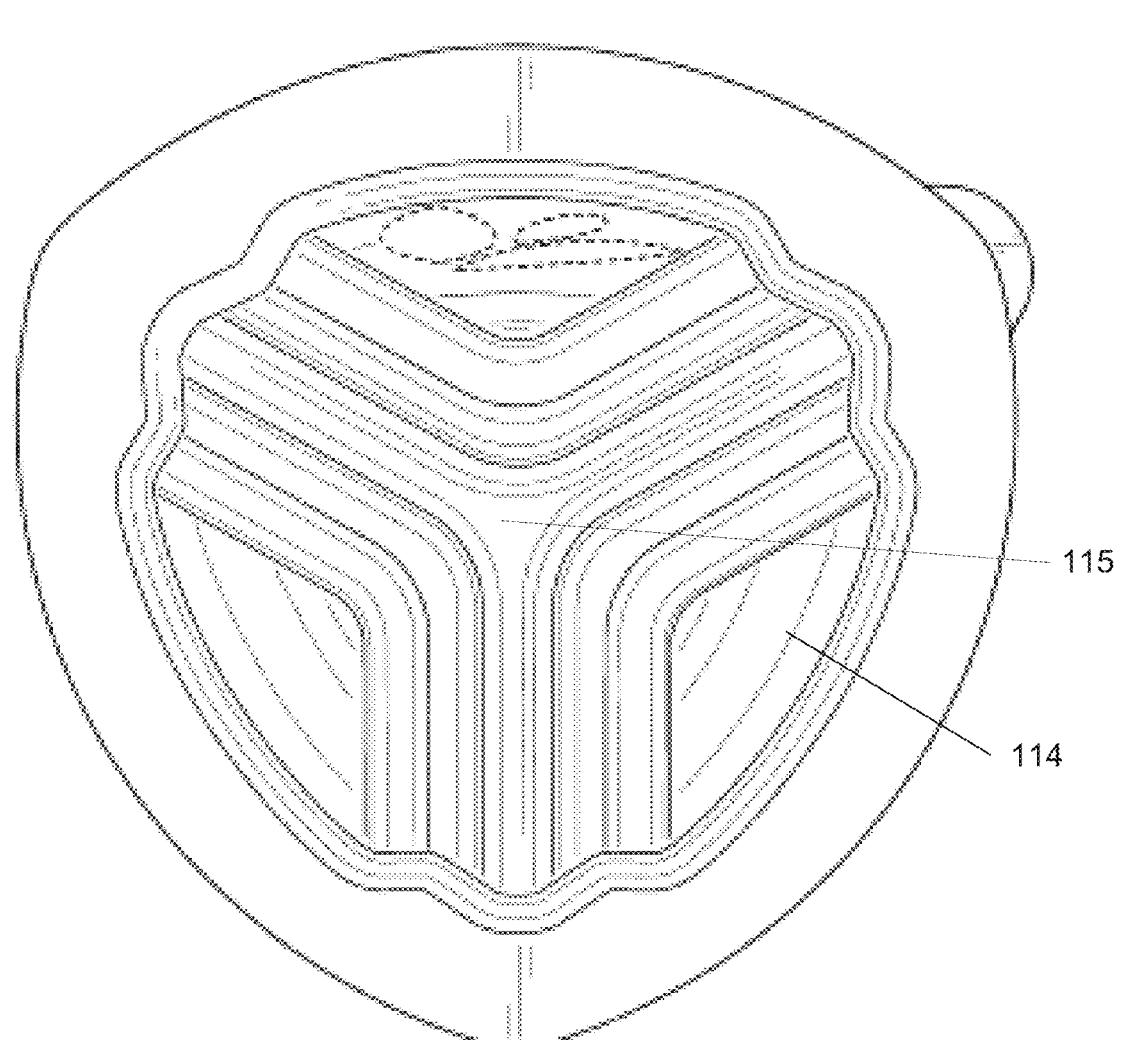

In another exemplary embodiment, as depicted in FIG. 2, a cover 105B for the dibble may be made of coir fines. The coir fines may be held in place by an adhesive. The adhesive may be applied using a spray such that the coir fines are saturated by the adhesive and held in place thereby. The adhesive may be transparent. The cover 105B depicted in FIG. 2 may cover the majority of the upper surface of rooting media 106B. Thus, the coir fines that make up the cover 105B may be applied in a bulk manner during the assembly of the planting system 100. In some embodiments, the cover 105B may be applied to each dibble 110 individually and then held in place by adhesive. It should be appreciated that in FIG. 2, only a single seed 112 is depicted for illustrative purposes, however, like FIG. 1 there may be a seed for each dibble 110. In other embodiments, the cover 105B for the dibble 110 may be held in place by a mechanical means. In one embodiment the dibble cover 105B may be a biodegradable plug made of peat, coir (compressed, non-compressed, screened, coir dust, and/or coir pith), peat moss (for example, sphagnum peat moss), peat humus, vermiculite, compost, perlite, bark, bark fines, composted bark fines, wood shavings, saw dust, mulch, a modified cornstarch, corn stover, sunflower stem, composted rice hulls, reed sedge peat, composted manure, composted forest products, coffee grounds, composted paper fiber, digested manure fiber, composted tea leaves, bagasse, yard waste compost, cotton derivatives, wood ash, bark ash, or biofoam available through Natur-tech (e.g., Natur-tech nuudles), cookie pellets, vegetative by-products, agricultural by-products, or combinations thereof, that plugs into the dibbles 110 possessing seeds 112. In another embodiment, the dibble cover may be a biodegradable lid made of biofoam, polyvinyl alcohol, polyvinyl acetate, or combinations thereof. In another embodiment, the dibble cover is made of an adhesive that may be natural or synthetic. These may include for example, guar gum, pine tar, seed-flour based, starch based adhesives, biofoams, polyvinyl alcohols, cookie meal, molasses, natural rubber emulsions, vegetable oils (e.g., neem oil), gelatins, or combinations thereof. As indicated above, the rooting media 102, lid 102, and/or adhesive may be composed and constructed of natural or organic materials such that the final plant or vegetable product produced from the seed pod 100 may be designated as an organic product. It should be appreciated that the material and type of covering for the dibbles 110 may vary and may be freely substituted by any material that comports with the general concepts described herein. As such, the types and components used to make the dibble covering should not be so limited to those specifically recited above.

D. Seeds and Other Plant Parts

It should be appreciated that the seed pod 100 may be used to grow and germinate a wide variety of plants. These plants may generally include, for example, flowers, vegetable, fruits, herbs, grass, trees, or perennial plant parts (e.g., bulbs, tubers, roots, crowns, stems, etc.). Certainly, any plant that a gardener can envision may be incorporated into the seed pod 100 according to exemplary embodiments.

While it is not an exhaustive list, the types of plant seeds 112 that may be included in the seed pod 100 are globe tomato, cherry tomato, roma tomato, cantaloupe, honey dew, jalapeno pepper, sweet pepper, straight cucumber, zucchini, yellow zucchini, watermelon, pumpkin, basil, cilantro, dill, thyme, bush bean, looseleaf lettuce, butterhead lettuce, romaine lettuce, smooth leaf spinach, snap pea, oregano, thyme, mint, radish, eggplant, broccoli, collards, cabbage, leek, zinnia, sunflower, marigold, carrot, corn, beet, parsnip, turnip, swiss chard, fennel, Marjoram, or combinations thereof. In exemplary embodiments, each seed pod 100 may include one or more seeds. As described herein, the seeds 112 are placed into the dibble(s) 110, of the rooting media 106. According to exemplary embodiments, one seed 112 may be placed in each dibble 110.

In another embodiment, the seed 112 may be coated with various agricultural agents that may help preserve the longevity of the seed 112. These coatings may help prevent the dehydration of the seed 112 and/or provide protection from various other adverse effects. These coatings may include, for example, fungicides, insecticides, biocides, coatings to promote water absorption and retention, or any other agricultural agent that is generally known in the art. In an embodiment, the agricultural agents may be organic or naturally derived agents that are environmentally safe and help attain organic product classification. In one embodiment, the seed may be coated with a fertilizer or a fertilizing agent. One of skill in the art would readily understand that various types of fertilizers or fertilizing agents may be coated onto the seed and these types are generally known in the art. In another embodiment, the seed may be coated with agents (e.g., limestone, talc, clay, cellulose or starch) that help to pellet the seed, which results in a more uniform seed product.

Seed depth may be a critical component for optimal seed germination. Exemplary embodiments simplify this process by providing a seed pod 100 that places the seed 112 at the appropriate depth for consistent seed germination. Thus in one embodiment, the seed 112 is located at a depth of about 0.125 inches to about 3 inches below the planting surface. In another embodiment, the seeds 112 are located at a depth of about 0.125 inches to about 3 inches below the top of the seed pod 100. In another embodiment, the seeds 112 are located at a depth of about 0.125 inches to about 0.750 inches below the top of rooting media 106. As described above, the flange 116 may provide an aid in proper insertion of the seed pod 100 to an appropriate depth in the surface.

E. Fertilizers and Nutrients

It should be appreciated that any type of fertilizer 118 may be used with exemplary embodiments. It is generally understood that fertilizers, fertilizer compositions, nutrients, and/or micronutrients are compositions comprising food for the plant. Common ingredients within the fertilizer 118 include nitrogen, phosphorus, and potassium (aka NPK) but the fertilizer is not to be limited by the aforementioned. Other ingredients that may be included within the fertilizer 118 including anhydrous ammonia, urea, methylene ureas, IBDU, ammonium nitrate, calcium sulfate, ammonium sulfate, diammonium phosphate (aka DAP), monoammonium phosphate (MAP), tetrapotassium pyrophosphate (TKPP), muriate of potash, potassium nitrate, potassium magnesium sulfate, triple superphosphate, or combinations or derivatives thereof. Other secondary nutrients may also be included such as, for example, calcium, magnesium, sulfur, micronutrients such as iron, copper, zinc, manganese, boron, or molybdenum. These fertilizers 118 may come from a variety of commercial suppliers. As with other components of the seed pod 100, the fertilizer 118 may be derived from natural or organic sources, such that the products established and/or produced from the seed pods 100 may be designated and/or classified as organic materials.

The fertilizer or nutrient 118 may also be coated with various coating materials that affect the release rate of the fertilizer or nutrient. These are typically referred to as "controlled release" fertilizers. Common types of these include, inter alia, Osmocote. Methods of making various types of controlled release fertilizers are known in the art such as in U.S. Pat. Nos. 3,223,518; 3,576,613; 4,019,890; 4,549,897; and 5,186,732, which are incorporated herein by reference.

In another embodiment, the seed pod 100 may additionally include other biologically active ingredients. These active ingredients may be added to control pests or diseases and/or promote plant growth. As such, the seed pods 100 may include, in addition to the fertilizer 118, a biologically active ingredient. These biologically active ingredients may include cytokines, natural hormones, fungicides, insecticides, pheromones, biostimulants, acaricides, miticides, nematicides, or combinations thereof. It should be appreciated that the list of possible cytokines, natural hormones, fungicides, insecticides, pheromones, biostimulants, acaricides, miticides, nematicides, or combinations thereof recited herein is not exhaustive and that other compounds generally known in the art may be freely added to the seed pod 100.

In one embodiment, insecticides may include one or more of the following: permethrin, bifenthrin, acetamiprid, carbaryl, imidacloprid, acephate, resmethrin, dimethyl acetylphosphoramidothioate; ethanimidamide, N-{(6-chloro-3-pyridinyl)methyl}-N'-cyano-N-methyl-, (E)-(9Cl) (CA Index name); hydrazinecarboxylic acid, 2-(4-methoxy{1,1'-biphenyl}-3-YL)-, 1-methylethyl ester (9Cl) (CA Index Name); methyl {1,1"-biphenyl}-3-YL)methyl 3-(2-chloro-3,3,3-trifluoro-1-propenyl)-2,2-dimethylcyclo-propanecarboxylate, [1a,3a-(Z)]-(+/−) 2-methyl[1,1'-biphenyl]-3-yl) methyl 3-(2chloro-3,3,3-trifluoro-1-propenyl)-2, 2-dimethylcyclopropanecarboxylate naphthyl-n-methylcarbamate; pyrrole-3-carbonitrile, 4-bromo-2-(4-chlorophenyl)-1-(ethoxymethyl)-5-(trifluoromethyl); chloro-alpha-(1-methylethyl)benzeneacetic acid, cyano(3-phenoxyphenyl)methyl ester amino-1-(2,6-dichloro-4-(trifluoromethyl)phenyl)-4-(1,R,S)-(trifluoromethyl)sulfinyl)-1H-pyrazole-3-carbonitrile; benzoic acid, 4-chloro-, 2-benzoyl-2-(1,1-dimethylethyl)hydrazide (9Cl) (CA Index Name); pyrethrins; deoxy-2,3,4-tri-o-methyl-alpha-L-mannopyranosyl)oxy)-13-{{5-(dimethylamino)tetrahydro-methyl-2H-pyran-2-YL}oxy}-9-ethyl-2,3,3A,5A,5B,6,9, 10,11,12,13,14,16A,16B-tetradecahydro-14-methyl-1H-as-indaceno {3,2-D}oxacyclododecin-7,15-dione, (cont'd qual; oxadiazin-4-imine, 3-(2-chloro-5-thiazolyl)methyltetrahydro-5-methyl-N-nitro-(9Cl) and the like.

In another embodiment, fungicides for use may include chlorothalonil, triforine, triticonazole, azoxystrobin, mancozeb, tetrachloroisophthalonitrile; ethoxy-3-(trichlorom-ethyl)-1,2,4-thiadiazole; dichlorophenyl)-4-propyl-1,3-di-oxolan-2-YL)methyl)-1H-1,2,4-triazole; carbamic acid, 2-1-(4-chlorophenyl)-1H-pyrazol-3-ylyoxyymethylypheny-lymethoxy-methyl ester (CAS name); dimethyl((1,2-phe-nylene)bis(iminocarbonothioyl))bis(carbamate) and the like.

In yet another embodiment, plant growth regulators for use may include RS,3RS)-1-(4-chlorophenyl)-4,4-dimethyl- 2-(1H-1,2,4-triazol-1-YL)pentan-3-OL; cyclohexanecar-boxylic acid, 4-(cyclopropylhydroxymethylene)-3,5-dioxo-ethyl ester.

In still another embodiment, other exemplary biologically active ingredients may be utilized in the seed pod 100 including 3-indolylacetic acid; abamectin; Acephate; acet-amiprid; alpha-Cypermethrin; auxin; azaconazole; azox-ystrobin; *Beauveria bassiana*; Benomyl; beta-Cyfluthrin; bifenthrin; borate; Borax; boric acid; Captan; carbaryl; Chlorothalonil; Cyfluthrin; Deltamethrin; Dichlobenil; difenoconazole; Epoxiconazole; Fipronil; fosetyl-alu-minium; gibberellane; gibberella; Imidacloprid; indoxacarb; iprodione; isofenphos; lambda-Cyhalothrin; lindane; mala-thion; mancozeb; maneb; metalaxyl; metalaxyl-m; metalde-hyde; myclobutanil; paclobutrazol; permethrin; picox-ystrobin; pyraclostrobin; pyrethrin; spinosad; *Streptomyces griseoviridis*; Sulphur; tebuconazole; tefluthrin; *Tricho-derma barzianum*; trifloxystrobin; trinexapac-ethyl; urea herbicides; *Verticillium dahliae; Verticillium lecanii*; vinclo-zolin; hydrogenperoxide; Silverthiosulfate; zineb; zincox-ide; and the like. As with other components of the seed pod 100, the fertilizers, nutrients, additives, or biologically active ingredients may be derived from natural or organic sources, such that the products established and/or produced from the seed pods 100 may be designated and/or classified as organic materials.

According to exemplary embodiments, the fertilizer or nutrient 118 may be placed within the outer shell 114 at the bottom portion thereof. It should be appreciated that the fertilizer 118 will provide nutrients to the seed by absorption through the rooting media 106. Various types of fertilizer 118 can be used at the bottom of the seed pod 100. These may include controlled release fertilizers, time released fertilizers, water soluble fertilizers, coated fertilizers, uncoated fertilizers, or no fertilizer. In one embodiment, the fertilizer 118 is molded or formed prills, loose prills, or combinations thereof. In another embodiment, the fertilizer 118 may be molded Osmocote® or loose Osmocote®. In one embodiment, the fertilizer or nutrient may be coated directly onto the seed.

In another embodiment, the fertilizer 118 found in the seed pod 100 may be located at the bottom of the outer shell 114, admixed with the rooting media 106, or combinations thereof. In another embodiment, the fertilizer 118 may additionally include secondary nutrients (e.g., sulfur, cal-cium, or magnesium) and/or micronutrients, which are con-ventional and generally known and understood by in the art. In another embodiment, the fertilizer 118 may be incorpo-rated and intercalated into the outer shell 114 of the seed pod 100. In yet another embodiment, the fertilizer 118 may be found within the outer shell 114 of the seed pod 100. In still another embodiment, the fertilizer 118 may be attached to the exterior of the outer shell 114.

The Osmocote® is a mixture of NPKs. In one embodi-ment, the NPK is placed in the bottom of the seed pod 100. The NPK can be in any ratio. In one embodiment, the nitrogen of the NPK may be in the range of 1-18, the phosphorus of the NPK may be in the range of 1-6, while the potassium of the NPK may be in the range of 1-12, or any fractional or whole number range therein. In another embodiment, the NPK may be in a ratio of 1-1-1, 3-1-2, 1-2-1, 1-3-1, 4-1-2, 2-1-2, 2-1-1, or 18-6-12. In another embodiment, the NPK is in a ratio of 3-1-2. It should be appreciated that other ratios of NPK may be substituted depending on the nutritional needs of the particular plant being grown. The total amount of fertilizer 118 located at the bottom of the seed pod 100 can be in the range of approximately 1-5 grams. In one embodiment the fertilizer 118 is 3 grams of Osmocote 18-6-12. In another embodiment the supply of fertilizer 118 and/or nutrient 118 present in the seed pod 100 is sufficient for a duration of approximately 1-100 days. In one embodiment, the amount of fertilizer 118 and/or nutrient 118 present is sufficient for a period of approximately 30 days.

F. Lids

Figure 7:
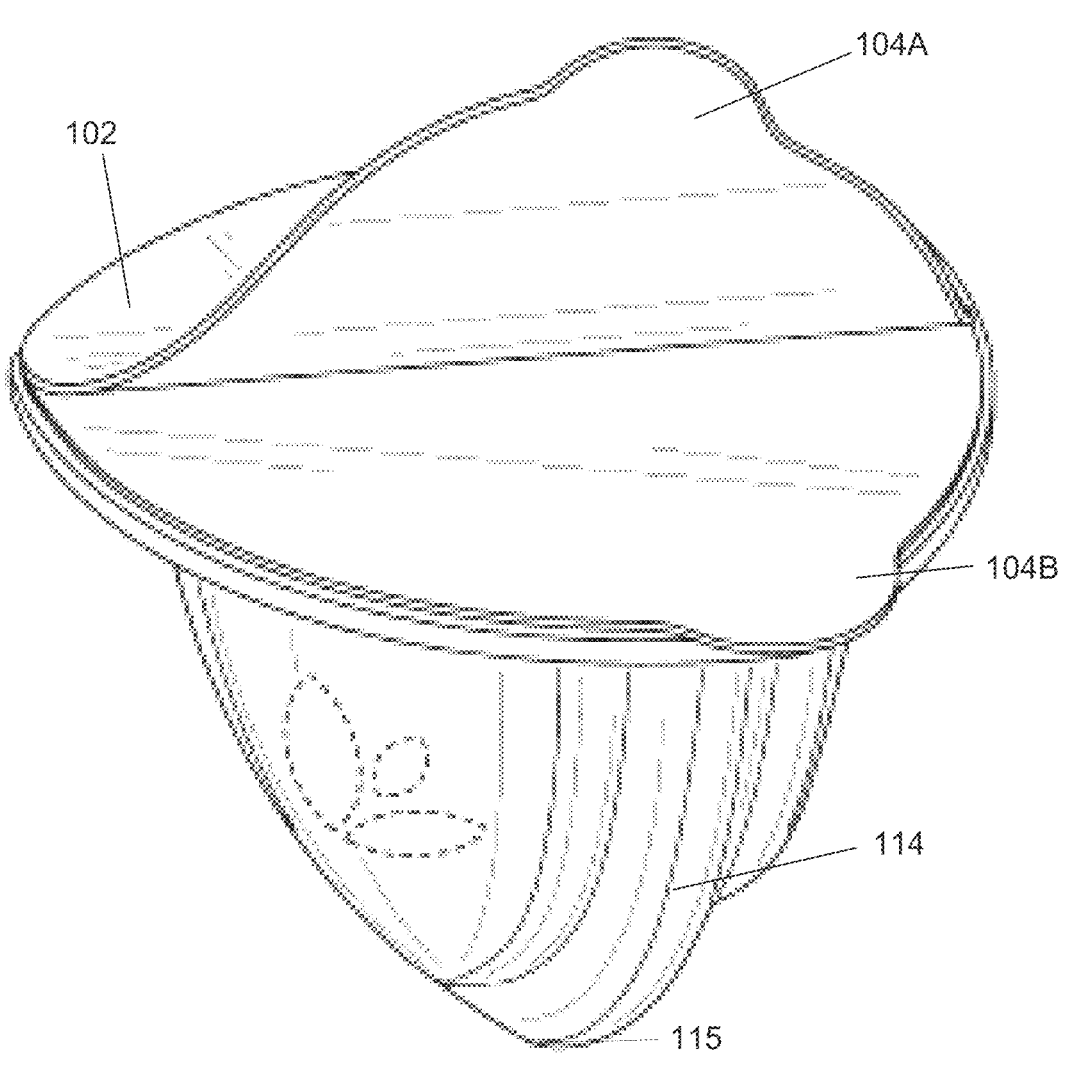
FIG. 7 depicts a perspective view of a planting system depicting a layer of the top cover pulled back according to exemplary embodiments.
Figure 8:
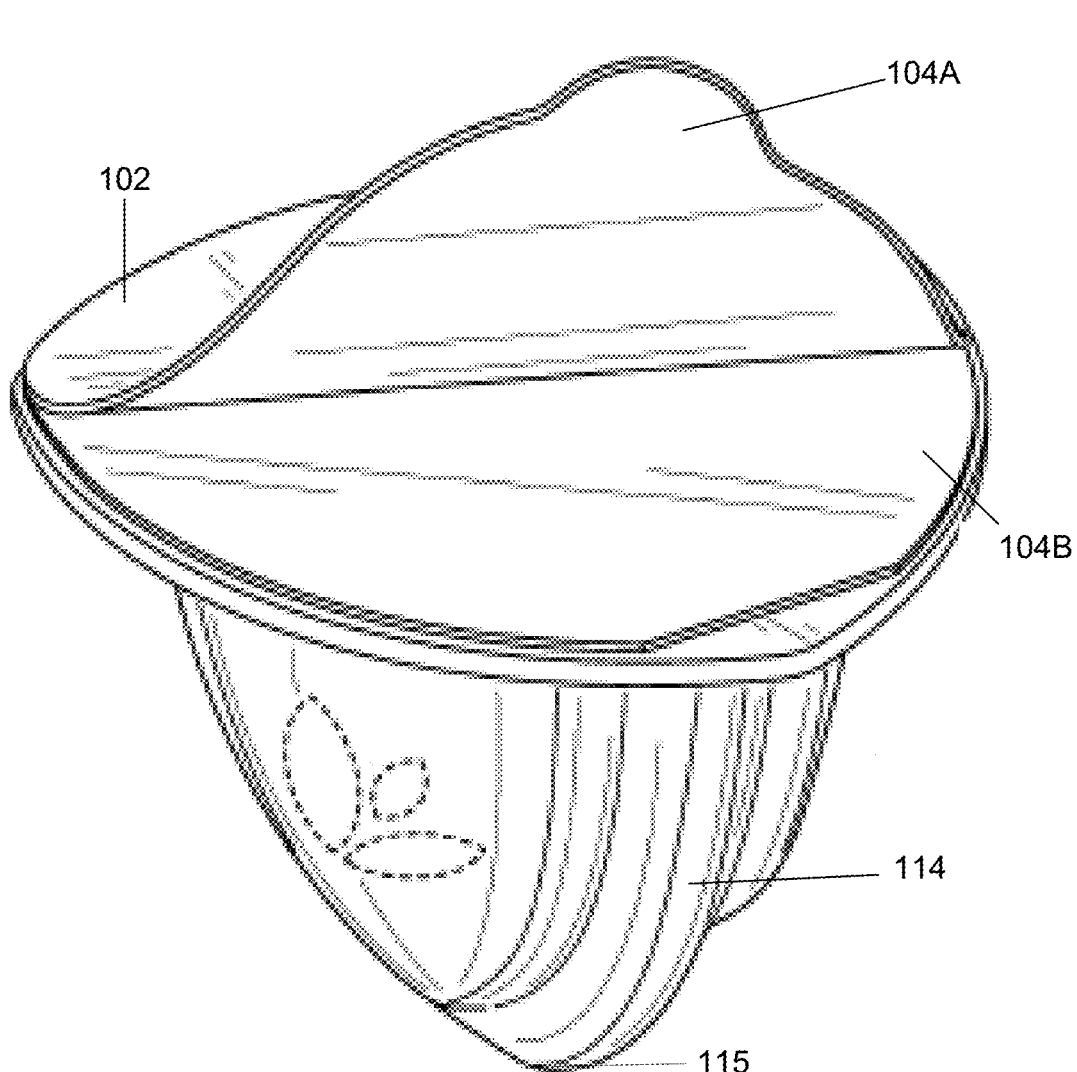
FIG. 8 depicts a perspective view of a second embodiment of a planting system depicting a layer of the top cover pulled back according to exemplary embodiments.
Figure 9:
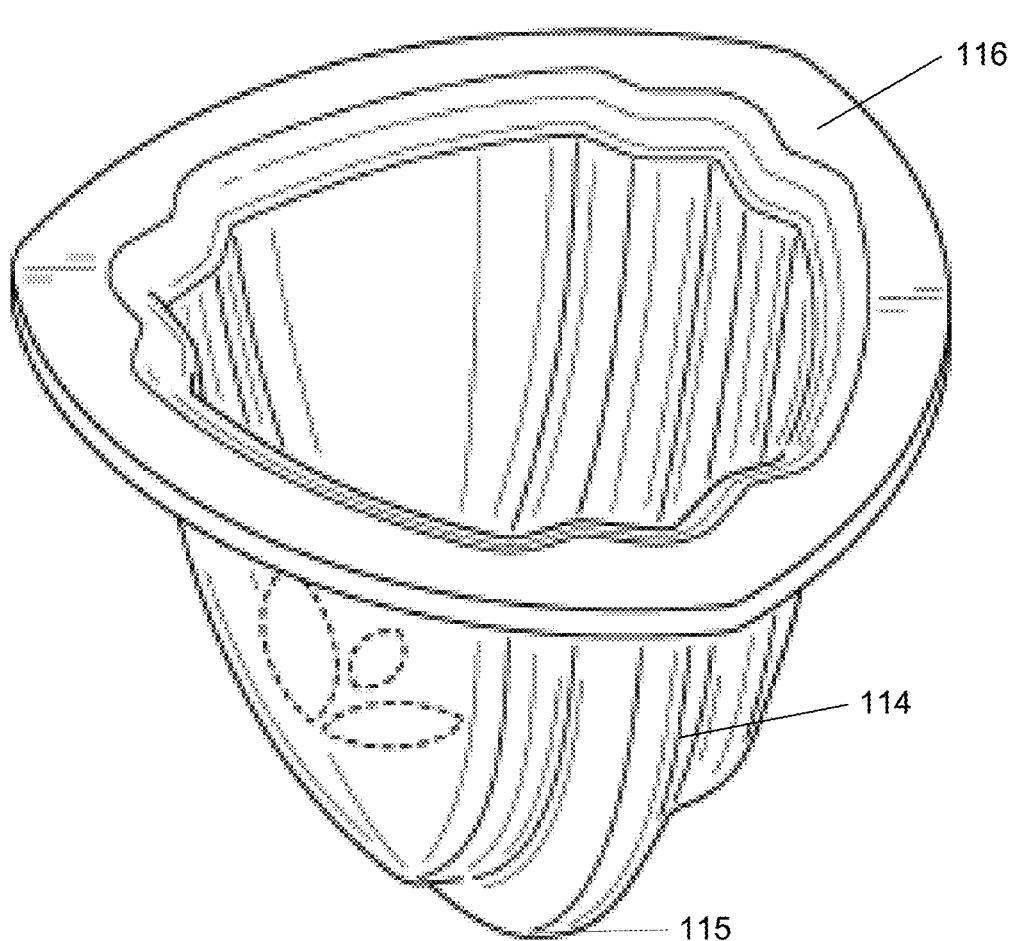
FIG. 9 depicts a perspective view of a planting system with the top cover and the internal plug removed according to exemplary embodiments.
Figure 10:
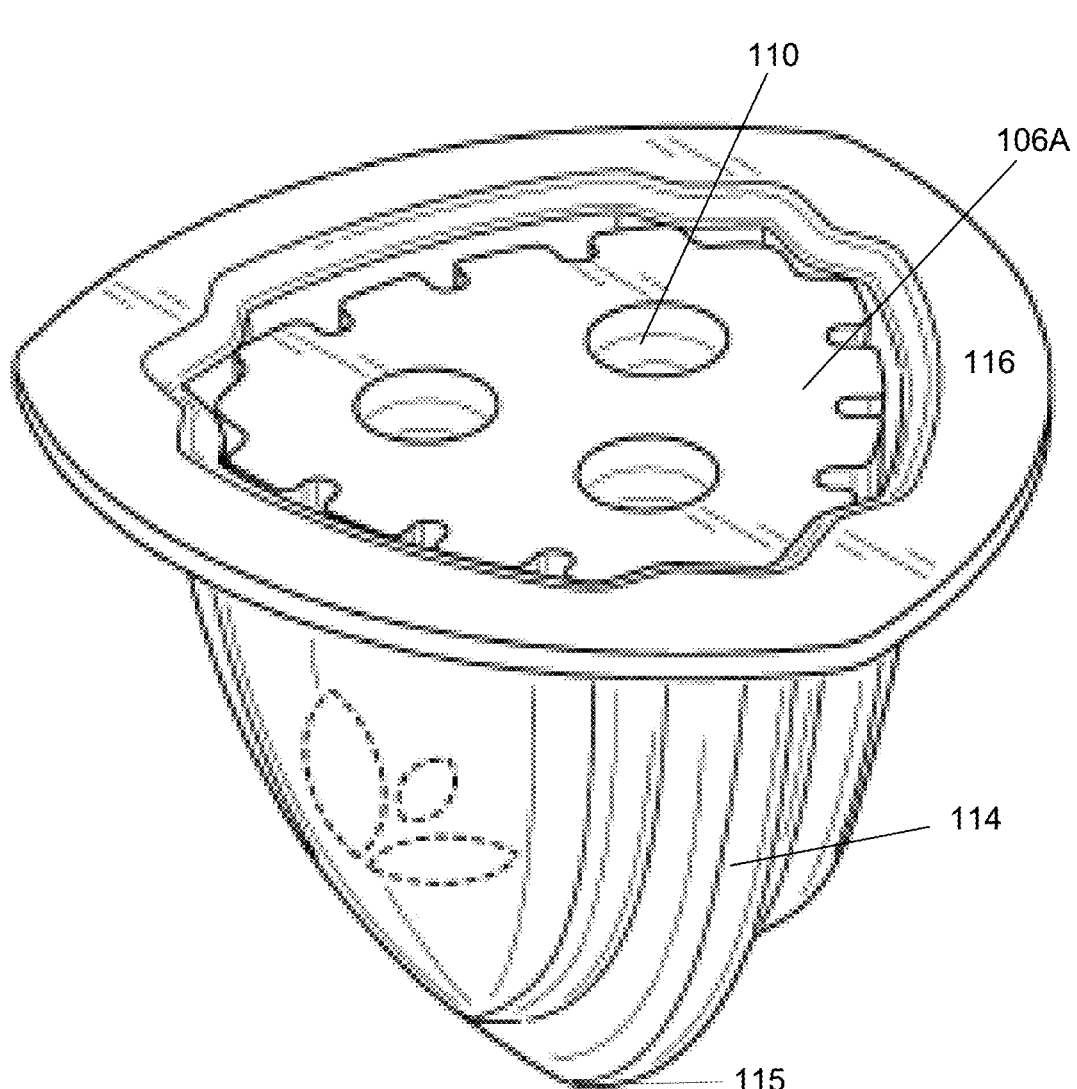
FIG. 10 depicts a perspective view of a planting system with the top cover removed depicting the internal plug according to exemplary embodiments.
Figure 11:
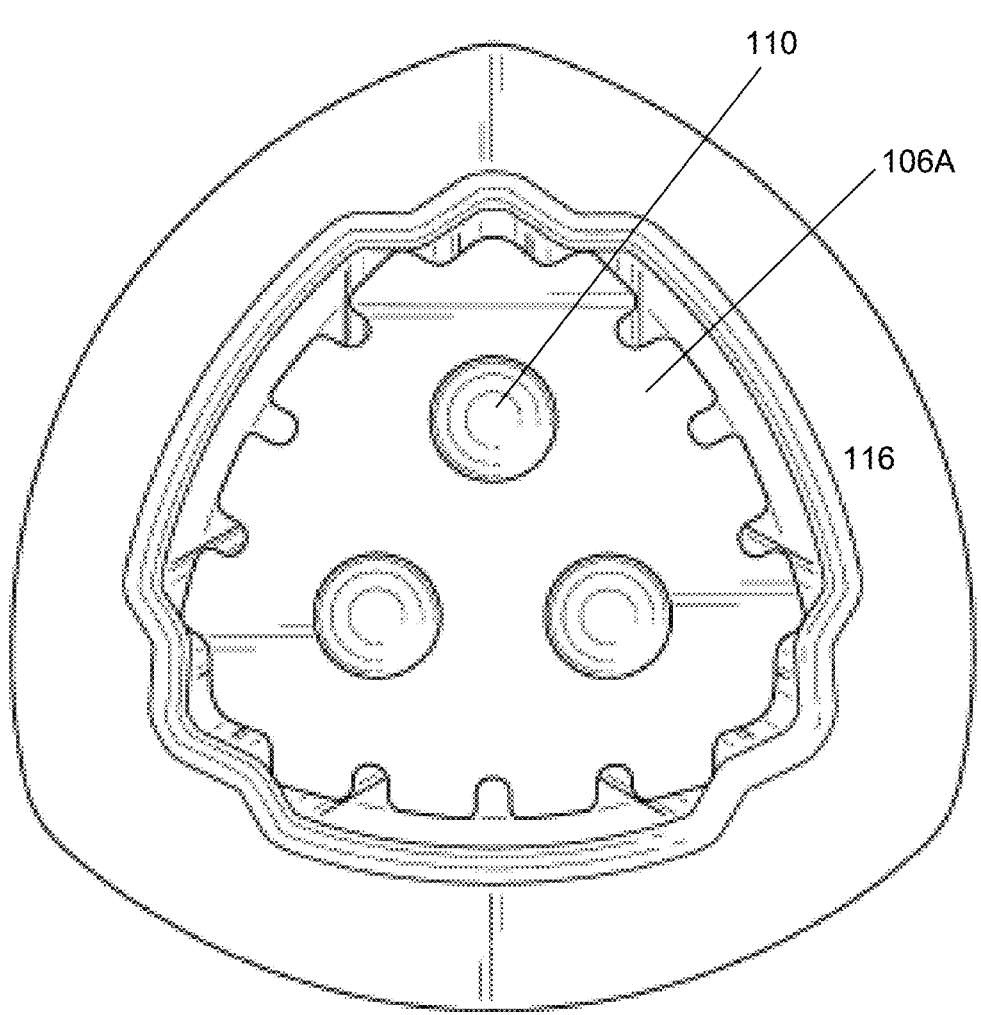
FIG. 11 is a top plan view thereof.
Figure 12:
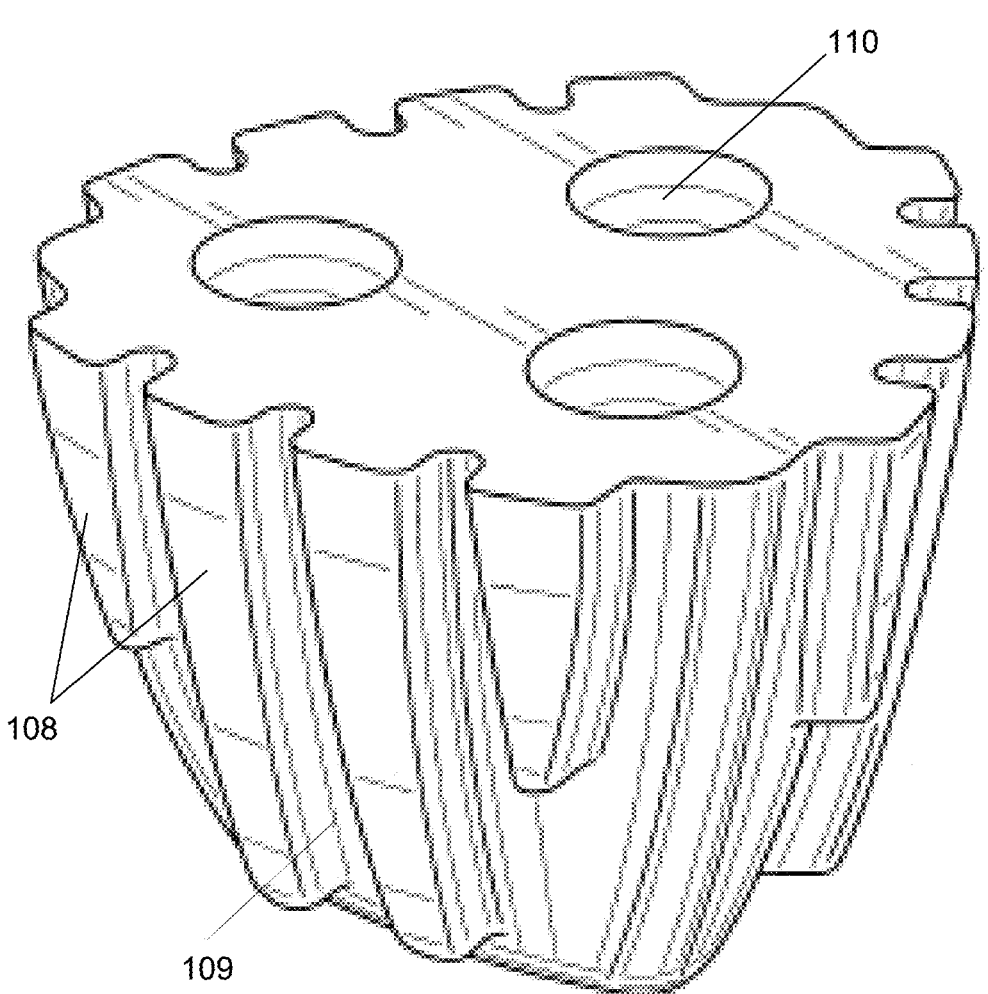
FIG. 12 depicts a perspective view of the internal plug removed from the planting system according to exemplary embodiments.
Figure 13:
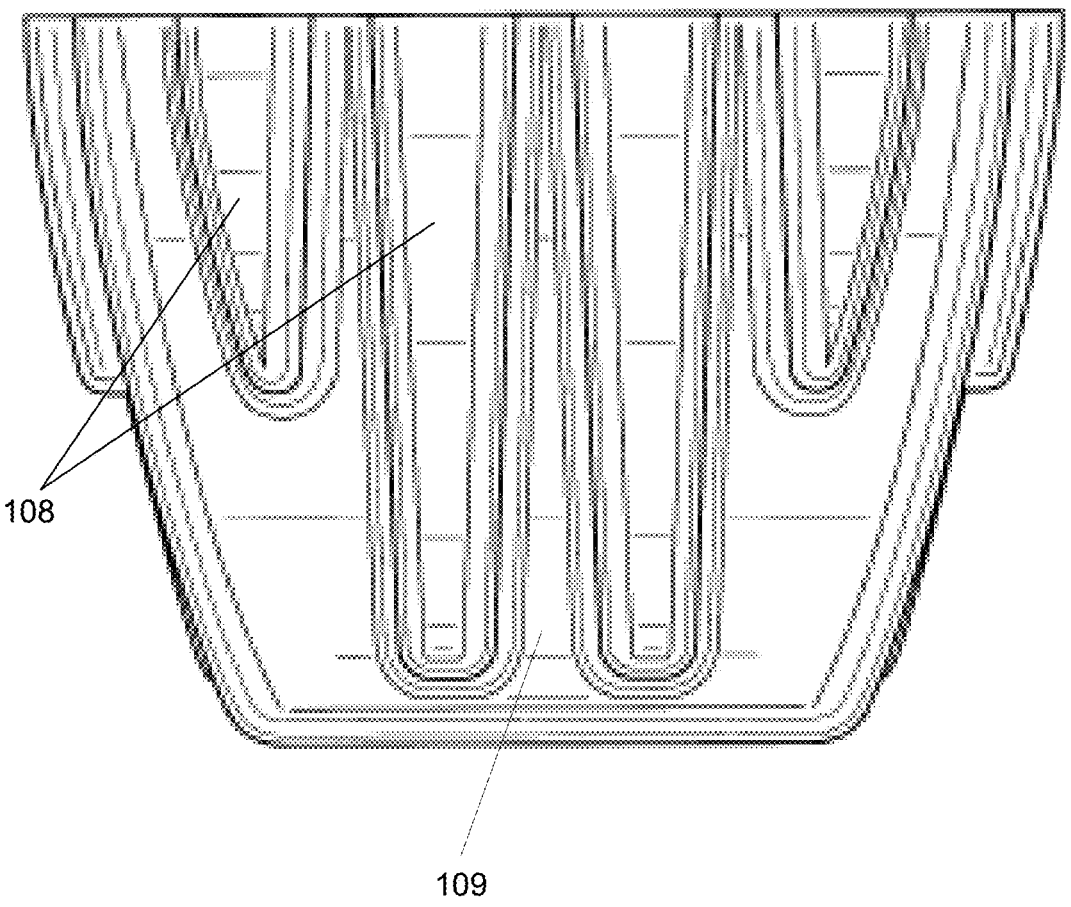
FIG. 13 is a front elevational view thereof.
Figure 14:
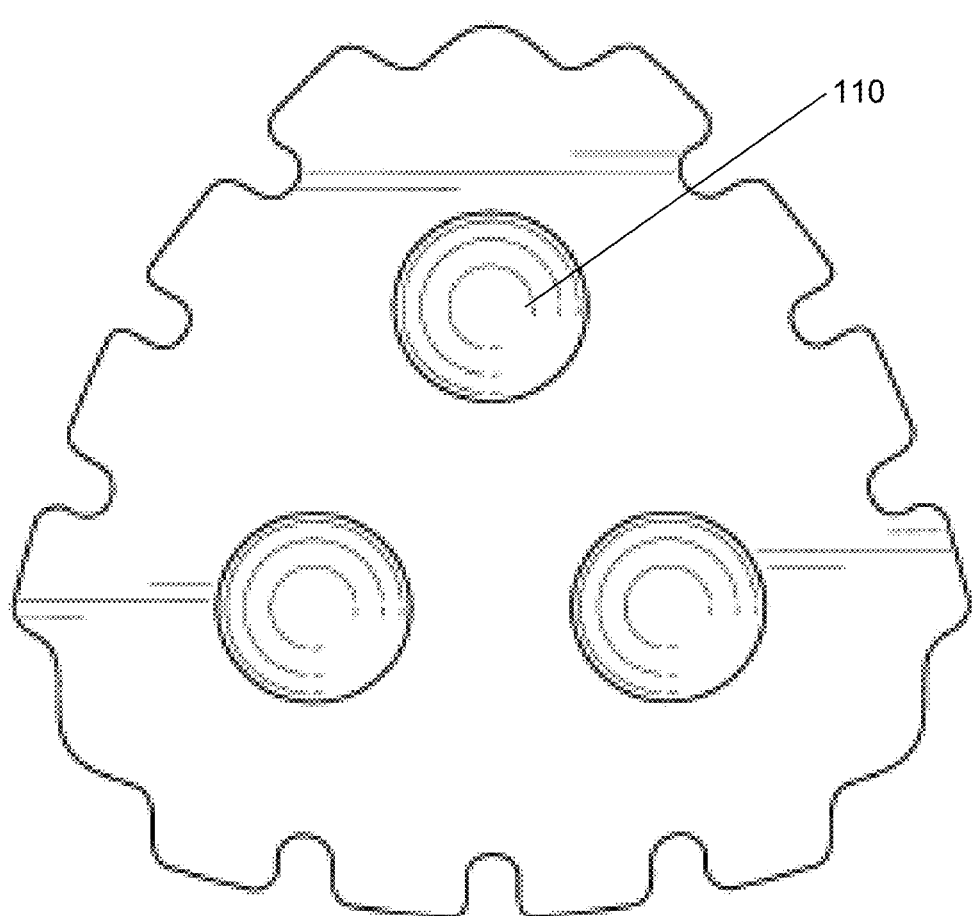
FIG. 14 is a top plan view thereof.
Figure 15:
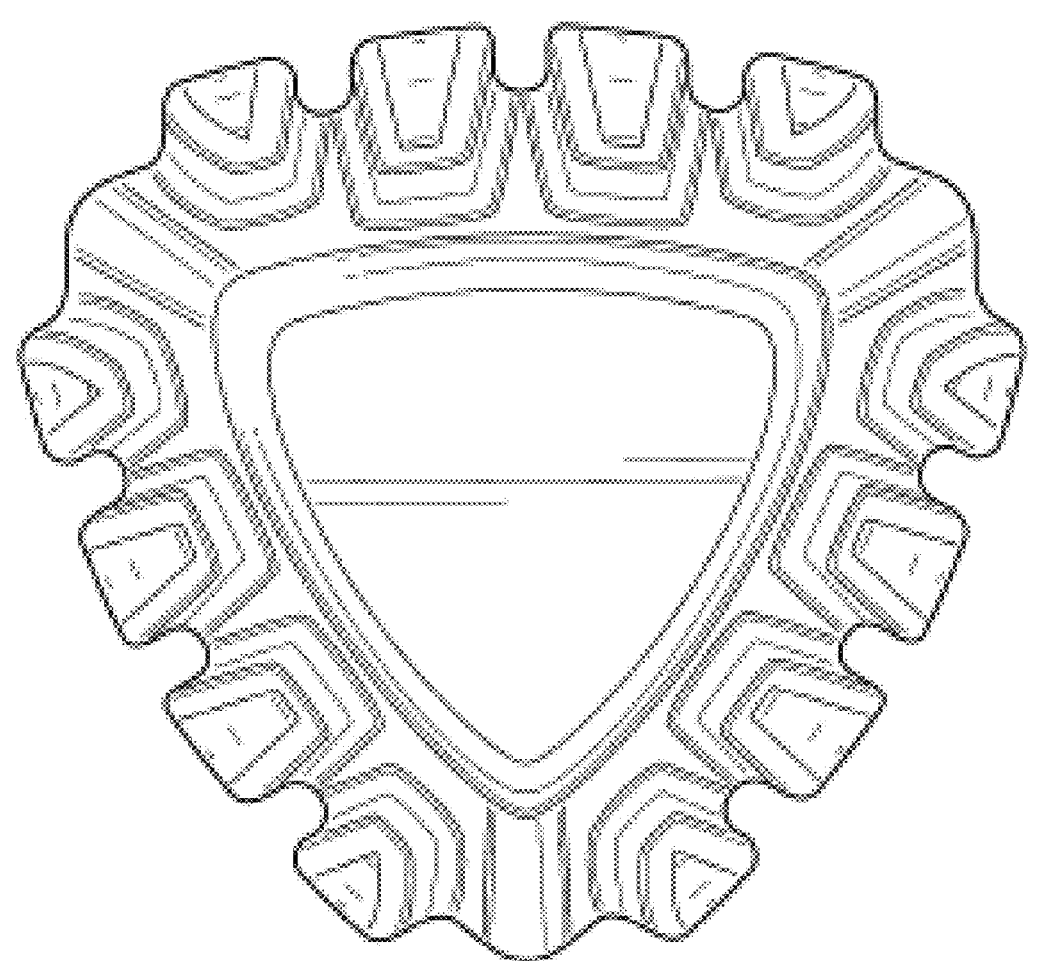
FIG. 15 is a bottom plan view thereof.
Figure 16:
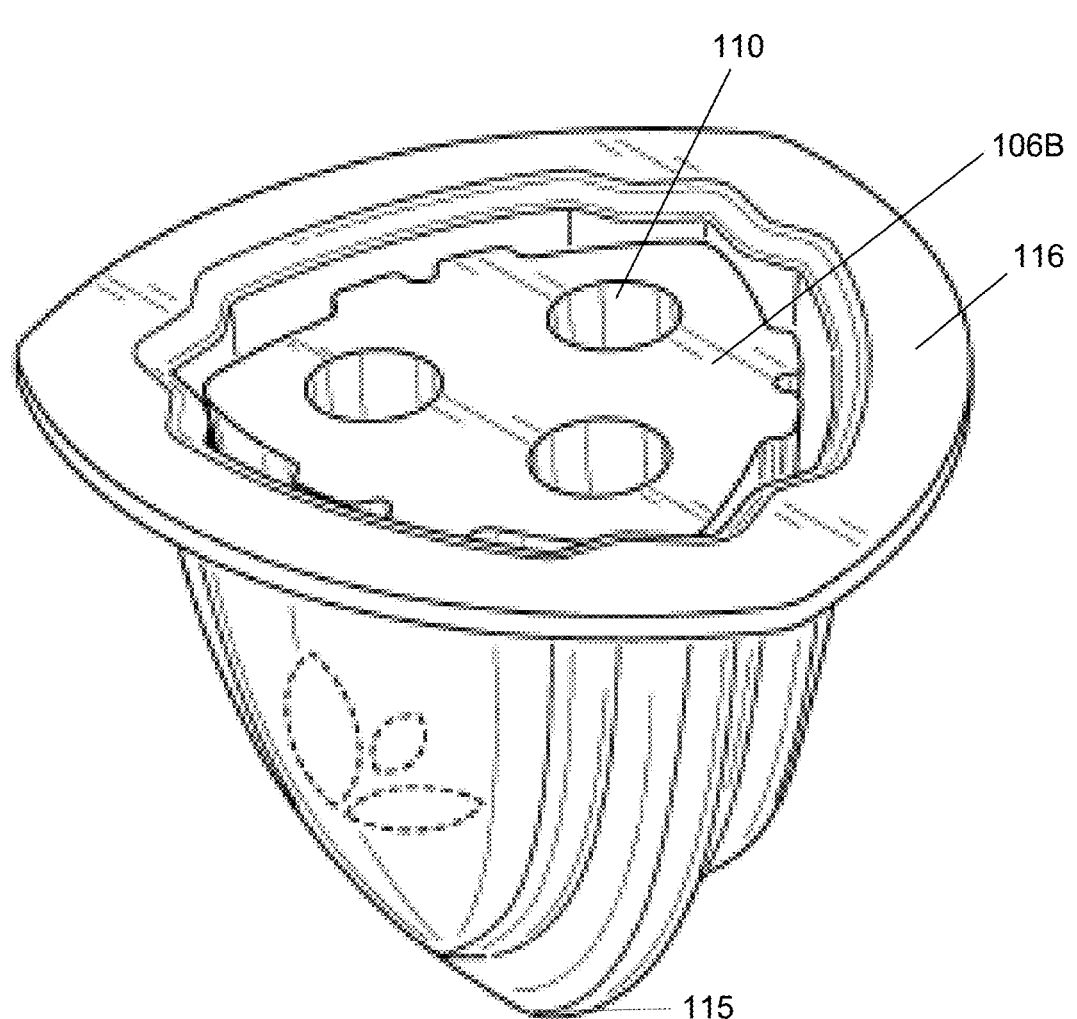
FIG. 16 depicts a perspective view of a planting system with the top cover removed and a second embodiment of the internal plug.
Figure 17:
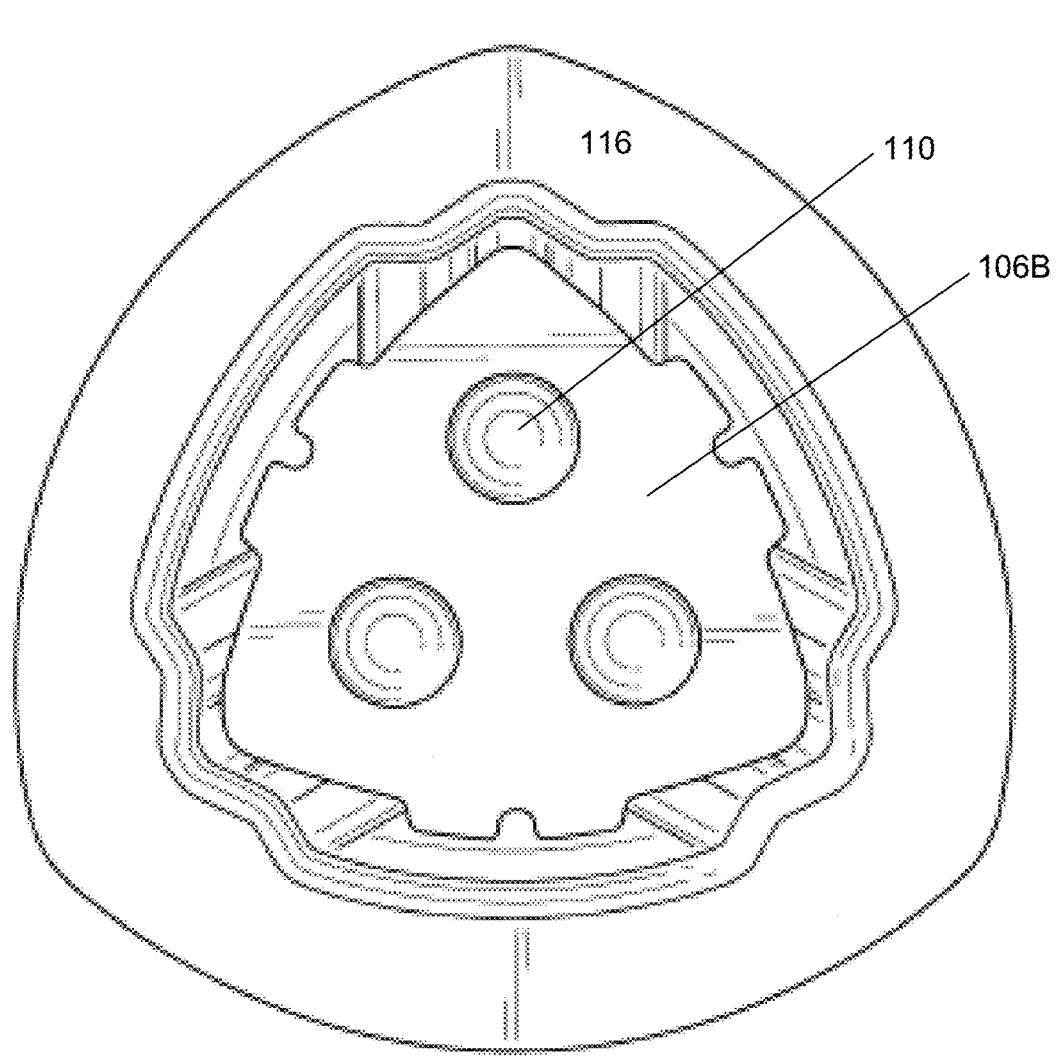
FIG. 17 depicts a top view thereof.
Figure 18:
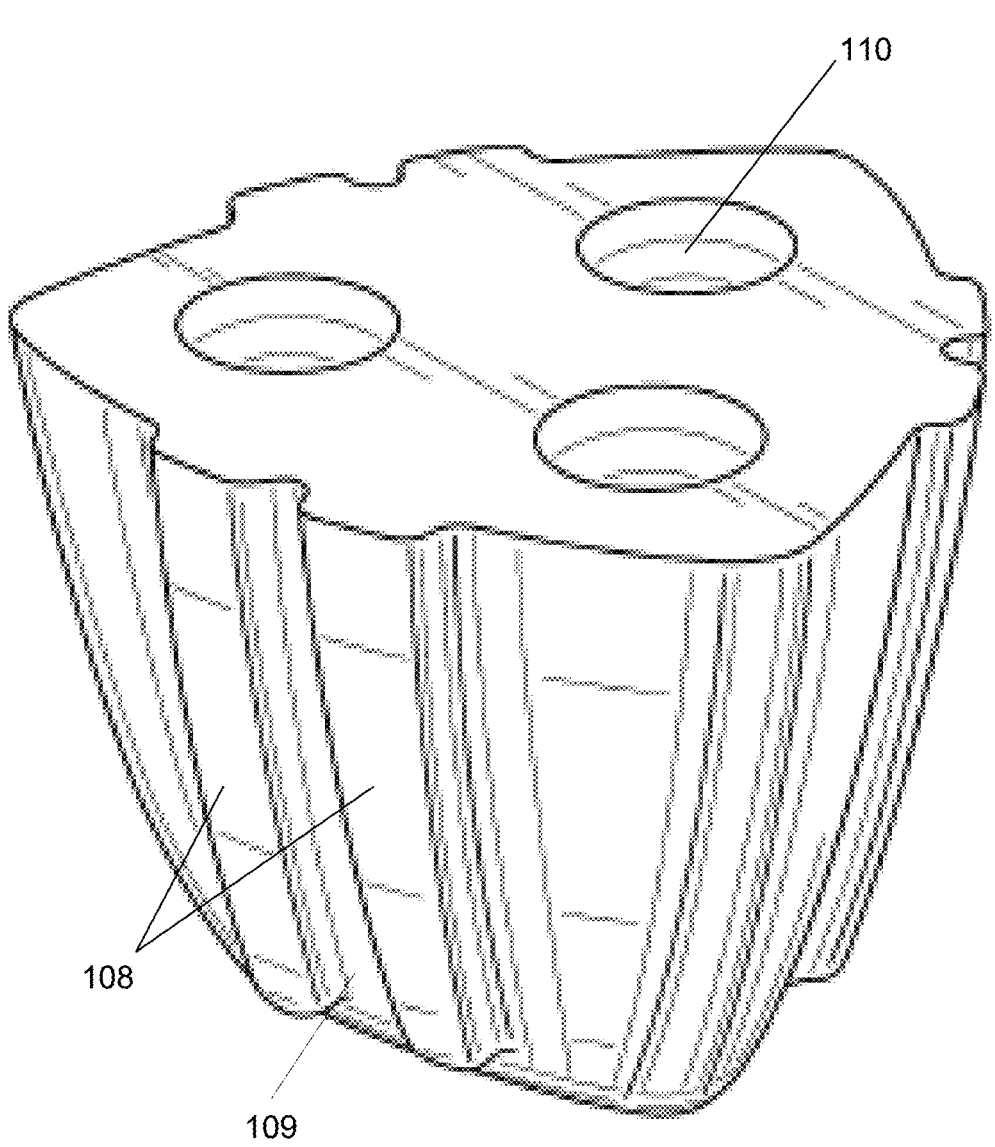
FIG. 18 depicts a perspective view of the second embodiment of the internal plug removed from the planting system.
Figure 19:
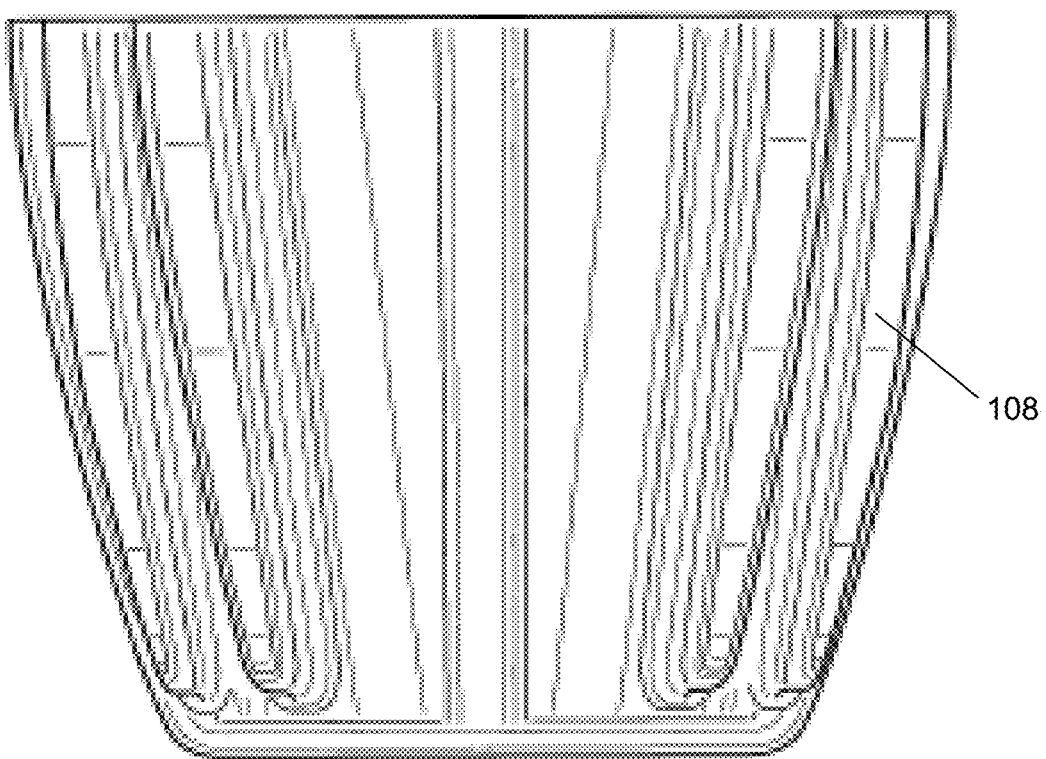
FIG. 19 is a rear elevational view thereof.
Figure 20:
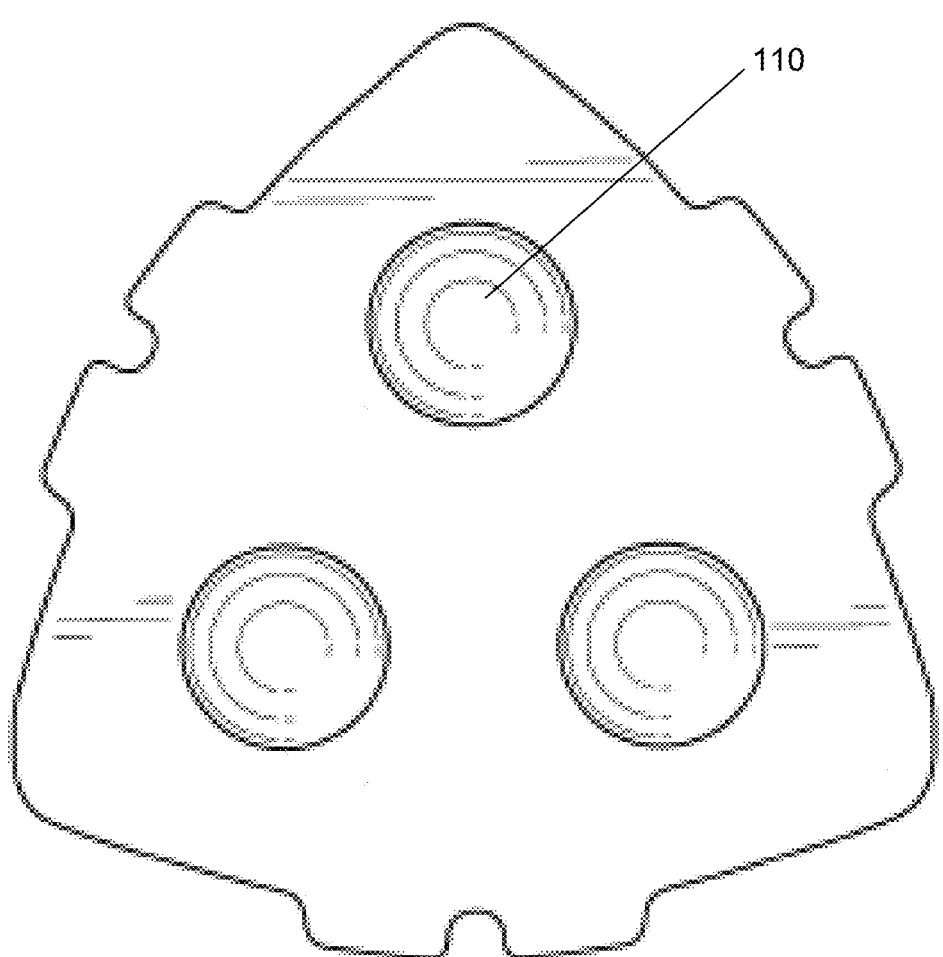
FIG. 20 is a top plan view thereof.
Figure 21:
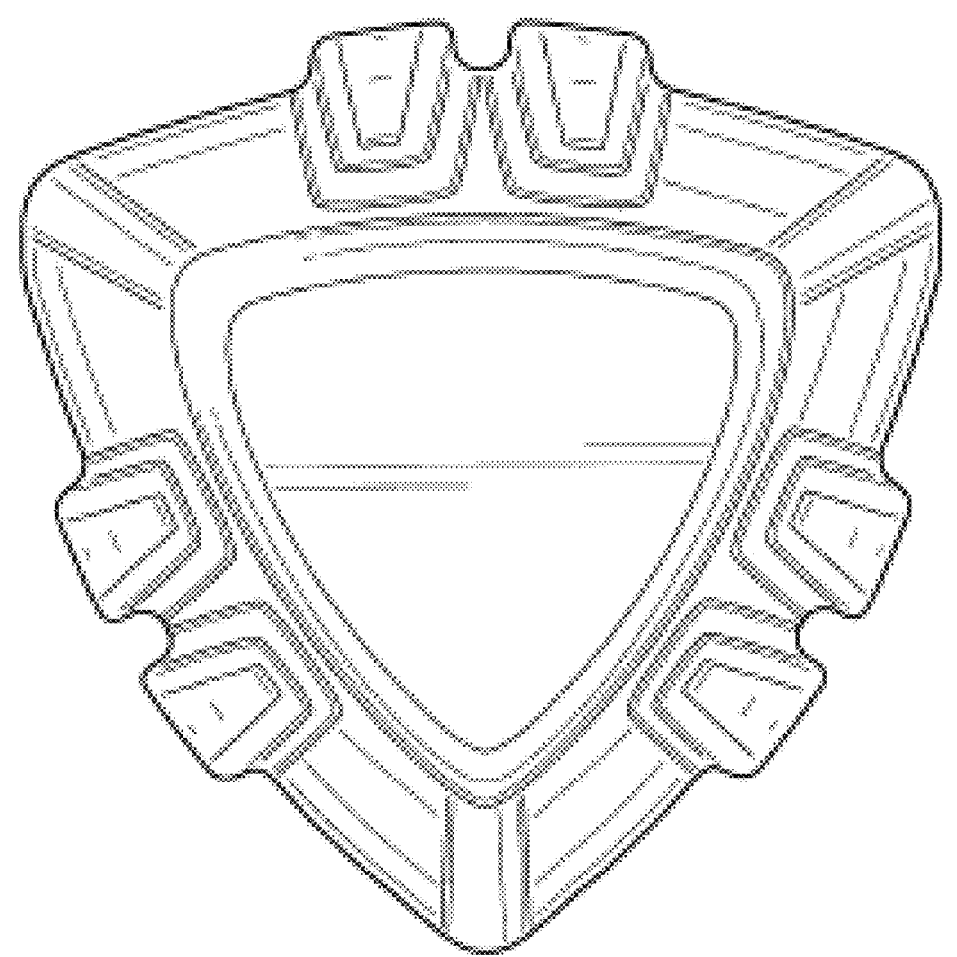
FIG. 21 is a bottom plan view thereof.

During the storage and transport of the seed pod 100, the inner contents of the seed pod 100 should be protected. This may be accomplished by utilizing a lid or cover 102, as depicted in FIGS. 7 and 8, for example. Various embodi-ments for the lid 102 are possible. For example, the lid 102 may be a removable lid that the end user removes prior to or after planting the seed pod 100. In another embodiment, the lid 102 may be a biodegradable lid that may or may not be removed after planting the seed pod 100 into the planting surface. The lid 102 may be affixed to the flange 116 of the outer shell 114 by an adhesive. The adhesive may be a natural or synthetic adhesive. In an embodiment, if the lid 102 is removed from the seed pod 100, the act of removing the lid 102 may remove all or most of the adhesive material.

Various materials may be used to make the lid 102. In one embodiment, the lid 102 is a removable or biodegradable lid. The lid 102 may be made of a material such as, but not limited to, paper, paper board, fiber based, a biofilm, poly-mer based, plastic, aluminum, polyvinyl alcohol, polypro-pylene, starch, paraffin based material, or combinations thereof.

In another embodiment, the lid 102 provides the user with printed instructions for planting the seed pod 100. In another embodiment, the lid 102 provides a plant identification marker, such that when the seed pod 100 is planted, it identifies the type of seed 112 planted. In another embodi-ment, there may be one or more lids 102 present on the seed pod 100.

In another embodiment, the lid 102 may be comprised of layers 104 which allow the user to peel back one layer 104A to reveal a second layer 104B containing printed instructions for planting the seed pod 100 or a plant identification marker, while keeping the seed pod 100 sealed.

G. Seed Pod Kits

FIGS. 27-32 depict exemplary embodiments 120A, 120B, 120C, 120D, 120E, and 120F of a carrying tray 120. The carrying tray 120 provides for appropriate placement of seed pod 100 by a specified or predetermined distance in the planting surface. According to an exemplary embodiment, the seed pod 100 may be sold and packaged individually or conglomerated into a seed pod kit comprising several seed pods of the same or different type (e.g., comprising different seed types). The kits or packages may comprise a template, tray, carrying tray or folder that provides, inter alia, appro-priate placement of seed pod by distance in the planting surface. The carrying tray may be made of cardboard or another appropriate material. Thus, in an embodiment, the carrying tray holding the seed pods is specifically adapted to hold one or more seed pods 100. The carrying tray may further comprise a handle, instruction, and/or measuring device or ruler. In an embodiment, the carrying tray may be placed onto a surface to provide a guide for the placement of the seed pods 100. Exemplary representations of the carrying tray 120A, 120B, 120C, 120D, 120E, and 120F can be seen in FIGS. 27-32. A measuring device or ruler may provide for the proper distance between the seed pods 100 that are to be pushed into the surface. This measuring device may be incorporated into the carrying tray.

H. Methods of Planting and Growing a Seed

Exemplary embodiments envision various methods of utilizing the seed pod 100. In an embodiment, a method of growing a plant comprising planting the plant growing system and watering said plant growing system is used. Such a method envisions growing the seed 112 such that the germinated seed may be subsequently transplanted. In another embodiment, a method of planting includes pushing a plant seed pod 100 into a surface, without the need for digging a hole, and watering the inserted seed pod 100. In another embodiment, planting the seed pod 100 requires preparing a surface adapted to receive the seed pod 100.

I. Indoor Growing Unit

The seed pod may also be paired with an indoor growing unit according to exemplary embodiments as described above and depicted in FIGS. 33, 42, 43, 44, 46, 50, and 59, for example.

The indoor growing unit 300 may have a stand 304, a light source 302, a base plate 308, one or more growing containers 310, one or more cloches or covers 312 to cover the growing containers 310, one or more pod trays 314 which fit in the growing containers 310, and a water reservoir 318. The unit is designed to incorporate these elements into a compact design suitable for placement on a kitchen counter. For example, the system may be placed on a kitchen counter under upper cabinets so as not to impede the most readily accessible work surface.

The indoor growing unit 300 is designed to start plants from a seed indoors, such as, for example, in a consumer's home. Plants can be started in the unit 300 and later be transplanted outdoors, or can be grown directly to harvest. For example, plants suitable for transplant include tomatoes and peppers, and plants that may be grown to harvest include salad greens and herbs. The unit 300 is designed to function with the seed pods 100 as described above, and also, according to exemplary embodiments, be used with seeds 112, such as plain vegetable seeds, that may also be planted directly into the unit into an appropriate growing media in the growing container 310. The indoor growing unit 300 is configured such that the seed pods 100 as described above can be placed either into a pod tray 314 or seeds 112 can be placed into the growing container 310 directly into appropriate growing media, such as soil, and then using the integrated light source 302 and water reservoir 318 the plant seeds 112 can be germinated and grown. It should be appreciated that the seed pods 100 or seeds 112 can be placed directly into growing media 310.

The indoor growing unit 300 is designed to be modular and transportable. For example, the base plate 308 with the water reservoir 318, growing container(s) 310 and pod tray(s) 314 may be removed from the stand 304 and light unit 302 for transport and/or use. For example, the base plate 308 may be used outdoors as a self-watering growing unit. Being used outdoors, the light source 302 may not be required. Additionally, the base plate 308 and/or growing containers 310, with or without pod trays 314, may be taken outside to adapt seedlings to temperatures and sunlight in preparation for transplant. Furthermore, this modularity allows for removal of the base plate 308 or individual growing containers 310 for easier access to plants for harvest. For example, easier access to plants for harvest, such as lettuces and herbs, may be provided by this modularity. Each growing container 310 is covered with a cloche or cover 312. According to exemplary embodiments, the cloche 312 is transparent and provides a way to retain moisture (e.g., maintain humidity) and heat within the growing container 310 to contribute to a favorable growth atmosphere for the seeds 112 in the seed pod 100 or directly planted in the growing container 310.

The unit 300 has a light unit 302 that is attached to a stand 304 through a post assembly 306. The light unit 302 may be removably mounted to the post assembly 306. The post assembly 306 is detachably mated with the stand 304. The stand 304 may have trough 326 which may be used to contain decorative elements or provide added storage space. For example, the trough 326 may be filled with rocks or other items, such as, extra pods or harvesting shears. Alternatively, the stand 304 may lack the trough 326. The trough 326 may be of a closed construction which precludes the placement of rocks or other items therein. The unit 300 may be composed primarily of plastic, such as ABS. Alternative embodiments may be composed of other durable materials, such as metal, or combinations of materials, such as metal and plastic.

The stand or base 304 of the indoor growing unit includes a base plate 308, a water reservoir 318, one or more growing containers 310, and one or more pod trays 314 in the growing containers 310. The growing containers 310 and water reservoir 318 may fit tightly over the base plate 308 to further minimize light exposure to the water in the base plate 308 to help prevent algal growth. For example, there may be three growing containers 310. Each growing container 310 can be configured to contain a number of seed pods 100 using the pod tray 314. For example, the pod tray 314 may be configured to contain up to six seed pods 100. The growing containers 310 and pod trays 314 are both removable. A moisture indicator may be used. The moisture indicator may be placed into one or more seed pods or soil in the growing container 310 (depending how the unit is configured) to indicate the moisture level which may provide an indication of the water status of the unit.

The indoor growing unit 300 may be configured such that assembly requires no tools and parts are easily snapped together and taken apart. Once transplanting or harvesting has occurred, the entire system can be disassembled for cleaning. For example, the base plate 308, the pod trays 314, and the growing containers 310 can be washed and reused for the next growing cycle to prevent contamination. The parts of the indoor growing unit 300, such as the base plate 308, the pod trays 314, and the growing containers 310 may be dishwasher safe.

Figure 33:
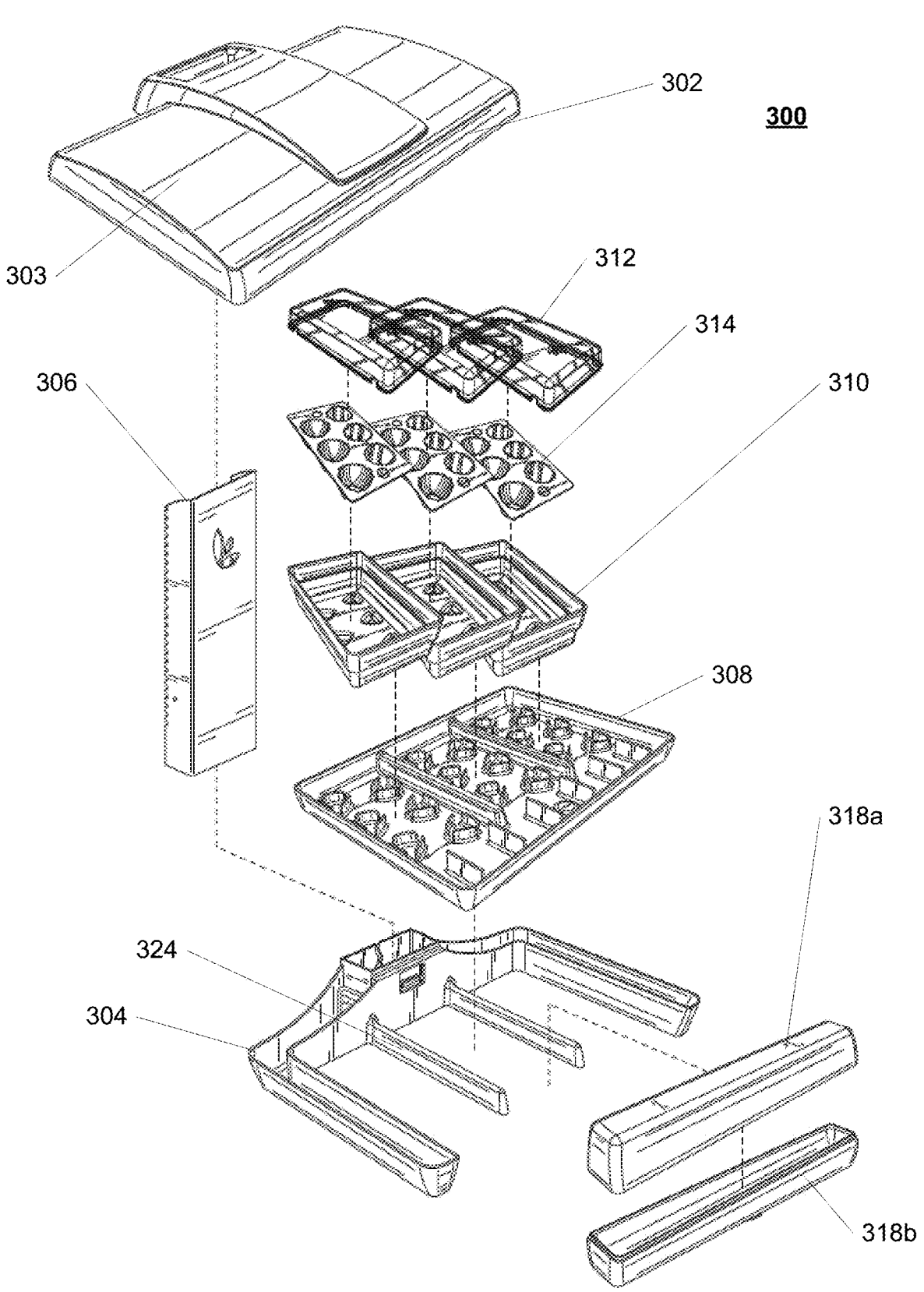
FIG. 33 depicts an exploded view of an indoor growing unit according to exemplary embodiments.
Figure 34:
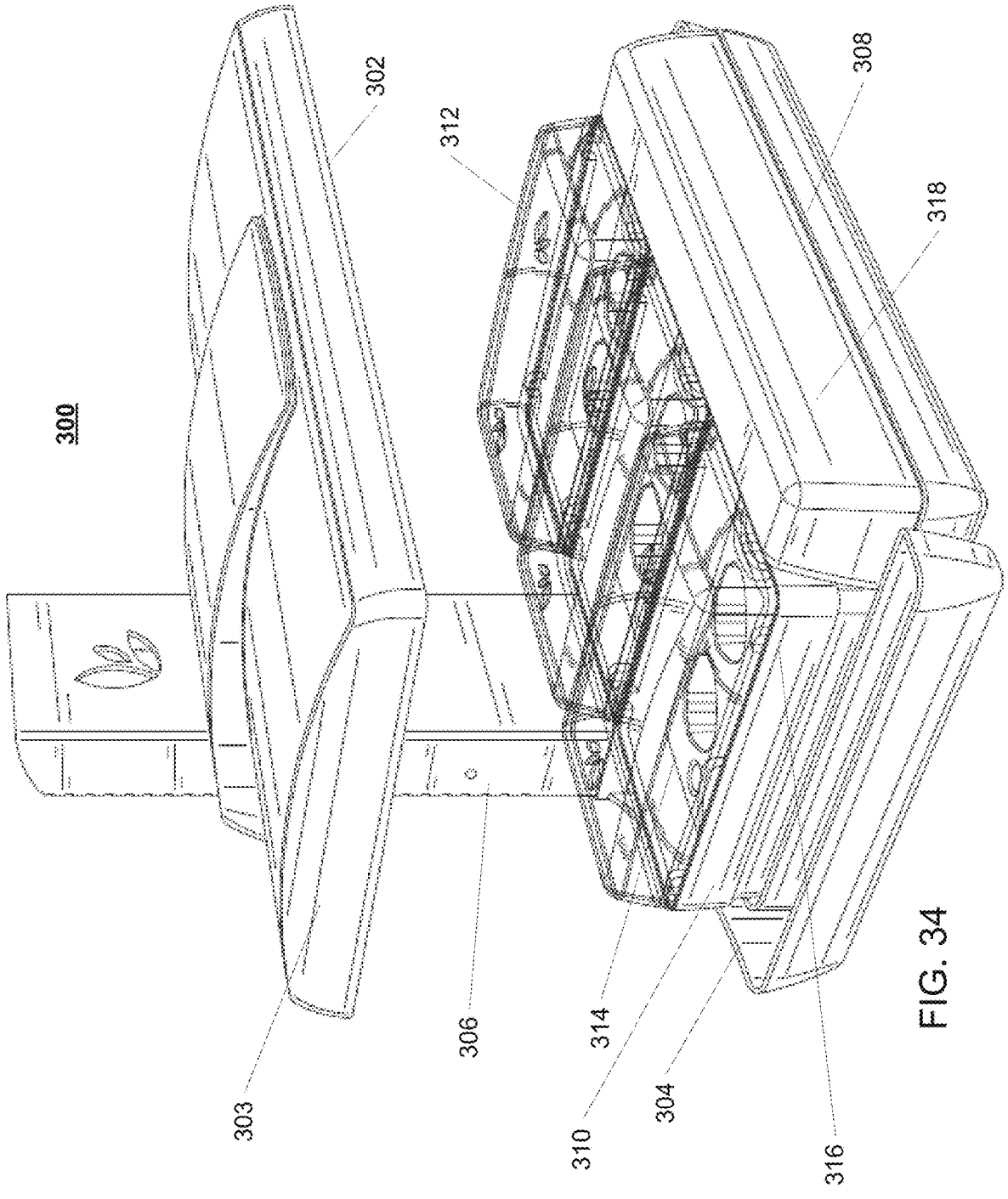
FIG. 34 depicts a front perspective view of thereof.
Figure 35:
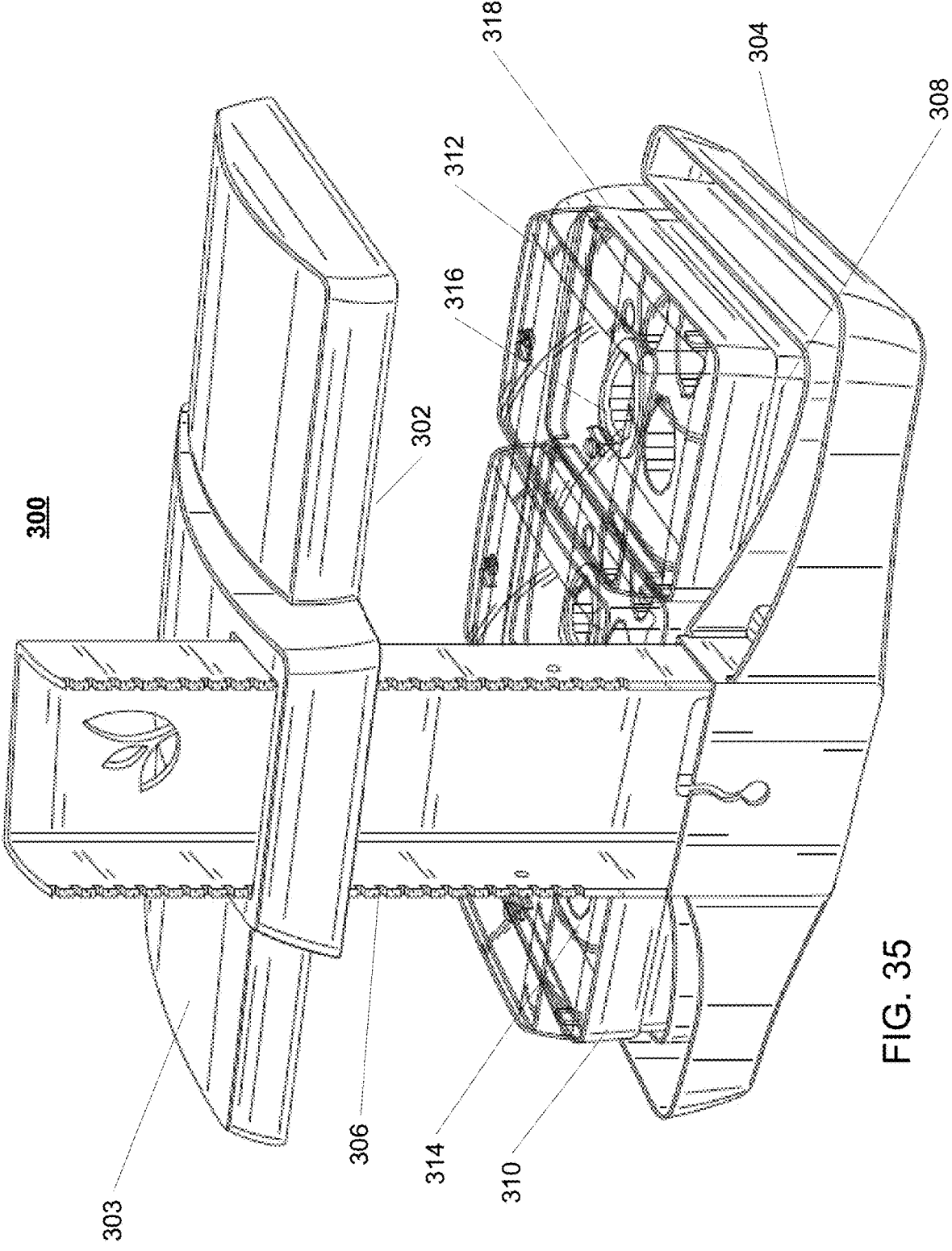
FIG. 35 depicts a rear perspective view thereof.
Figure 36:
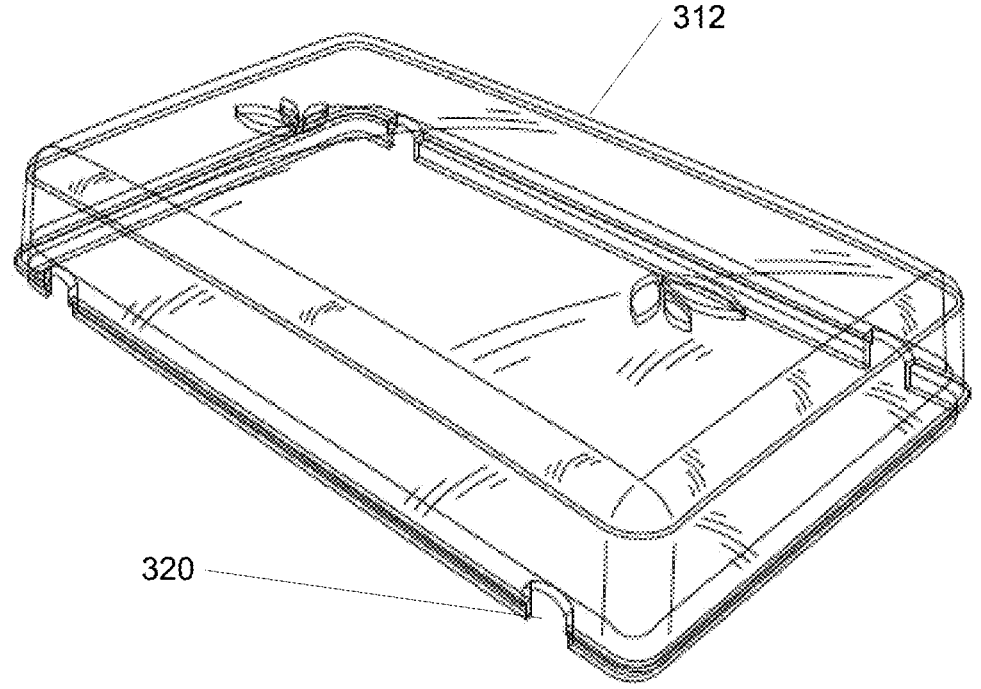
FIG. 36 depicts a perspective view of a cloche according to exemplary embodiments.
Figure 37:
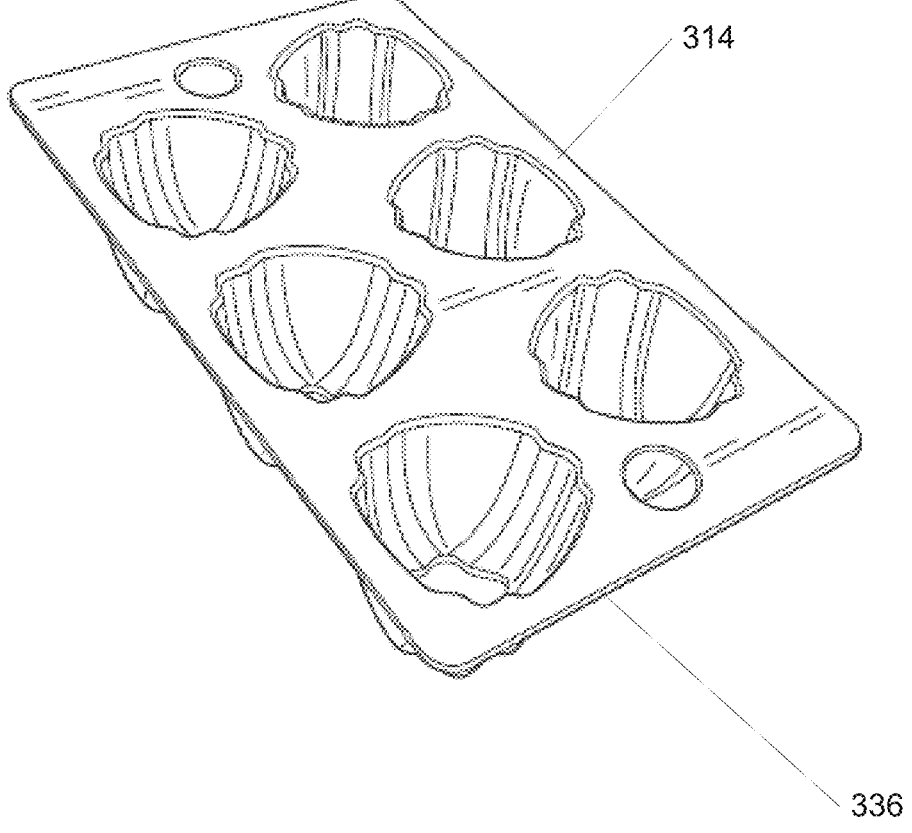
FIG. 37 depicts a perspective view of a pod tray according to exemplary embodiments.
Figure 39:
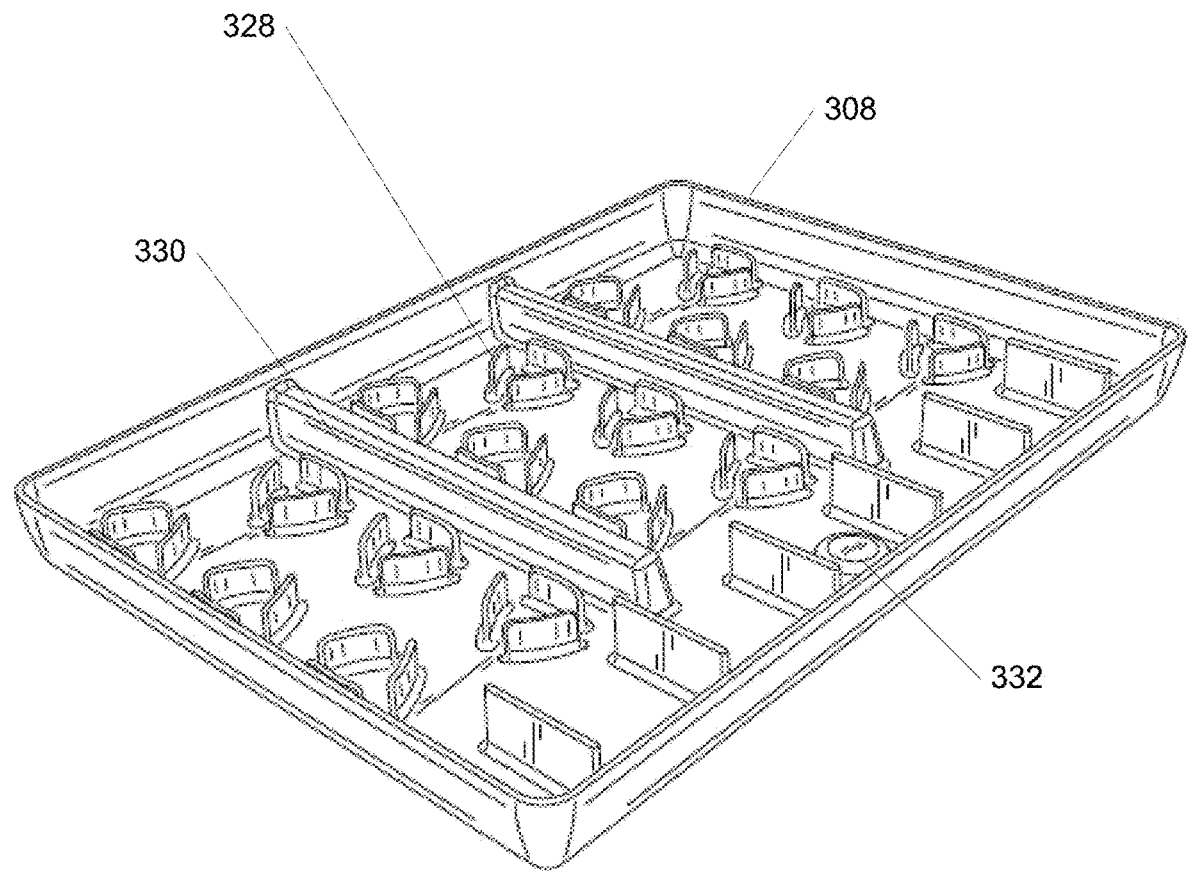
FIG. 39 depicts a perspective view of a base plate according to exemplary embodiments.
Figure 40:
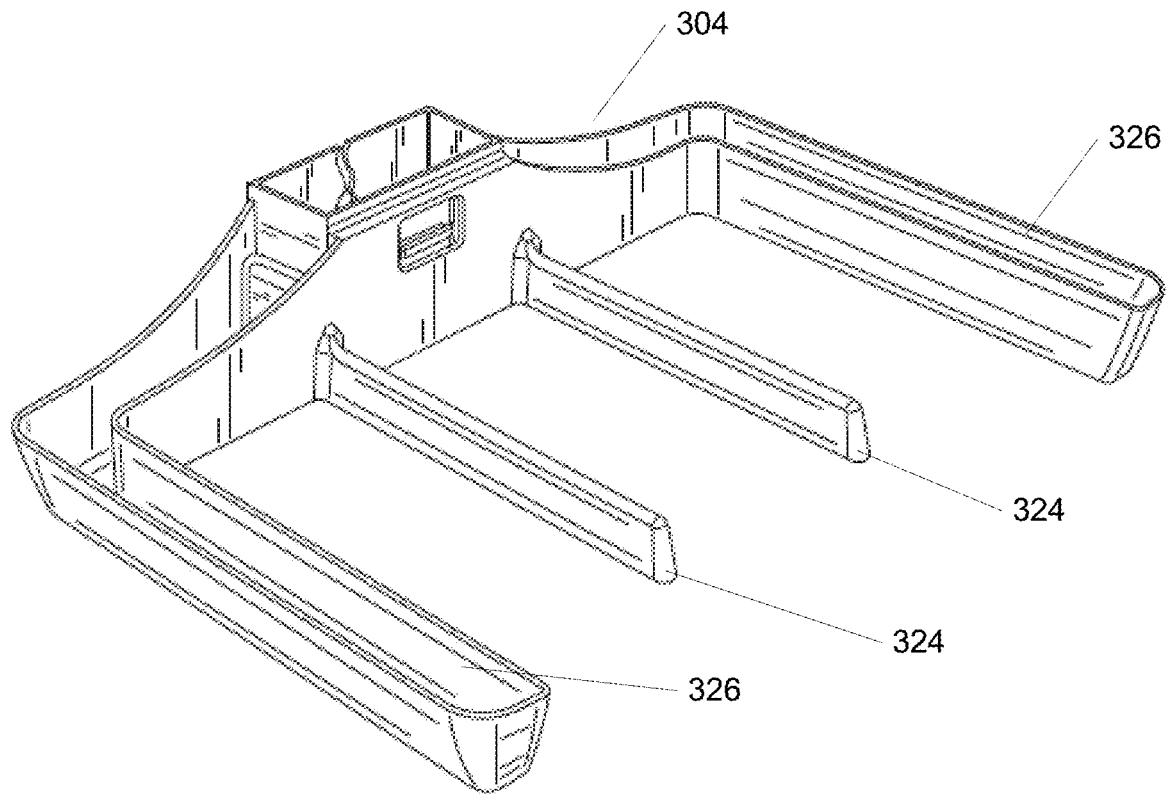
FIG. 40 depicts a perspective view of a stand according to exemplary embodiments.

The indoor growing unit 300 has a base plate 308. The base plate 308, as depicted in FIG. 39, is configured to fit over the inner two projections 324 of the stand 304 as depicted in FIG. 33, which show this integration and FIG. 40 shows the stand 304 with the inner two projections 324. The base plate 308 is configured to accommodate at least one growing container 310. According to exemplary embodiments, three growing containers 310 may be used with the base plate 308. Each growing container 310 may have a cover or grow dome 312. As depicted in FIG. 36, the cover 312 may be transparent. The cover 312 may be made of plastic or another suitable material. Within each growing container 310, may be a pod tray 314. The pod tray 314 may be configured to hold a plurality of seed pods. For example, each pod tray 314 may hold up to six seed pods 100. The base plate 308 has a water tank or reservoir 318. It should be appreciated that each growing container 310, each cover 312, each pod tray 314, and the water reservoir 318 may be removable from the base plate 308.

According to exemplary embodiments, the indoor growing unit 300 is designed to meet plant physiological needs and may have two, T-5 lights in the light unit 302 that provide the proper light quality and quantity for best plant growth. The lights may be programmable to run for a particular length of time, without the need for manually turning on/off of the lights. For example, the lights may run on 16 hour days with a nightly rest period to support plant photosynthesis and respiration needs. The light hood is adjustable, allowing the light to easily be moved to the proper distance above the growing portion or plant canopy for optimum growing conditions.

The light unit 302 may be movable on the post assembly 306 such that the vertical height of the light unit 302 may be adjusted. For example, the light unit 302 may be adjustable using a ratchet type system. Furthermore, the light unit 302 may be movable in other axes to allow positioning the light unit 302. The light unit 302 has, on its underside, one or more light sources. The light sources may be light bulbs or tubes as appreciated by one of ordinary skill in the art. The light unit 302 may accommodate differing types of light sources such as fluorescent, LED, halogen, and incandescent. Specialized agricultural and/or horticultural lights may be used. For example, the light unit may have two lights that are grow lights that offer full spectrum lighting in the appropriate temperature to support plant growth. The two lights may have a color temperature appropriate for plant growth. For example, the lights may be T5HO lights from Sunblaster, Inc. According to exemplary embodiments, the lights may be 24 watts and have a color temperature of 6400K. In some embodiments, other types of lights may be used that operate at other wattages and color temperature. For example, 2700K or 10,000K T5 type lights may be used. The lights used in the light unit 302 may be white lights but it should be appreciated that other colors may be used as appropriate.

The light unit 302 may have one or more reflectors. The reflectors may be made of plastic and may be lined with a reflective material, such as, for example, a Mylar material. The reflector may be configured to mimic the curvature of the T-5 bulb, effectively reflecting the light downward towards the growing containers. For example, the light unit 302 may have two reflectors, one for each of the two light bulbs. For example, a T5HO nanotech reflector from Sunblaster, Inc. may be used with each light. It should be appreciated that other types of reflectors may be used.

The light unit 302 may be powered through a power source. For example, the light unit 302 may have a power cord (not shown), which may be contained within the stand/or post assembly, for plugging into an outlet. The light unit may incorporate a mechanism, such as an electronic or mechanical timer, for programming the on/off light period automatically.

The light unit 302 has a hood portion 303 that encloses the lights. The hood portion 303 may adjustable by tilting the hood 303 up and sliding it up and down along the neck 306. The neck 306 has notches that allow the hood 303 to be secured in place at the desired height. Alternatively, different adjustment mechanisms may be used. For example, friction pads may hold the hood 302 at a desired height using gravity. Alternatively, a tightening screw or knob or series of pegs and holes may serve to secure the light at a desired height. The indoor growing unit 300 also has a watering reservoir 318, which provides a constant water table for moisture wicking from the growing media or seed pods 100. The water reservoir 318 is contained so as to provide a barrier from and positioned away from the light source for added safety. The water reservoir 318 is designed to contain a quantity of water that is dispensed from the reservoir through a cap (not shown) which covers opening 319. The cap may have a spring loaded outlet or valve that is actuated when the reservoir is placed into the base. The water is dispensed directly into the base plate. The reservoir 318 is configured such that water flows from the reservoir 318 to maintain a particular depth of water in the base of the indoor growing unit. For example, the water depth may be maintained at ½ inch. This water level allows moisture to be drawn up as the growing media or seed pod needs it, helping solve consumer issues of over or under watering. The reservoir 318 also allows consumers to spend less time watering and have a greater amount of time in between watering. The water reservoir 318 is removable from the unit 300 and can be refilled by a user and then replaced in the unit, rather than requiring the consumer to move the entire unit or bring water to the unit to refill the water reservoir 318. To refill the water reservoir 318, water is filled through the cap, which is removable, and then water can be filled into the opening 319. The water reservoir 318 is further designed to not leak or spill once filled and water will only exit the reservoir once placed into the growing unit and the cap is actuated. The water reservoir 318 may be opaque (such as shown for example in FIG. 50 (water reservoir 2119) or its material may contain an additive to block or otherwise minimize light from reaching the water, thereby helping to prevent algal growth. The water reservoir 318 may be transparent as shown, for example, in FIG. 49 (water reservoir 2118). The water reservoir 318 may incorporate a visual water level indicator to allow visual inspection of the reservoir's water level. For example, a visual inspection port or strip may be used, a gauge may be used, or the water reservoir may be partially or completely transparent.

Figure 41:
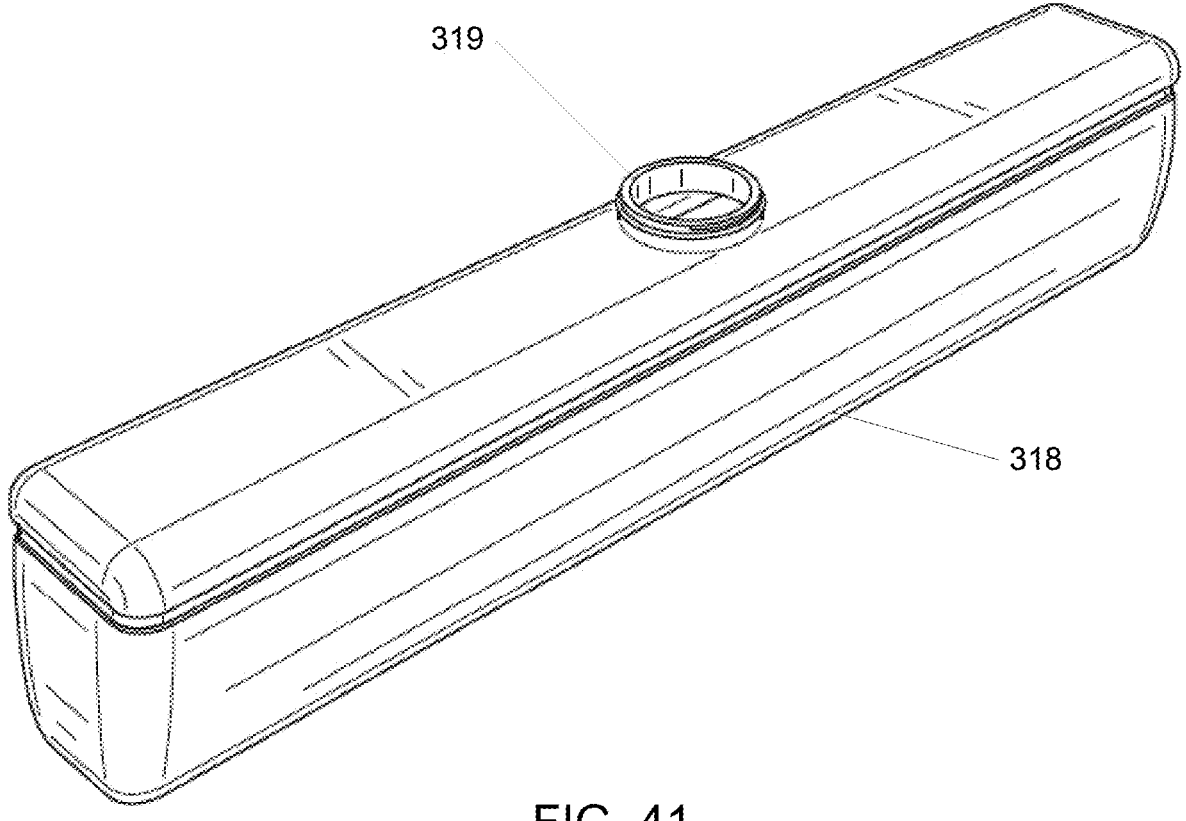
FIG. 41 depicts a perspective view of a water reservoir according to exemplary embodiments.

The water reservoir 318 may have an opening or inlet 319 (see FIG. 41, for example). A cap (not shown) may be used to close this opening 319 and provide flow control for water exhaust from the reservoir. The cap may have a spring loaded valve to allow for exhaust of water from the reservoir 318 into the base plate 308. The spring loaded valve may provide flow metering for water exhaust. The spring loaded valve may be actuated through contact with a circular protrusion 332 on the base plate 308. The cap may attach to the water reservoir 318 through a threaded connection as shown in the figures.

The indoor growing unit is designed to be modular and have a particular number of growing containers 310. For example, the indoor growing unit may have up to three growing containers 310. It should be appreciated that other numbers of growing containers 310 are possible. These growing containers 310 may be alternatively referred to as grow trays. Each growing container 310 may contain a pod tray 314. This modularity provides flexibility for different growing configurations. For example, one growing container 310 could be utilized to start transplants using a pod tray 314 while the other two growing containers 310 could be used to grow herbs to harvest in growing media, using seed pods, or seeds. The growing containers 310 are dimensionally deep enough to provide enough growing media for healthy root growth and development and growing space is optimized for growing plants either to harvest or transport. The growing containers 310 are rectangular with hollow pedestals 322. According to exemplary embodiments, each growing container 310 may have six hollow pedestals 322 with holes in their bottom portion that allow water to enter the pedestal. Through these holes, water is allowed to directly contact with the seed pod or growing media. Through this contact, a wicking action may be established to allow for the water to provide moisture to the seed pod or the growing media supporting plant germination and growth. It should be appreciated that each of the six hollow pedestals 322 may be covered by a permeable or semi-permeable mesh to prevent growing media from exiting through the opening but still allow water to wick from the base plate 308 to the growing media in the growing container 310.

To support transplant growing, the pod tray 314 may be used, which simplifies the transplant experience. This pod tray 314 is designed to receive and hold plurality of seed pods. For example, each tray may hold up to six seed pods. The pod tray 314 suspends the seed pods without growing media in the growing container 310 and allows the tips of the pods to touch the water that is located at the bottom of the growing container 310 through the hole in the bottom portion of the pedestal feet 322 as described above. The pod tray 314 is supported in the growing container 310 by a flange 336 with is configured to rest on an inner lip 338 of the growing container 310. The pod tray 314 is thus suspended at a predetermined height for proper exposure of the tips of the seed pods to water by way of resting on the inner lip 338 surrounding the inside perimeter of the growing container 310. Further, the openings in the bottom of the pod tray allow proper water uptake and root growth while the tray itself maintains the seed pod shape. The seed pods can be easily pushed out of the pod tray from these holes in the bottom to release the seed pod for transplant in another container or garden.

To support growing to harvest, the growing container 310 may be used without the pod tray 314 and is filled with a growing media. The growing media fills growing container 310 and the growing media is in communication with the water in the base plate 308 through the holes in the bottom of each of the pedestals. Seed pods may be planted directly into growing media. Alternatively, seeds could also be planted in the growing container 310 directly into the growing media.

Each growing container 310 has a cover or cloche 312. The cover 312 is designed to trap heat and moisture in the growing container 310 because having a warm and moist environment can increase the speed of germination. The cover 312 has several vents along the side and top, which allow for removal of excess heat and moisture.

The base plate 308 may have a series of raised projections 328. These raised projections 328 support the underside of the growing container 310 to provide for proper placement of each growing container and may serve to support the bottom surface of the growing containers, suspending the growing containers at the optimum height for interaction of the soil or seed pod tips with the water contained in the base plate 308.

Alternatively, the raised projections 328 may mate with the pedestals 322 of each growing container 310 to provide for proper placement and to secure the growing container 310. The base plate 308 may have also have raised portions 330 which accommodate the inner projections 324 of the stand 304. The base plate 308 has a circular protrusion 332 which is configured to actuate the valve in the cap of the water reservoir as described above.

It should be appreciated that the unit may be portable and can be moved without disassembly. Alternatively, the base plate 308, with any growing containers 310 and the water reservoir 318 can be moved. For example, the base plate 308 and its contents may be moved to an exterior location where the stand and light unit are not required.

It should further be appreciated the positioning and structure of the various components is exemplary. Changes in structure, size, shape, and positioning may be possible. In some embodiments, the indoor growing unit 300 may lack the reservoir 318, the pod tray 314, and the cover 312. In these embodiments, for example, water may be added directly to the base unit 308.

Figure 42:
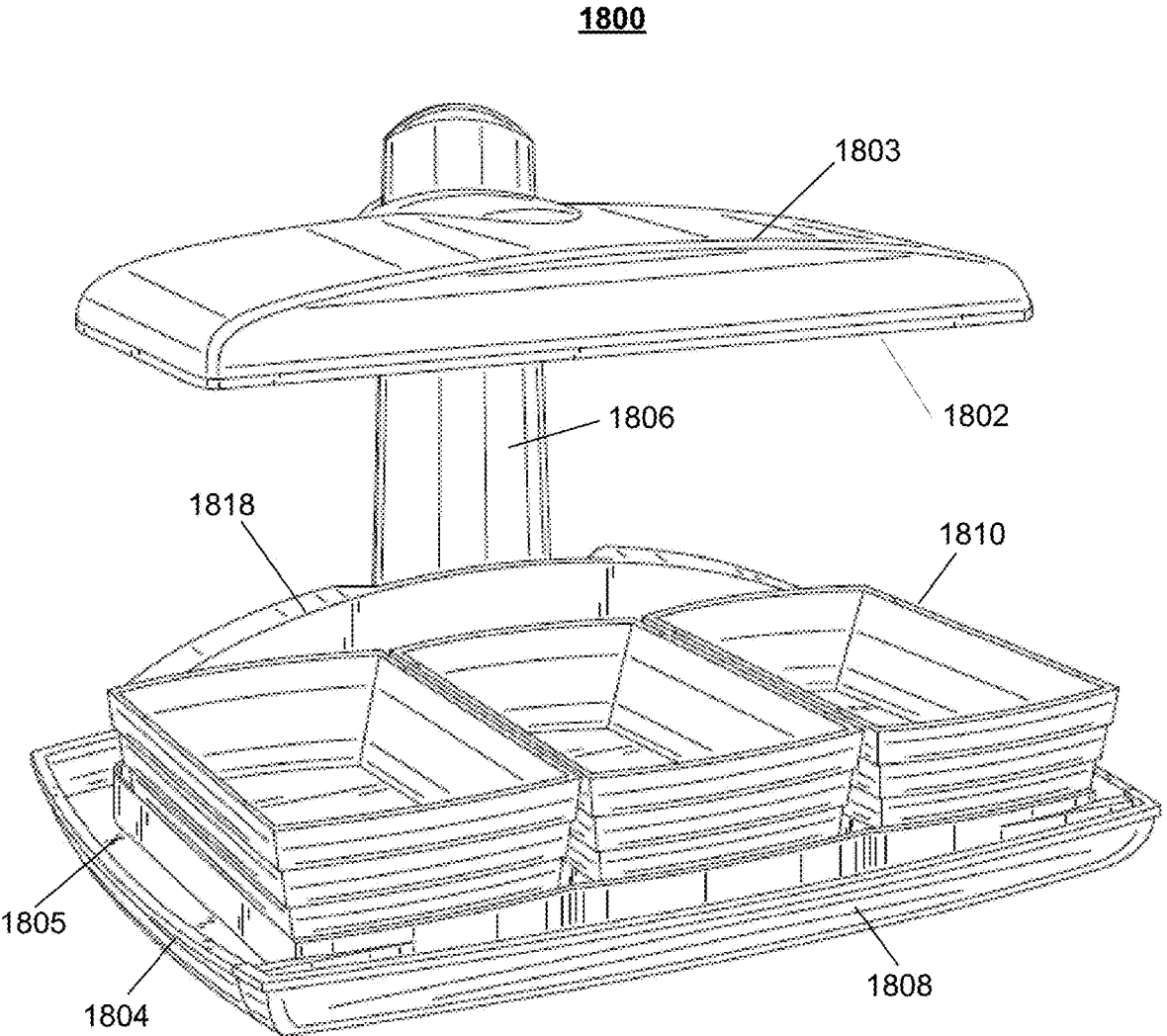
FIG. 42 depicts a front perspective view of a second embodiment of an indoor growing unit according to exemplary embodiments.
Figure 43:
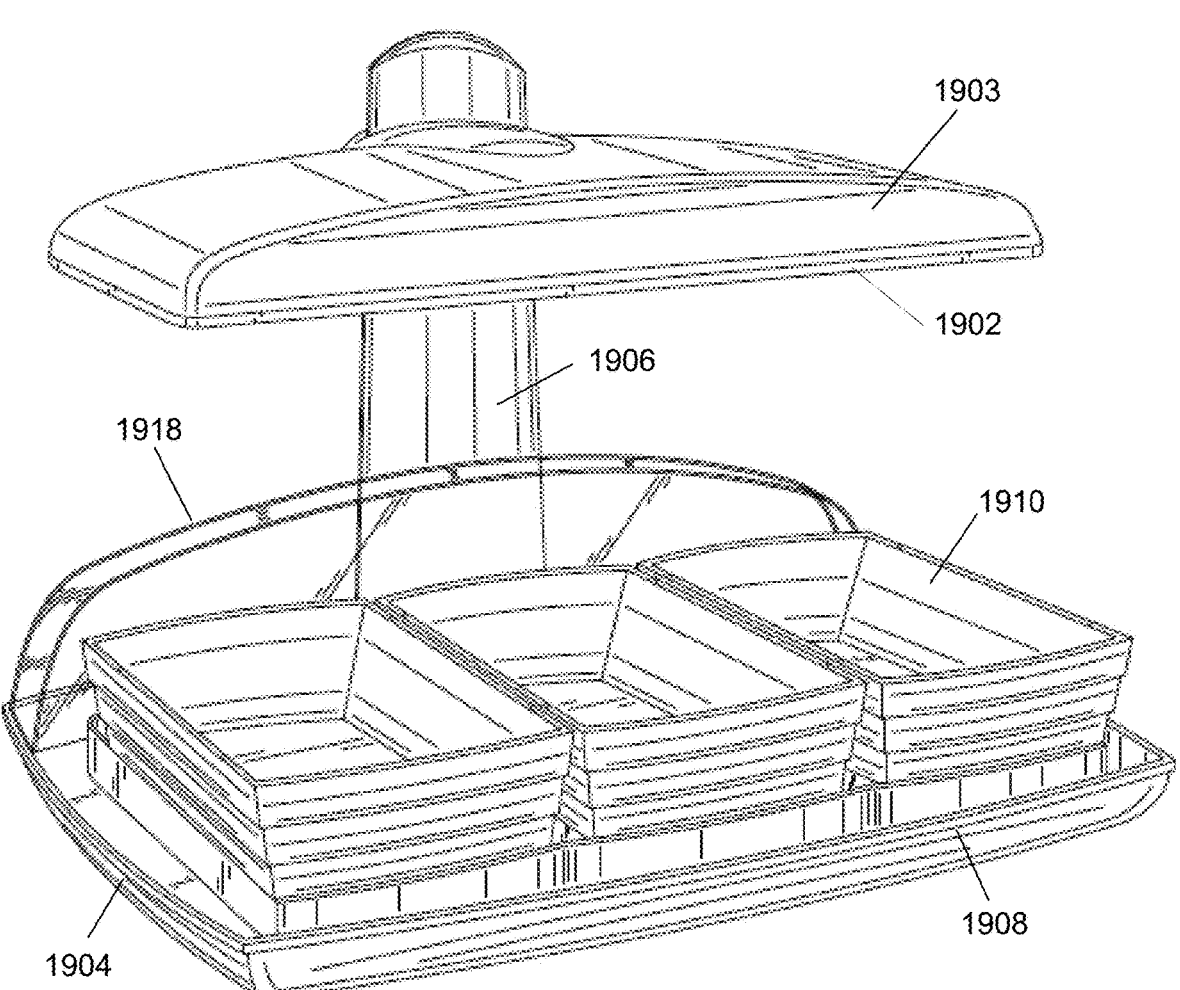
FIG. 43 depicts a front perspective view of a third embodiment of an indoor growing unit according to exemplary embodiments.
Figure 44:
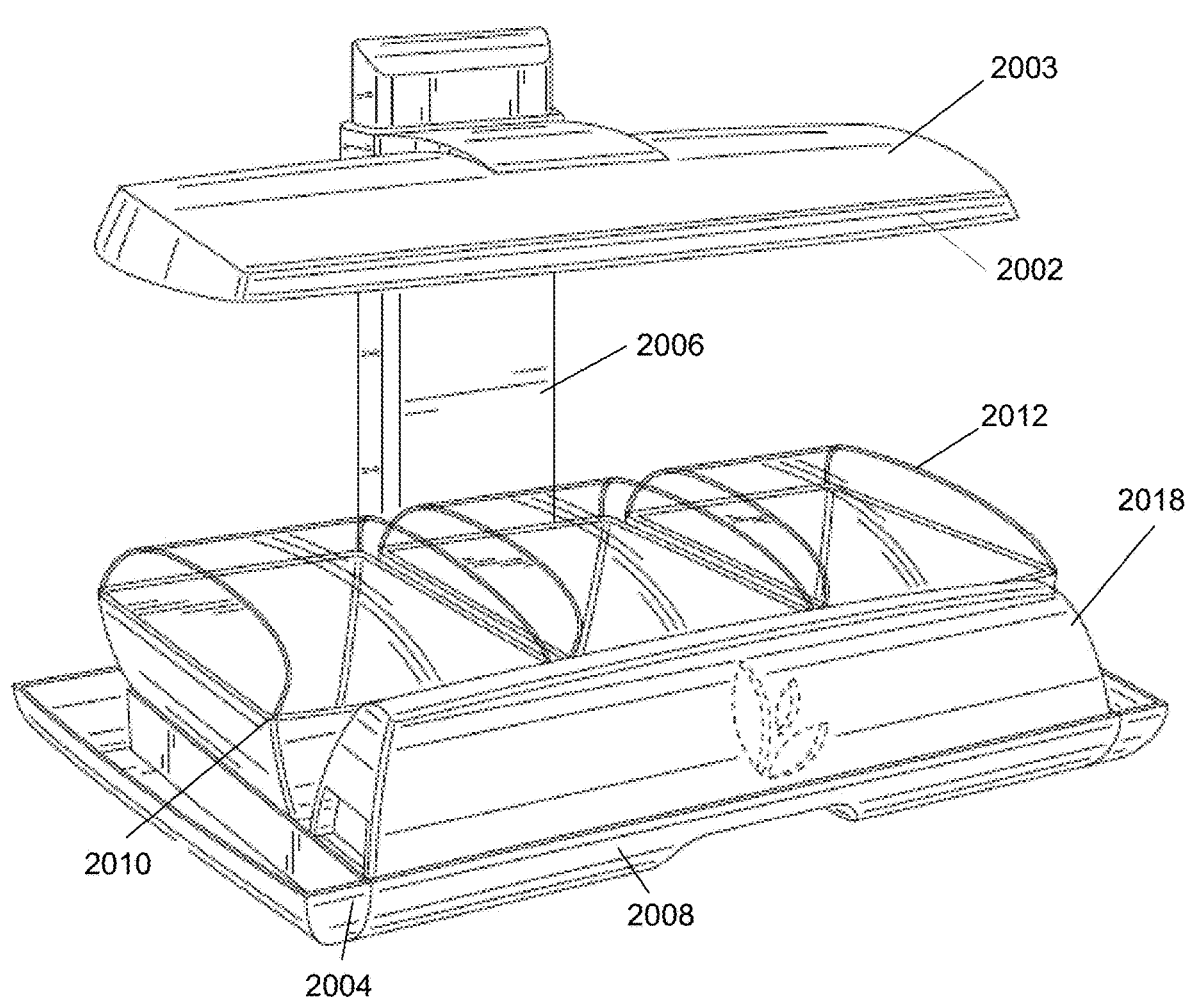
FIG. 44 depicts a front perspective view of a fourth embodiment of an indoor growing unit according to exemplary embodiments.
Figure 45:
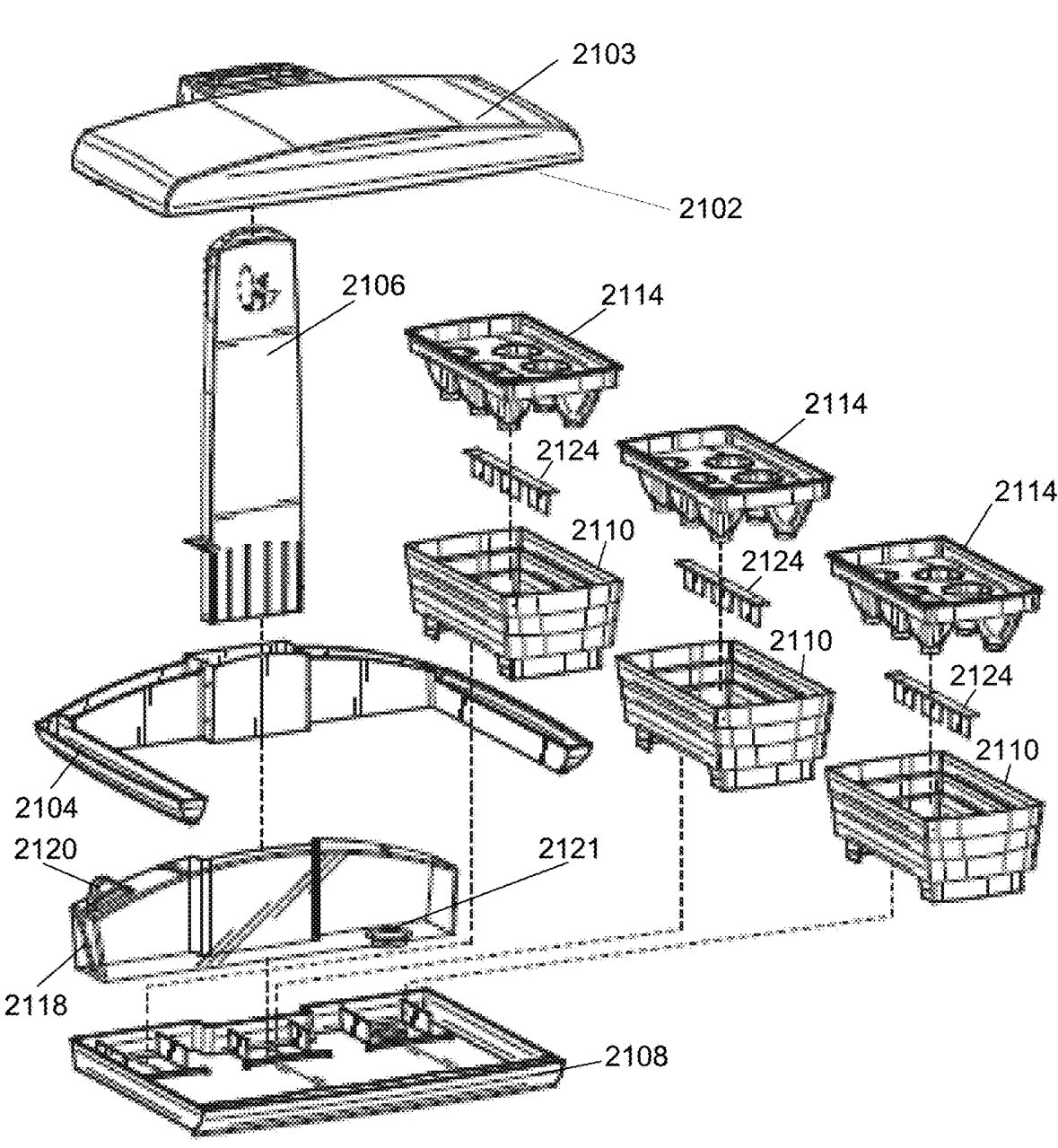
FIG. 45 is an exploded parts view showing the components of a fifth embodiment of an indoor growing unit according to exemplary embodiments
Figure 46:
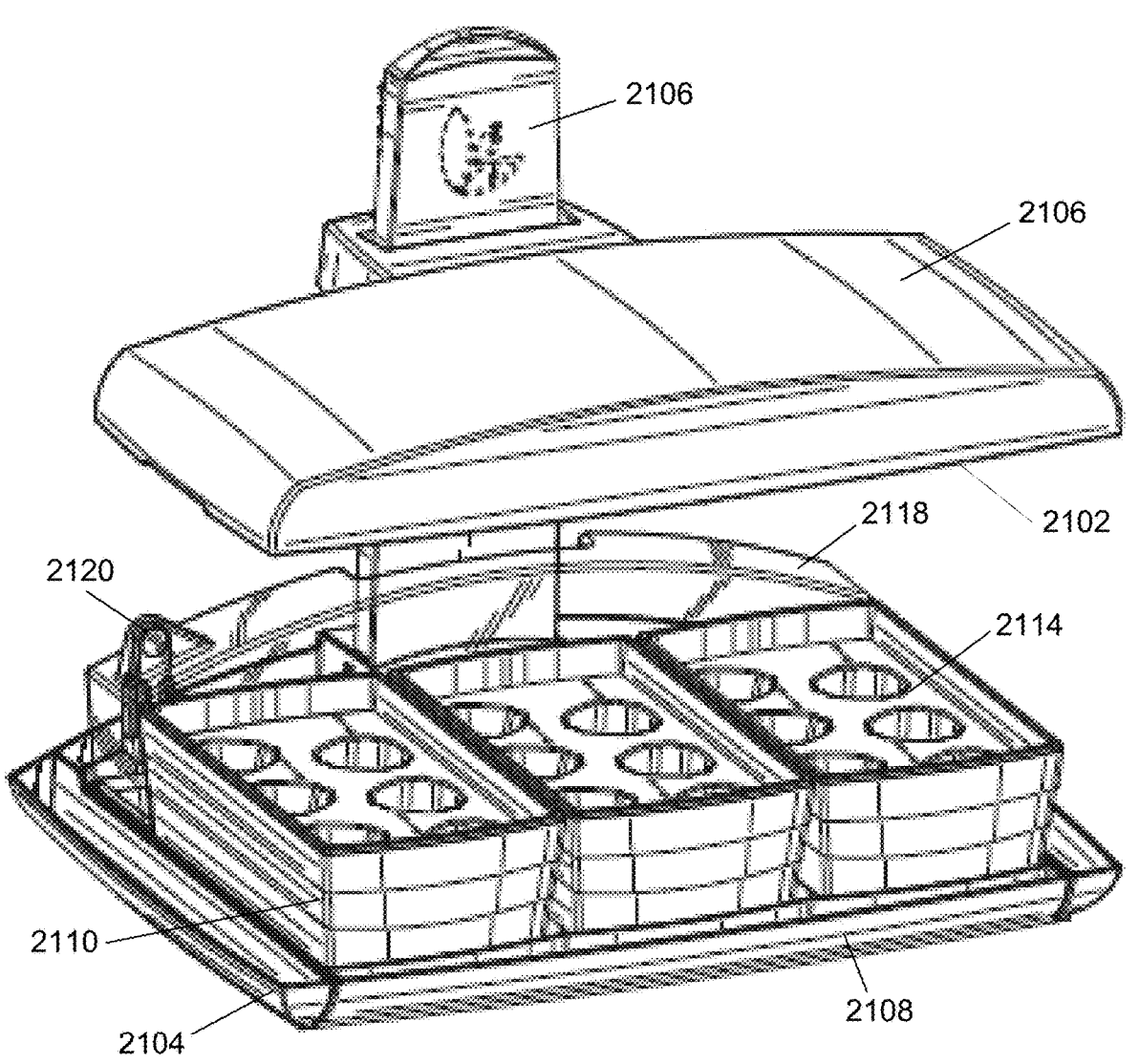
FIG. 46 is a front perspective view of thereof.
Figure 47:
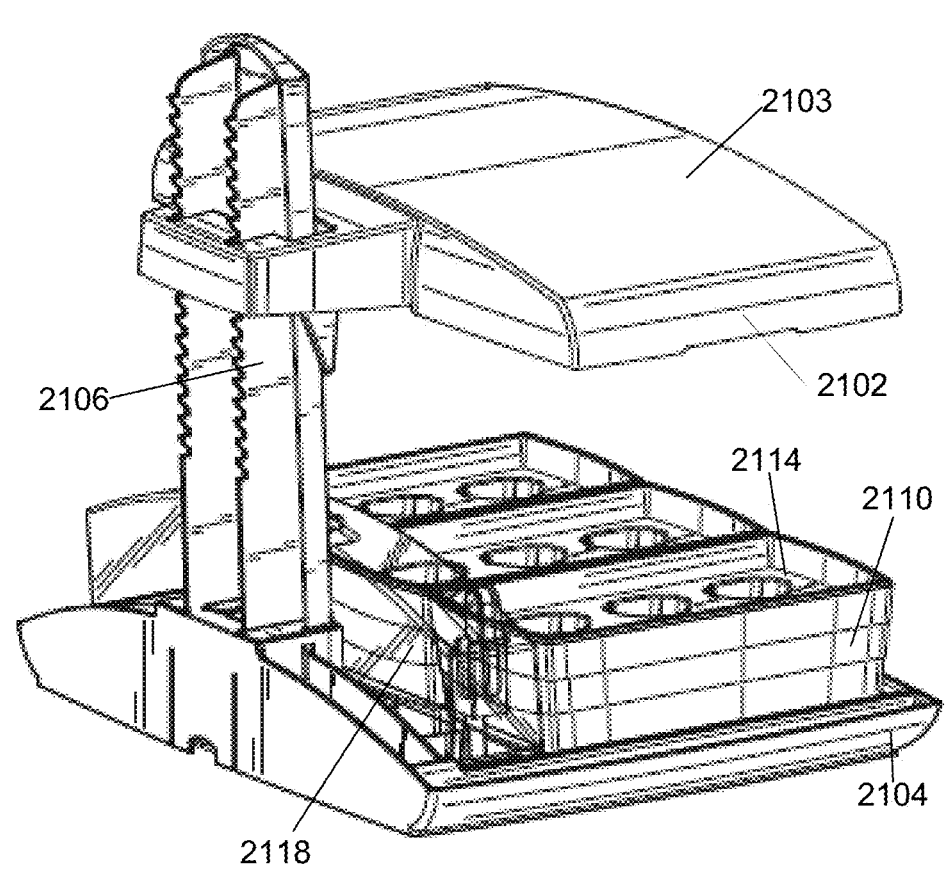
FIG. 47 is a rear perspective view thereof.
Figure 48:
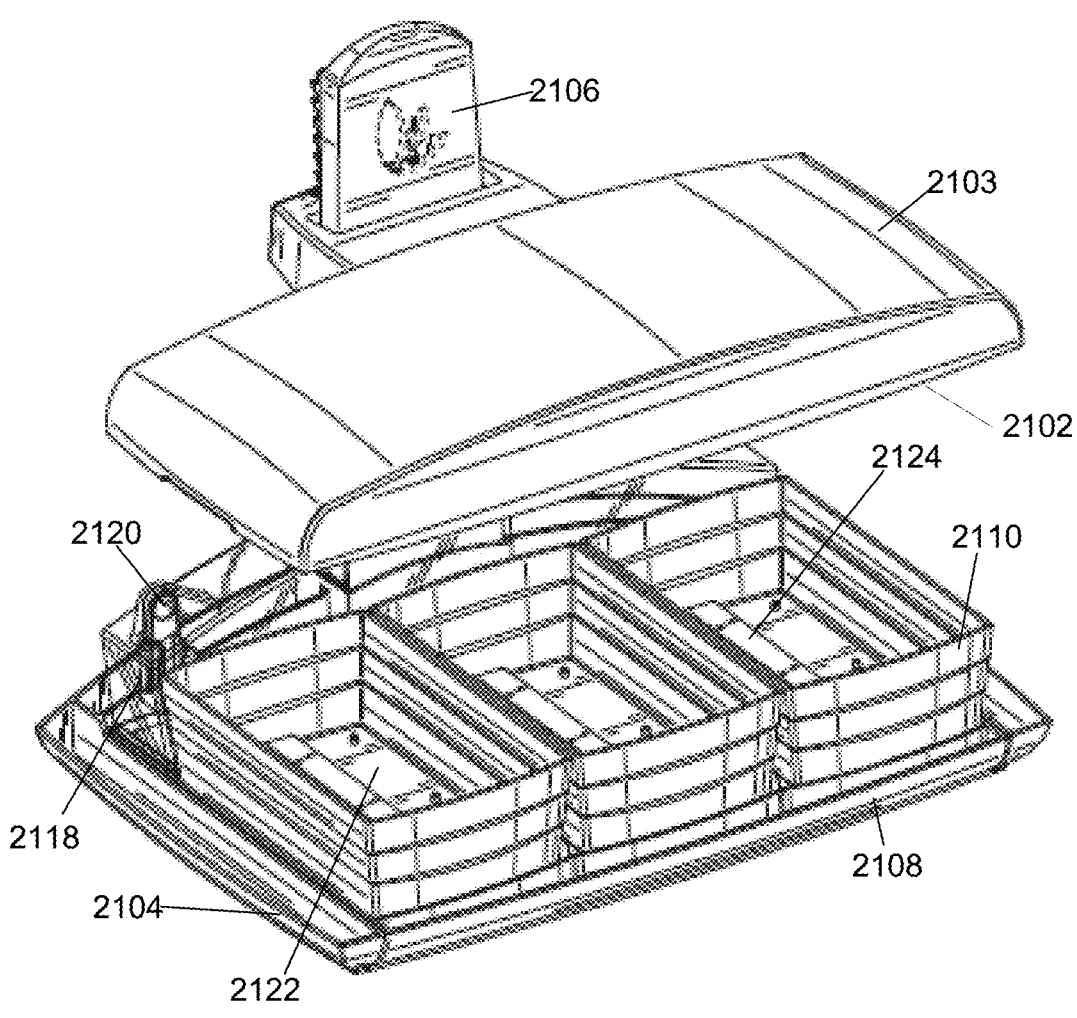
FIG. 48 is a front perspective view thereof with the pod trays from the growing trays removed.

For example, FIG. 42 depicts an indoor unit 1800 according to exemplary embodiments, with differing structure from the unit 300, such as, for example, having a water reservoir 1818 being located at the rear of the unit. This and other differences may be appreciated from FIG. 42 also. Unit 1800 is also shown lacking covers 312 (although such covers could be included). FIG. 43 depicts another exemplary embodiment 1900 with a transparent water reservoir 1918 located at the rear of the unit. It should be appreciated that, as described above, the water reservoir 318 may be transparent. Unit 1900 is also shown lacking covers 312 (although such covers could be included). FIG. 44 depicts another exemplary embodiment 2000 that has similar parts to the other embodiments. FIGS. 45-54 depict another exemplary embodiment 2100 that uses a capillary mat structure to provide wicking of water between the base unit and the seed pods. FIGS. 59-62 depict yet another exemplary embodiment that lacks a separate water tank and has a divider structure for support of the seed pods in the growing containers.

It should be appreciated however that the various embodiments of the indoor growing unit depicted herein may also include the various features described above with respect to the indoor unit 300 to the extent that such features are not described below. The descriptions of the various embodiments of the indoor growing units may focus on the differences and other features for each embodiment. For example, each of the various indoor growing unit embodiments may include the lights and associated reflectors as described above. In some embodiments, the features may be modified or structurally different but perform the same or similar functions to those described above for the indoor unit 300. For example, a different type of light and/or reflector may be used or a different type of watering system may be used.

FIG. 42 depicts an indoor growing unit 1800 according to exemplary embodiments. The unit 1800 has a light unit 1802 that is attached to a stand 1804 through a post assembly 1806. The light unit 1802 may be removably mounted to the post assembly 1806. The post assembly 1806 is detachably mated with the stand 1804. The stand 1804 may have trough 1805 which may be used to contain decorative elements or provide added storage space. For example, the trough 1805 may be filled with rocks or other items, such as, extra pods or harvesting shears. Alternatively, the stand 1804 may lack the trough 1805.

The indoor growing unit 1800 has a base plate 1808. The base plate 1808 is configured to accommodate at least one growing container 1810. According to exemplary embodiments, three growing containers 1810 may be used with the base plate 1808. Each growing container 1810 may have a cover or grow dome (not shown). Within each growing container 1810 may be a pod tray. The pod tray may be configured to hold a plurality of seed pods as described above. For example, each pod tray may hold up to six seed pods. The base plate 1808 has a water tank or reservoir 1818. It should be appreciated that each growing container 1810, each cover, each pod tray, and the water reservoir 1818 may be removable from the base plate 1808.

The water reservoir 1818 may have a water level indicator (not shown). The water level indicator indicates the water level in the water reservoir. The water level indicator may be transparent or opaque. This indicator may be a float type indicator. It should be appreciated that other water level indicators may be used.

In FIGS. 43-44 depict additional exemplary embodiments of the indoor unit as described above, such as indoor unit 1900 and 2000. These indoor units have similar features to those of indoor unit 1800, with similar structures labeled with similar reference numbers having a "19" or "20" prefix instead of "18."

Figure 49:
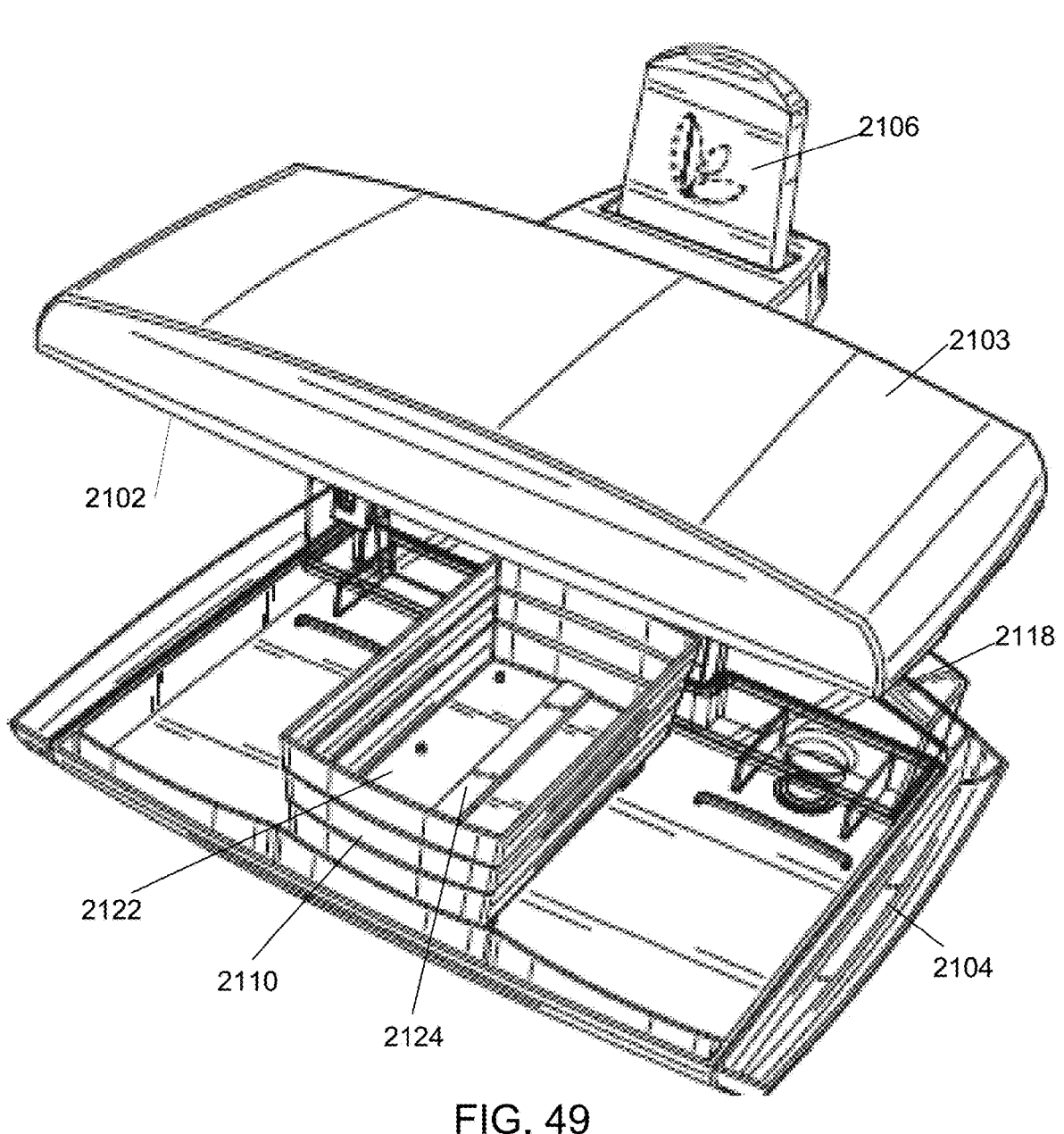
FIG. 49 is a front perspective view thereof with two of the growing trays removed and the pod tray removed.
Figure 50:
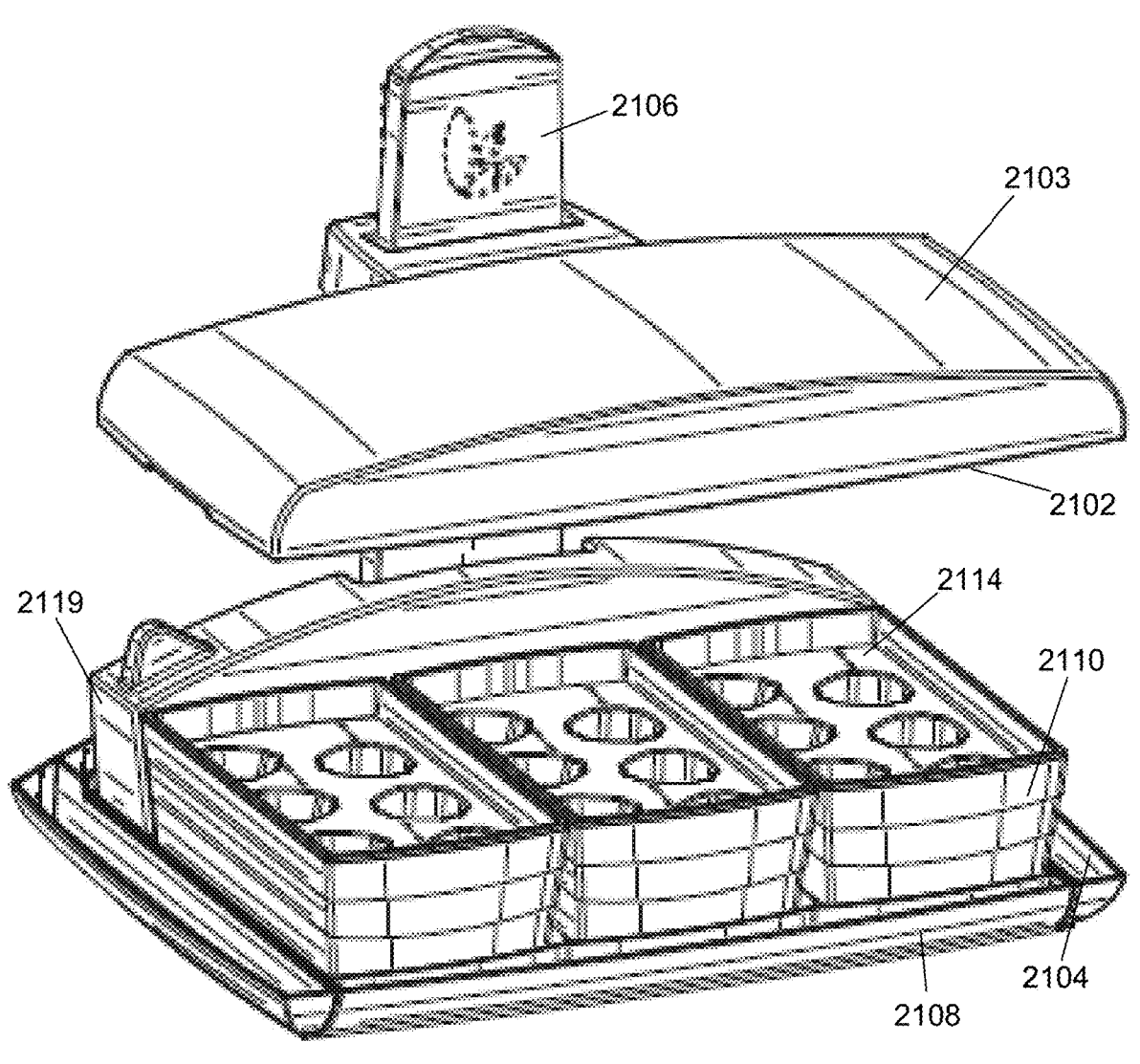
FIG. 50 is a front perspective view of a sixth embodiment of an indoor growing unit according to exemplary embodiments.

FIGS. 45-54 depict an indoor unit 2100. The indoor unit 2100 is depicted with a capillary mat 2122 secured by a securing bar 2124 in place in the bottom of the growing container 2110. This capillary mat 2122 and securing bar 2124 may be present in each growing container 2110 or in a subset of the growing containers. The capillary mat 2122 may be made of a material capable of absorbing and wicking water. The capillary mat 2122 may be reusable for multiple growing sessions or uses of the unit 2100. The capillary mat 2122 may have a certain lifespan after which it requires replacement. The capillary mat 2122 may be of a rectangular shape that is configured to be indented or folded down a central portion. This fold allows for the securing bar 2124 to be placed within the fold to secure and press down the capillary mat into the growing container 2110. The growing container 2110 may have a slot or other opening in its base to allow the capillary mat 2122 with the securing bar 2124 to extend through the growing container's base. In this manner, the capillary mat 2122 may be placed in contact with the water present in the base 2108. Through this contact, water may be wicked or otherwise caused to migrate from the base 2108, through the capillary mat 2122 to either the growing media in which the seed pods or seed is planted in the growing container 2110 or to the seed pod tray 314. The seed pod tray 2114 may rest upon the capillary mat 2122 when it is present in the growing container 2110. A seed pod 100 that is present in the seed pod tray 2114 may then have access to the water through this contact. The seed pod sits within the seed pod tray 2114 and its bottom portion may allow this contact. The unit 2100 may have water reservoir 2118. The water reservoir 2118 may be transparent. In some embodiments, the water reservoir 2119 may be opaque as shown in FIG. 50. The water reservoir may have an opening 2121. The opening 2121 may contain a cap or valve (not shown). The cap or valve may be removed to facilitate filling of the reservoir. The cap or valve may be a one-way flow device to allow water to exit the opening 2121. The water reservoir 2118 or 2119 may have a visual indicator 2120 to visually show the water level in the reservoir. The visual indicator 2120 may be a float type indicator. It should be appreciated that other types of indicators may be used.

Figure 51:
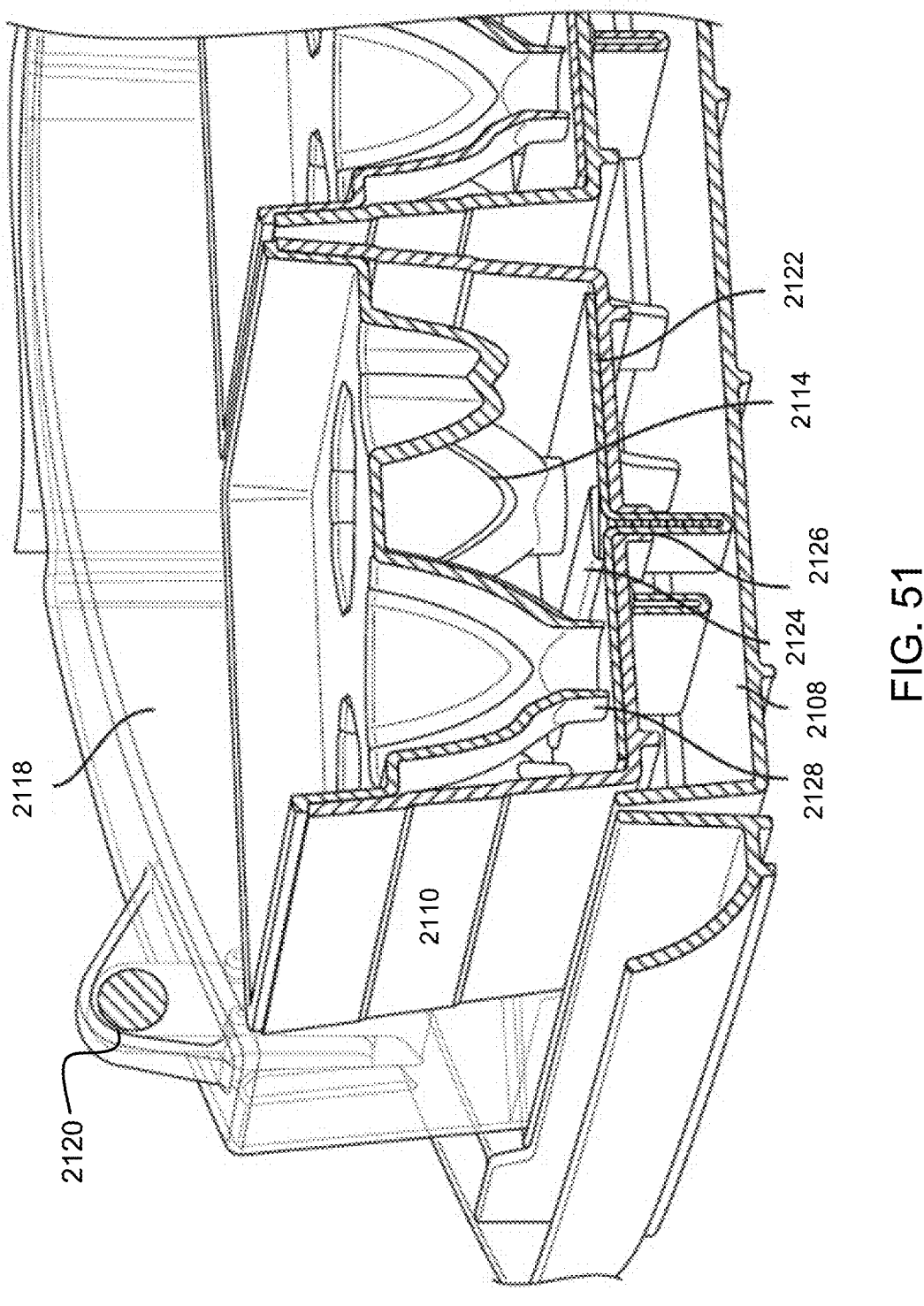
FIG. 51 is a cross-sectional view of a growing tray and a pod tray with a capillary mat according to exemplary embodiments.
Figure 52:
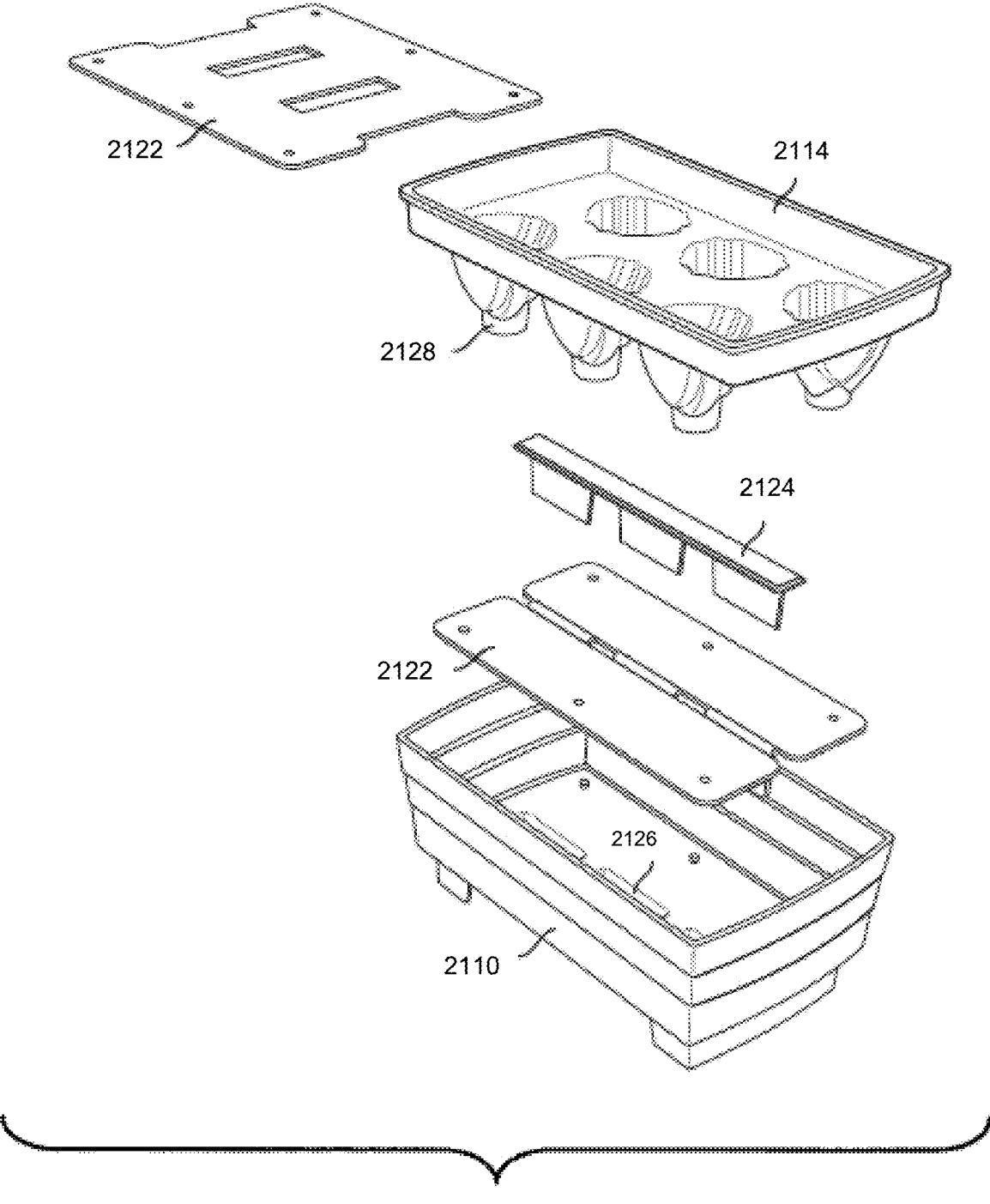
FIG. 52 is an exploded parts view of the components thereof according to exemplary embodiments.

FIG. 51 depicts a cross-section view of a growing container 2110 and a pod tray 2114. A capillary mat 2122 is shown along with a securing bar 2124. The opening or slot 2126 is shown through which the capillary mat 2122 and the securing bar 2124 extend into the base 2108. An opening 2128 at the base of the pod tray 2114 is in contact with the capillary mat 2124. A seed pod (not shown) may be placed in the pod tray. The bottom portion of the seed pod cone would extend into the opening 2128 and contact the capillary mat 2124, according to some embodiments. FIG. 52 provides another view of the components depicted in FIG. 51. The capillary mat 2122 is shown in an unfolded state 2122'.

Figure 53:
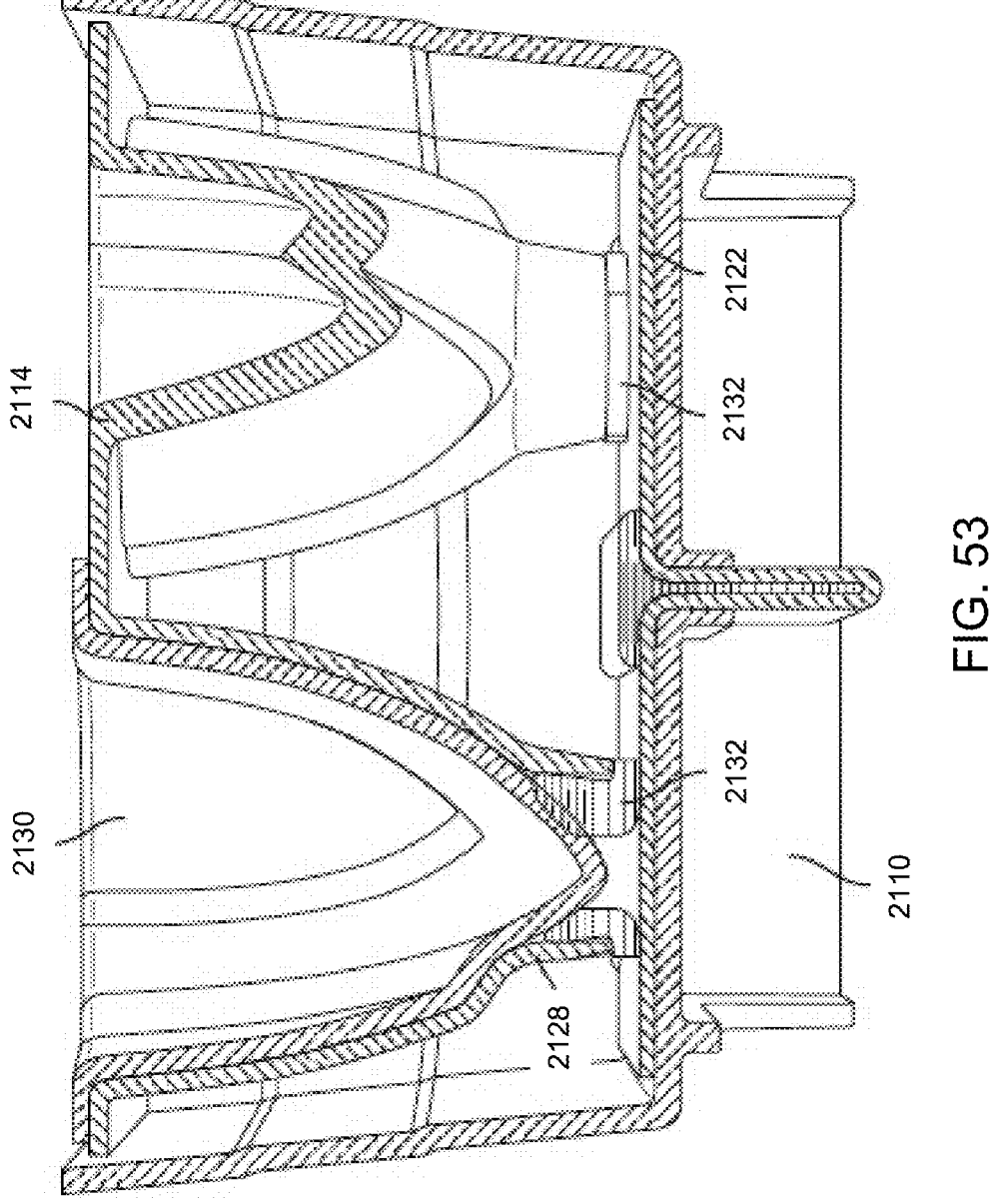
FIG. 53 is a cross-sectional view of thereof.
Figure 54:
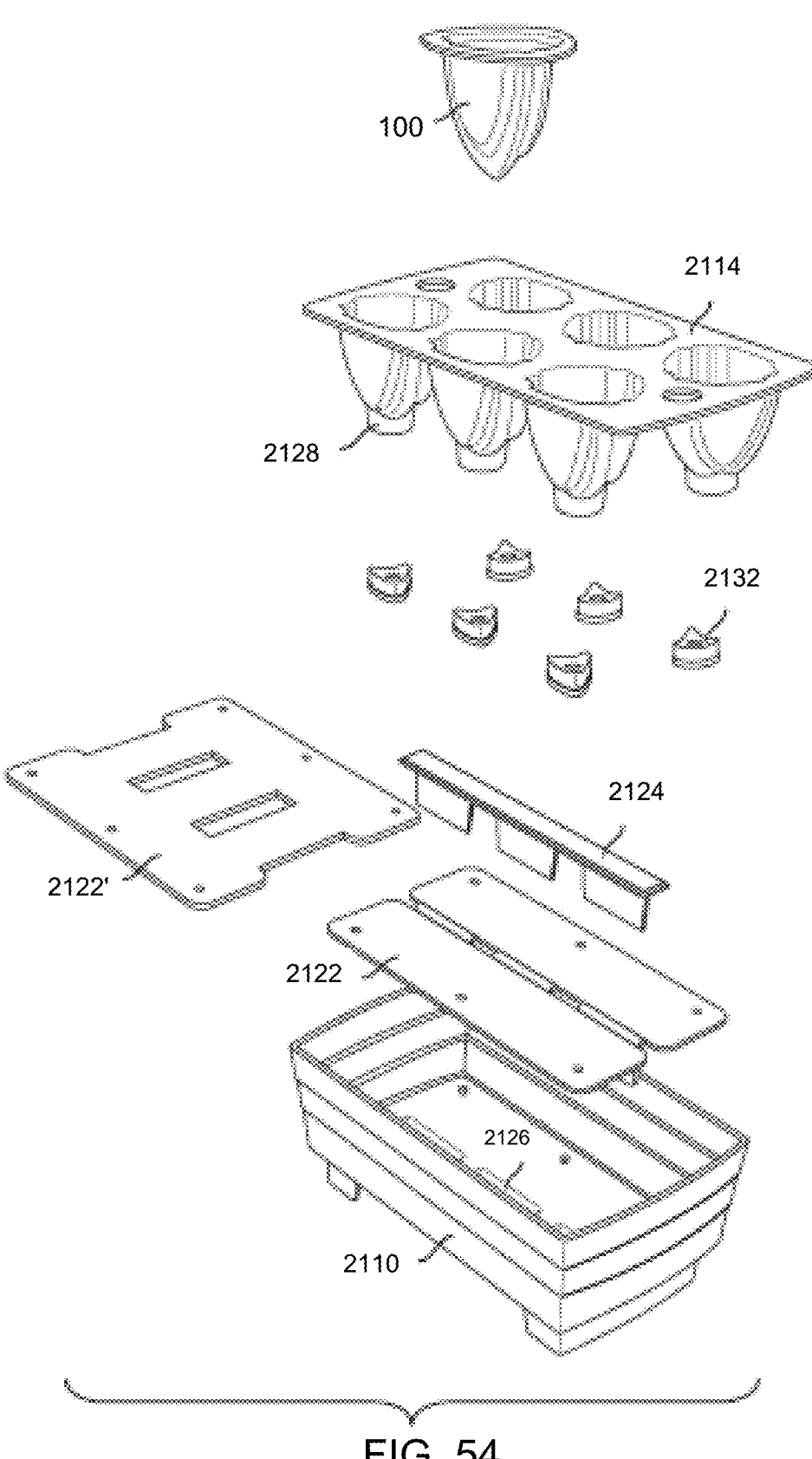
FIG. 54 is an exploded parts view of another embodiment of the components of a growing tray according to exemplary embodiments.

FIGS. 49 and 50 depict a further embodiment for use with the growing tray 2110. A seed pod 100 (in cross section with only the outer shell 114 shown) is in the pod tray 2114. As depicted in FIG. 51, its bottom cone portion extends into the opening 2128. A bridge 2132 is located in the opening 2128 between the cone tip and the capillary mat 2122. The bridge 2132 facilitates water wicking from the capillary mat 2122 to the seed pod 2130. The bridge 2132 may be made of a suitable material to facilitate the water wicking. The water may wick through the bridge 2132 to the seed pod 2130. The bridge 2132 may have an open center portion as depicted in FIG. 53 or the bridge 2132 may be a closed structure. As depicted in FIG. 53, multiple bridges 2132 may be used under each opening 2128 of the pod tray 2114.

FIGS. 59 through 62 depict an indoor growing unit 2200 according to exemplary embodiments. The unit 2200 has a light unit 2202 that is attached to a stand 2204 through a post assembly 2206. The light unit 2202 may be removably mounted to the post assembly 2206. The post assembly 2206 is detachably mated with the stand 2204. The stand 2204 may be enclosed and lack any trough structure.

The indoor growing unit 2200 has a base plate 2208. The base plate 2208 may be detachably mated with the stand 2204. The base plate 2208 is configured to accommodate at least one growing container 2210. According to exemplary embodiments, three growing containers 2210 may be used with the base plate 2208 as shown. Within each growing container 2210 may be structure to accommodate a plurality of seed pods 2216. For example, up to six seed pods may be accommodated in each growing container. The seed pod 2216 may be any of the embodiments of a seed pod as described above. For example, the seed pod 2216 may be the seed pod 100 as described over. Each growing container 2210 may be removable from the base plate 2208.

Figure 60:
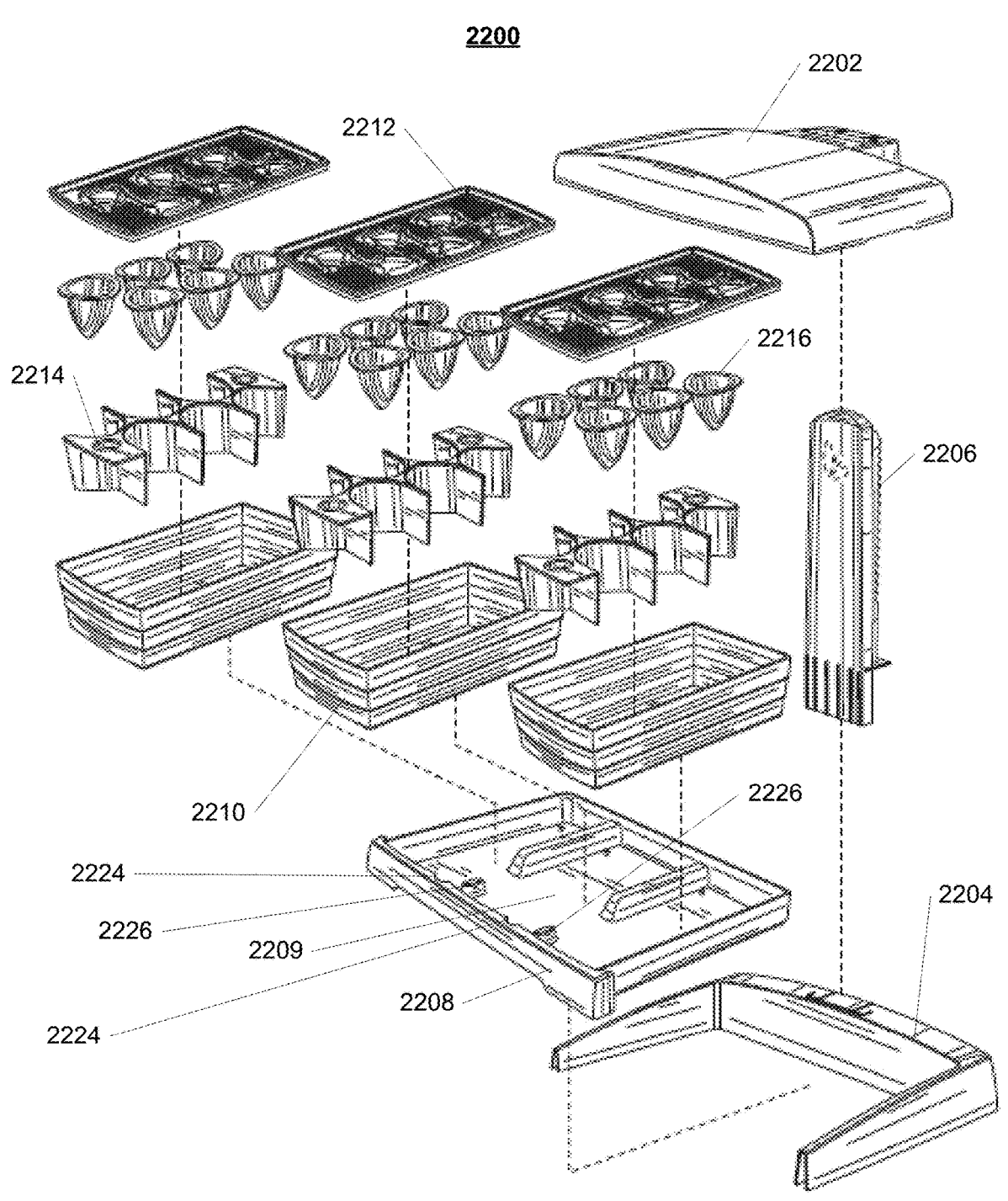
FIG. 60 is an exploded parts view thereof.

Within each growing container 2210 may be a number of elements to hold the seed pods. The structure may include a top portion 2212 and a pod divider 2214. The pod divider 2214 may provide support for the top portion 2212 and serve as a separator for each seed pod 2216. In FIG. 60, it should be appreciated that only the outer shell portion of the seed pod 2216 is depicted. The top portion 2212 may be removed and the seed pods placed into the pod divider 2214. According to exemplary embodiments, growing media, such as, but not limited to soil, may be added to the interior volume of the growing container 2210 upon removal of the top cover 2212 prior to the seed pods 2216 be placed. Once the growing media has been filled in, one or more seed pods 2216 may be inserted into the growing media. The pod divider 2214 may serve to provide a separator for the seed pods 2216 to provide for proper spacing and placement of each seed pod 2216. The growing media may provide support for each seed pod 2216. The top cover 2212 may be replaced following insertion of the seed pods. The top cover 2212 may serve to protect the seed pods and prevent foreign objects or material from entering the growing container 2210.

In some embodiments the top portion 2212 may have openings 2228 through which each seed pod 2216 may be inserted without removing the top portion 2212. In other embodiments, the growing media may be filled through these openings.

Figure 61:
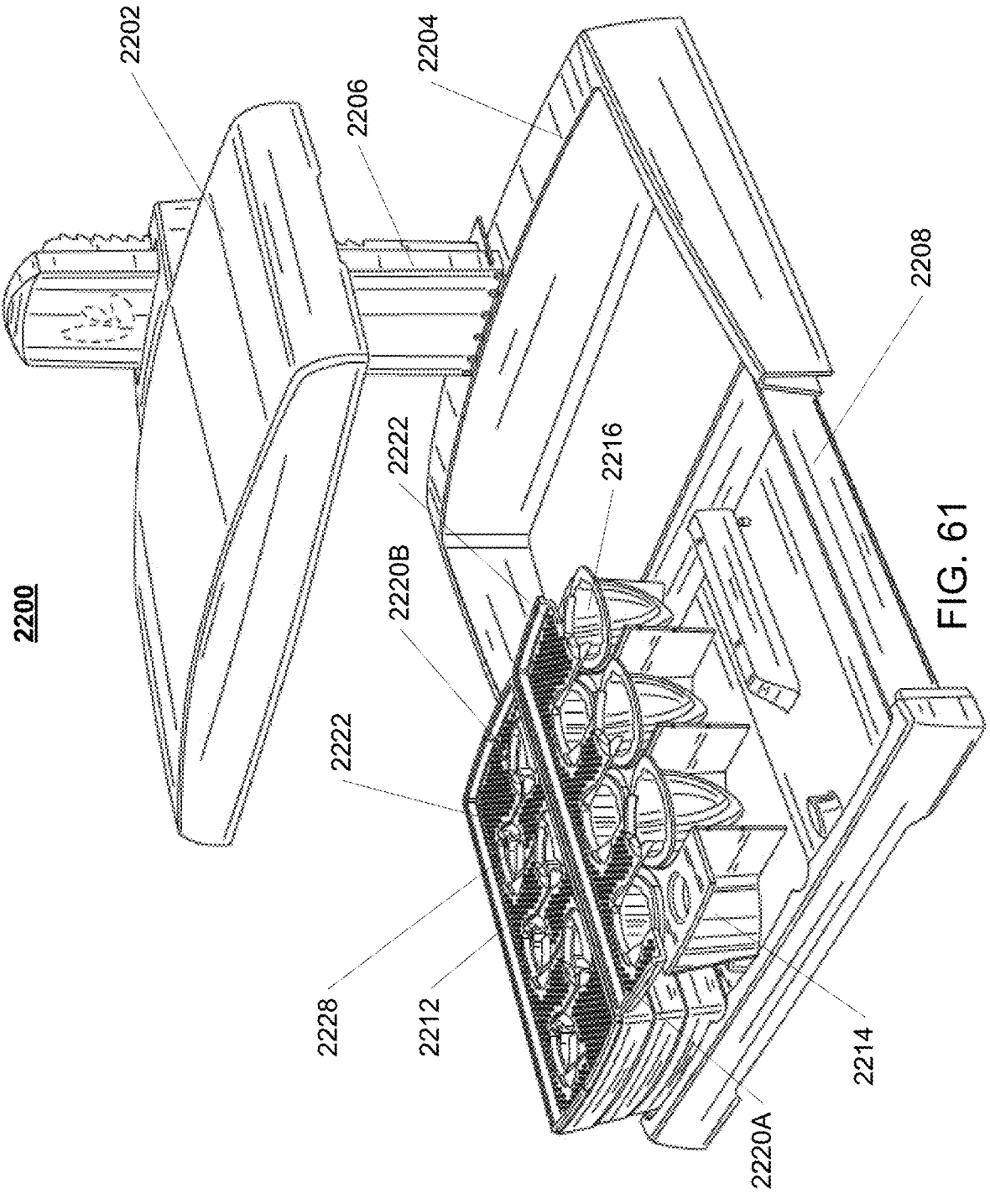
FIG. 61 is a cut-away view of the growing tray thereof with one growing tray removed.

The top portion 2212 may have two halves 2220A and 2220B as depicted in FIG. 61. The two halves may be divided along a section 2222. The top portion 2212 may be perforated to allow for penetration of moisture and air through its upper surface, for example. The top portion 2212 may be made of a suitable material. For example, the top portion 2212 may be made of plastic. The two halves 2220A and 2220B may allow for removal of the top cover 2212 once any plants have germinated and grown and need to be removed from the growing container 2210. The halves may allow such removal without damage or disturbing of any plants growing.

Figure 38:
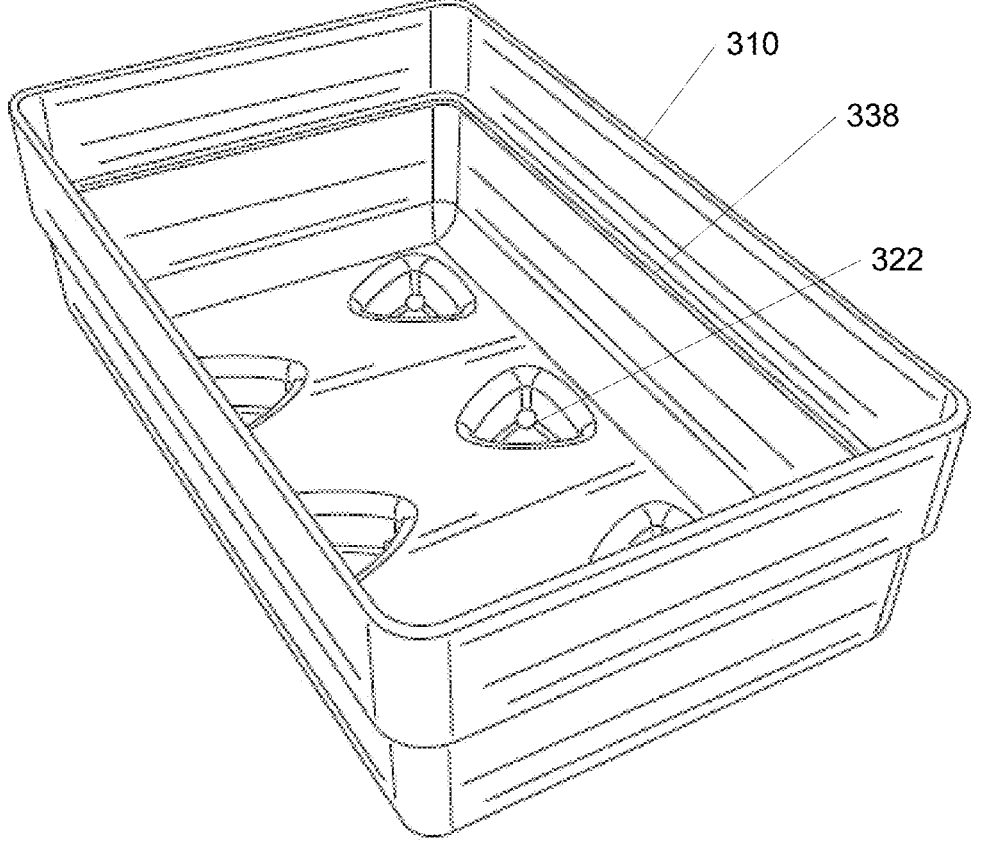
FIG. 38 depicts a perspective view of a growing container according to exemplary embodiments.

The growing container 2210 may have a bottom structure as depicted in FIG. 38, for example. Thus, the bottom structure of the growing container 2210 may have hollow pedestals 322. Each growing container 2210 may have six hollow pedestals 322 with holes in their bottom portion that allow water to enter the pedestal. Through these holes, water is allowed to directly contact with the seed pod or growing media. Through this contact, a wicking action may be established to allow for the water to provide moisture to the seed pod or the growing media supporting plant germination and growth. According to exemplary embodiments, as described above, the growing container 2210 may be filled with growing media, such as, but not limited to, soil. The growing media may fill the volume of the growing container 2210 including each of the hollow pedestals 322. Water, in the interior volume 2209 of the base unit 2208 may then be wicked into the growing container and eventually into contact with each seed pod 2216.

Figure 62:
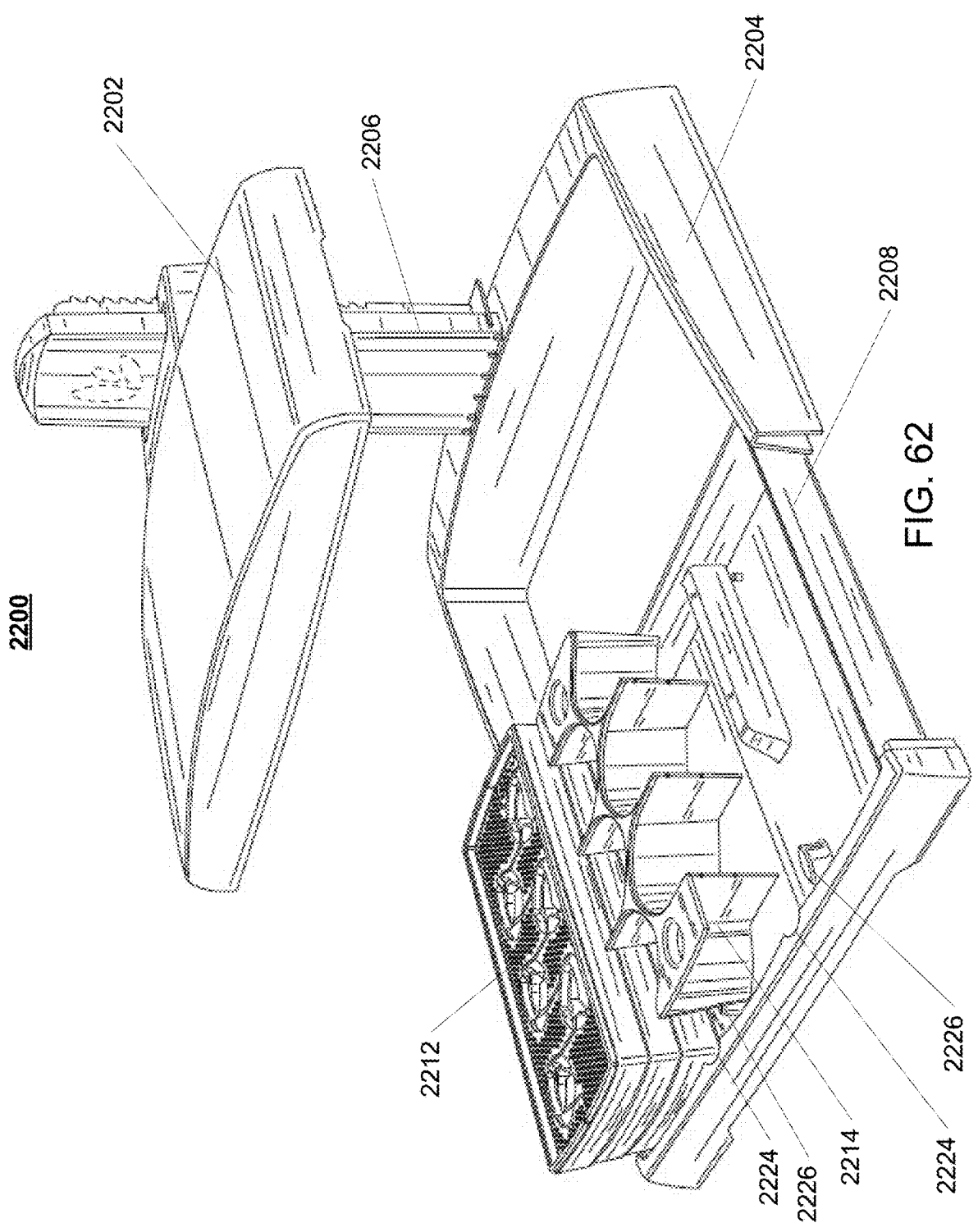
FIG. 62 is a second cut-away view of the growing tray thereof with one growing tray and the seed pods removed.

The indoor growing unit 2200 may lack a separate water reservoir. The water need for growth of the seed pods may be provided from the interior volume 2209 of the base unit 2208. For example, water may be added to the interior volume 2209 directly. The water may be added through scalloped portion 2224. There may be two scalloped portions 2224 according to exemplar embodiments. Two raised projections 2226 may serve as water level indicators to provide a visual reference regarding the water level in the interior volume 2209. As depicted in FIG. 62, for example, the raised projection 2226 can be seen from exterior of the unit 2200 when the growing containers 2210 are in place.

In some embodiments, water may be added through one or more an openings 2228 through the top cover 2212. The water may then flow down and excess may accumulate in the interior volume 2209. The water level in the interior volume may be observed as indicated above.

A moisture indicator may be used. The moisture indicator may be placed into one or more seed pods 2216 or soil in the growing container 2210 (depending how the unit is configured) to indicate the moisture level which may provide an indication of the water status of the unit 2200.

The following examples are not intended to limit the exemplary embodiments in any way.

EXAMPLES

A. Example 1

Previous experimentation found that the large, thin-walled spikes made of composted and molded cow manure can successfully grow vegetable plants to maturation and harvest. In this experiment, the inventors determined that various plant species can also successfully grow in the triangular acorn shaped seed pods described and depicted herein. The inventors also determined that the thicker walled triangular acorn shaped seed pod improved the ability of the pod to be pushed into the planting surface.

B. Example 2

In this experiment, the inventors determined that dried compressed cow manure, peat moss, and sugar cane were useful as the outer shell. Lima beans and zucchini were successfully grown in each of these materials and these outer shells were easily penetrated by plant roots.

C. Example 3

Previous experimentation showed that the sugar cane shaped seed pod worked well for zucchini squash when filled with coir and fertilized with a controlled release fertilizer (e.g., Osmocote®). In this experiment, the inventors evaluated the growth of corn, tomato and green in variable planting depths (e.g., fertilizer beneath the seed, fertilizer in bottom of cone, and fertilizer adjacent to seed), in a loose medium such as coir.

The inventors determined that the placement of formed Osmocote® did not impact tomato plant growth and development. In beans, having the formed Osmocote® in the bottom of the cone was more advantageous in time to germination. Towards the end of the trial, all treatments were similar in their plant size and mass.

Corn was variable in performance. Over time, the formed Osmocote® beneath seed, formed Osmocote® in bottom of cone, and formed Osmocote® adjacent to seed performed similarly in plant size and mass.

In sum, including a formed Osmocote® in a cone matrix successfully delivered proper nutrition to vegetable plants. Placement in the bottom of cone demonstrated faster time to germination.

D. Example 4

This experiment investigated variable planting depths in a loose medium such as coir. Corn, tomato and green bean seeds were planted at four depths, including ¼ inch, 1.5 inches, 3 inches, and the recommended seeding depth from the seed supplier.

Differences were seen for the first few days after germination with beans and corn, but treatments soon tapered and were statistically the same for the rest of the trial. Tomato treatments were the same for the entire duration of the trial. Depths of 2-3 inches was not detrimental to seedling growth and development and gives more flexibility in seed placement. This study demonstrated that a universal seeding depth may be used with vegetable species.

E. Example 5

This experiment investigated the use of shredded coir or a Q-Plug (from IHORT) as the rooting media for the interior of the triangular acorn shaped seed pod.

Germination was statistically equivalent for all treatments and in all species. Only a single lettuce treatment showed no germination. All other treatments for all species germinated, with an average of at least 58%. Differences in plant quality were evident throughout the trial, with added Osmocote® treatments greatly outperforming the non-fertilized treatments.

F. Example 6

This experiment investigated how compressed cow manure cone and the rooting media within will interact to pull water for the benefit of a germinating seed and the depth at which the exterior growing media provides adequate moisture. The cones were evaluated in an open tray format utilizing three depths of exterior growing media outside the cones. The rooting media in the cones was either loose coir or a molded plug having external ribs and formed to fit within the cone and comprising shredded coconut coir pith and bark fines. Only bottom-watering was done utilizing the features of the Misco Pot with exterior water ports and interior portals for the soil to engage the water for wicking purposes.

1. Materials and Methods

Figure 57:
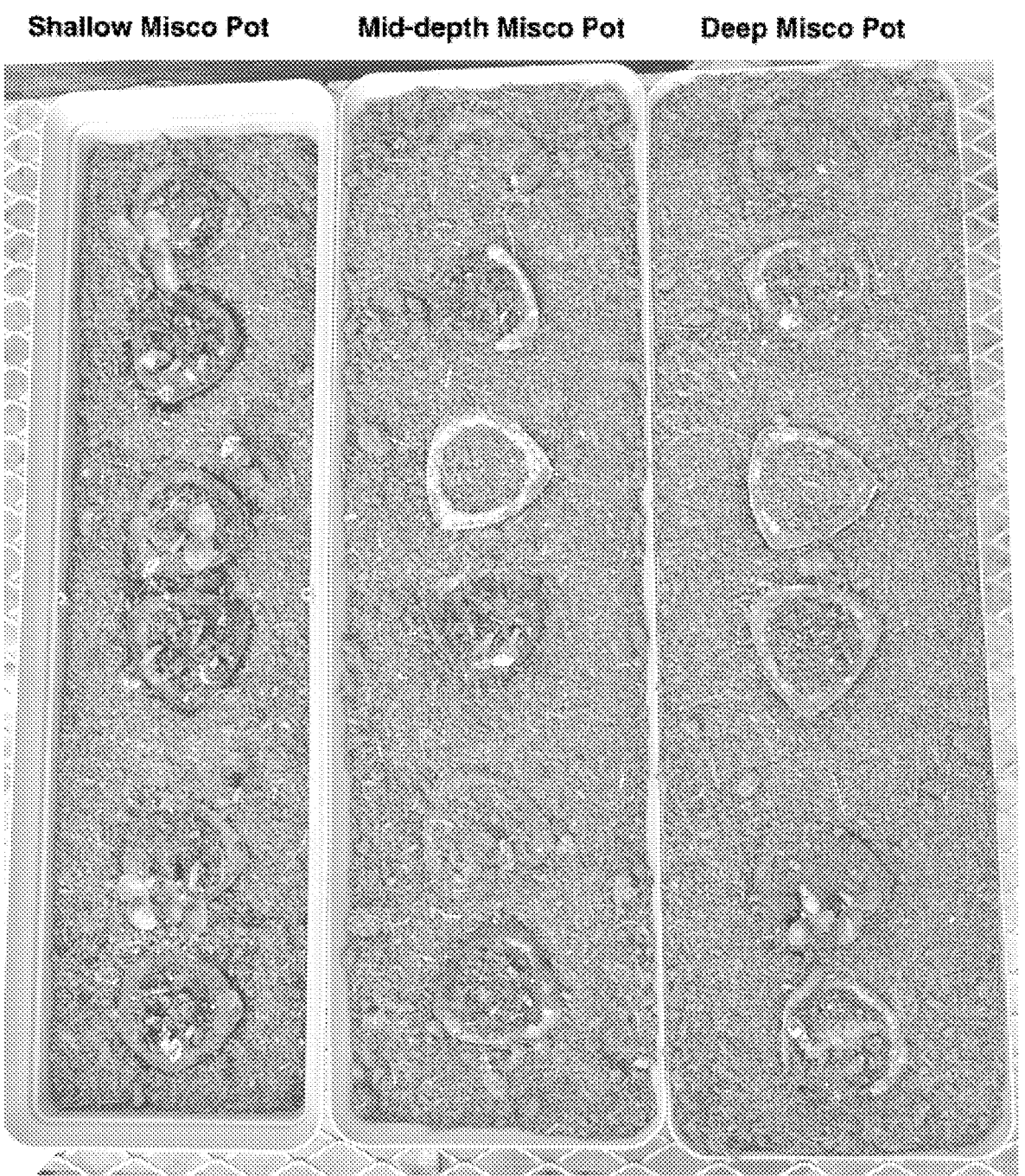
FIG. 57 is a comparison of the moisture wicking capabilities of the seed pods at various soil depths according to exemplary embodiments.

As depicted in FIG. 57, three Misco pots measuring 6 inches×24 inches×5 inches deep were filled at various depths with shredded coir. The bottoms of the cones are 0.25, 1.25 and 2.25 inches above the portals in the bottom of the Misco pot. Two types of seed were seeded into each cone; three basil on the left side of the cone and three yellow zucchini squash seeds on the right side—both at ¼ inch deep. As a control, the same seed types were planted directly into the coir base, in the absence of a seed pod, at the same depth and distance apart as that dictated by the cone dimensions. At planting, prepared cones were arranged in a straight line through the middle of the Misco pot. Each Misco pot housed three cones, which were formed of composted and molded cow manure. Three of these cones were filled with loose coir and three with molded plugs. These three cones of each substrate represent three replicates. Direct seeded seeds were planted in the voids around the cones but at least one inch away from the cone so any wicking by the cone would not influence the adjacent direct-sown seeds. After the cones were seeded and planted into the shredded coir in the Misco pots, wherein the finished pots will be bottom watered only. No top watering was done in this trial. Pots were monitored daily to be sure water level was maintained especially as the coir base was being wetted out. Germination and development of seedlings were monitored throughout the trial. In particular, seedlings, run in triplicate, were counted as they emerge and the number counted was divided by 3 to obtain the percent germination. This rating was taken periodically through the first several weeks of the trial in order to monitor speed of germination as a result of the varying moisture conditions.

As seedlings emerge they were counted. The number counted was divided by 3 to obtain % Germination. This rating was taken periodically through the first several weeks of the trial in order to monitor speed of germination as a result of the varying moisture conditions.

Figure 55:
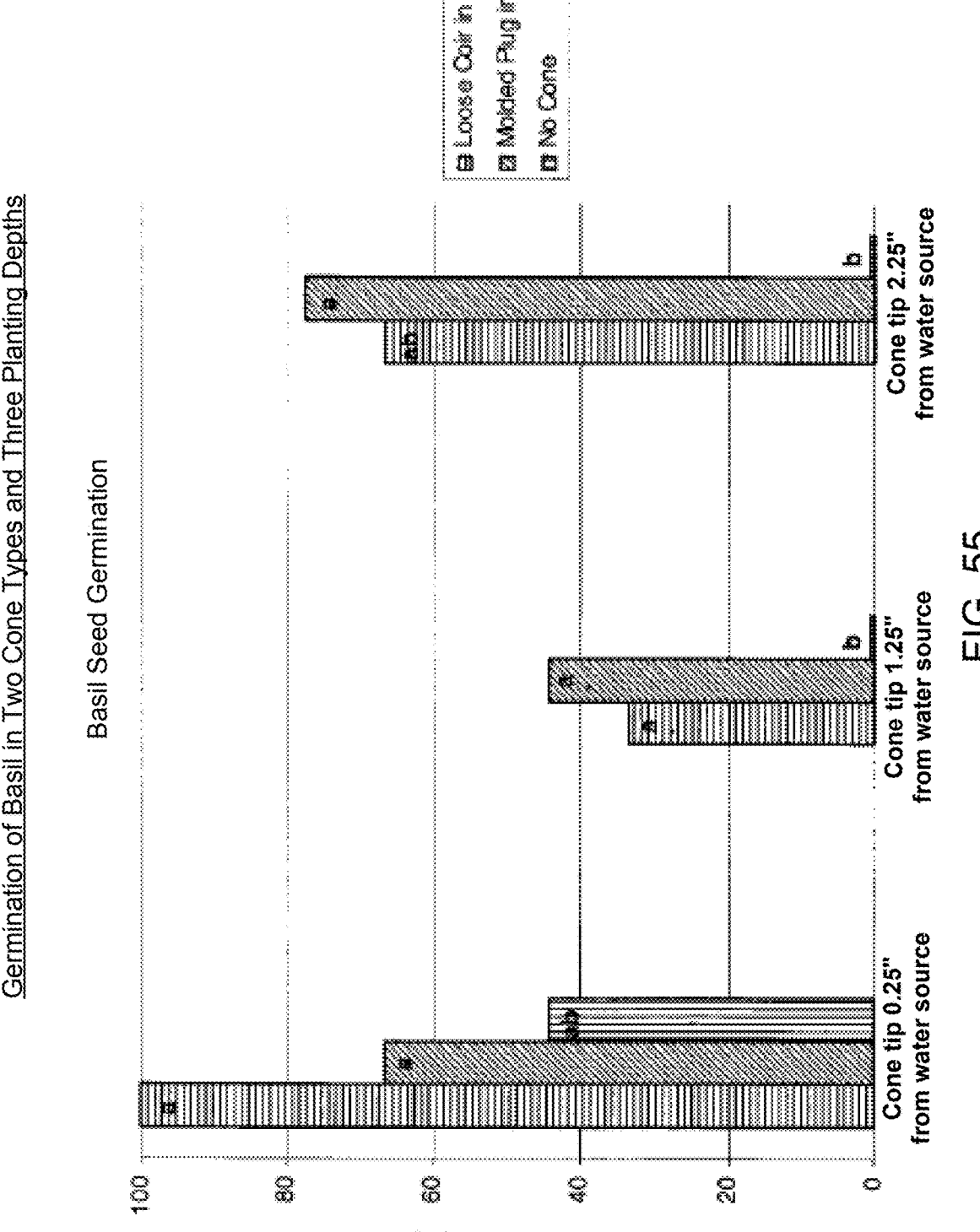
FIG. 55 is a graph demonstrating the germination of basil in seed pods comprising either (i) loose coir or (ii) a molded plug, at various planting depths according to exemplary embodiments.
Figure 56:
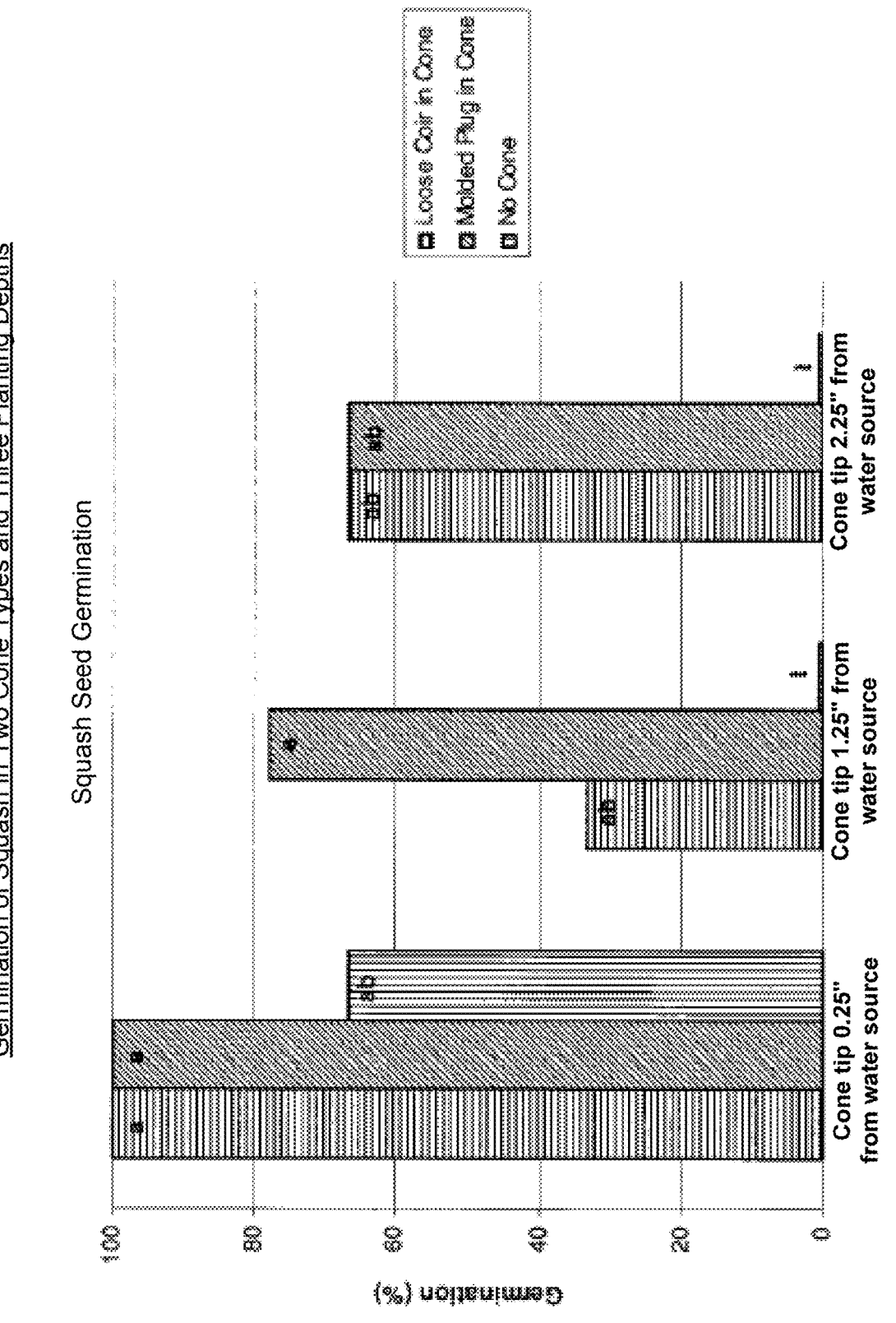
FIG. 56 is a graph demonstrating the germination of basil in seed pods comprising either (i) loose coir or (ii) a molded plug, at various planting depths according to exemplary embodiments.

FIGS. 55 and 56 depict the germination of basil in seed pods comprising either loose coir or a molded plug at various planting depths according to exemplary embodiments.

Table 1 below provides a description of the various planting schemes used in this experiment.

TABLE 1

| | PLANTING REGIME | CONE SUBSTRATE |
|---|---|---|
| 1 | Shallow Misco Pot Three-Inch Soil Depth with Cone 0.25 inch from water source | Loose Shredded Coir |
| 2 | Shallow Misco Pot Three-Inch Soil Depth with Cone 0.25 inch from water source | Molded Plug |
| 3 | Shallow Misco Pot Three-Inch Soil Depth with Seeds Planted at 0.25 inches from the Surface | No Cone - Direct Seed into Coir Base |
| 4 | Mid-Depth Misco Pot Four-Inch Soil Depth with Cone 1.25 inch from water source | Loose Shredded Coir |

TABLE 1-continued

| | PLANTING REGIME | CONE SUBSTRATE |
|---|---|---|
| 5 | Mid-Depth Misco Pot Four-Inch Soil Depth with Cone 1.25 inch from water source | Molded Plug |
| 6 | Mid-Depth Misco Pot Four-Inch Soil Depth with Seeds Planted at 0.25 inches from the Surface | No Cone -Direct Seed into Coir Base |
| 7 | Deep Misco Pot Five-Inch Soil Depth with Cone 2.25 inch from water source | Loose Shredded Coir |
| 8 | Deep Misco Pot Five -Inch Soil Depth with Cone 2.25 inch from water source | Molded Plug |
| 9 | Deep Misco Pot Five-Inch Soil Depth with Seeds Planted at 0.25 inches from the Surface | No Cone Direct Seed into Coir Base |

The data from these nine treatments was subjected to analysis of variance (ANOVA) using ARM version 8.0 (Gylling Data Management). If treatment probability is significant, means were separated using Student Newman-Keuls at P=0.05.

2. Results

In the shallow planted Misco Pots, the coir matrix soil was a total of 3.0 inches deep with the bottom of the cone elevated at 0.25 inches above the level of the water. It was observed that the surface of the coir matrix continuously had a wet appearance attesting to its wicking capability at that 3.0 inch depth. The exposed rims of the cones were noticeably wetter as well (see FIG. 57).

The coir matrix effectively wicked moisture through its 3.0 inch profile and provided ample moisture at 7 days after seeding (DAS) for seed germination in both versions of the cone (loose coir filled and molded plug-filled) and for the direct-sown seed. This pattern held true for both species at all three rating dates (see FIGS. 55 and 56).

In the mid-depth Misco pot the coir matrix was 4.0 inches deep with the bottom of the cone elevated 1.25 inches above the level of the water. Unlike the surface of 3.0 inch deep coir matrix, the 4.0 inch depth did not appear wet at the surface. However, the exposed rims of the cone showed that most of the cones were adequately moistened due to wicking (see FIG. 57).

At 7 DAS the molded plug cone was the only setting where basil plants received adequate moisture for germination. No basil seeds germinated in the Coir-filled cone or the direct seed. At 13 and 20 days basil seed germination occurred in the Coir-filled cone but not in the direct seed setting (see FIG. 55).

Squash was similar to basil in its response except that both versions of the cone provided ample moisture for the germination of the squash seed beginning at the early 7 day timeframe. Direct-sown squash did not germinate (see FIG. 56). This illustrated the effectiveness of the cone for moving moisture against gravity for successful germination of these two species which could not germinate using conventional direct-sow seeding methods. In this case moisture was moved 3.75 inches—from the portal to the seed.

In the deep-depth Misco pot the coir matrix was 5.0 inches deep with the bottom of the cone elevated 2.25 inches above the level of the water. At this depth there was no visible moisture at the surface of the coir matrix (see FIG. 57). Most all cones wetted well based on the appearance of the exposed rims (as in the mid-depth Misco pot one of the three Coir-filled cones did not wick water and so no seeds germinated).

As with the mid-depth Misco Pot most all basil and squash germinated as long as they were housed in the cone setting (see FIGS. 56 and 57). Direct-sown seed did not receive adequate moisture for germination. In this case, adequate moisture was pulled 4.75 inches to the seed through the benefit of the cone and the loose coir and/or molded plug materials within.

F. Example 7

A variety of other herbs and vegetables were tested utilizing similar methodology presented above. In this example, the nutrient blends were tested for germination, overall growth, root rating, and dry weight of the products produced. The nutrient blends of NPK tested were NPK-0.0075-0.0032-0.015 (i.e., F1) and NPK-0.0045-0.0025-0.013 (i.e., F2). These plants include basil, cilantro, thyme, dill, bush beans, snap peas, spinach, lettuce (loose leaf, butterhead, and romaine), watermelon, cucumber, summer squash, pumpkin, sweet pepper, tomato (globe and cherry). The tables, below, provide a summary of seed pods utilizing F1 and F2 NPK levels in the seed pods as compared to seeds planted directly into the native soil. The seed pods' outer shell was a compressed cow manure cone and the rooting media was a molded plug comprising shredded coconut coir pith and bark fines and F1 or F2 NPK. The tables below summarize the results for the various seeds in percent germination (Table 2), overall growth (Table 3), root rating (Table 4), and dry weight (Table 5).

TABLE 3

Overall Growth (mm) at 4 weeks

| | Seed Pod (F1) | Seed Pod (F1) | Direct planting |
|---|---|---|---|
| Basil | 40.8 | 43.5 | 17.6 |
| Cilantro | 62.5 | 61.3 | 48.8 |
| Thyme | 21.9 | 23.5 | 18.3 |
| Dill | 71.7 | 71.7 | 50 |
| Bush beans | 182.1 | 200.4 | 170.4 |
| Snap peas | 159.4 | 176.3 | 148.2 |
| Spinach | 107.92 | 88.33 | 125.9 |
| Loose leaf lettuce | 84.83 | 82.08 | 59.17 |
| Butterhead lettuce | 28.42 | 40.08 | 30.42 |
| Romaine lettuce | 21.6 | 24.1 | 27.5 |
| Watermelon | 75.83 | 71.08 | 49.17 |
| Cucumber | 110 | 114.6 | 94.2 |
| Summer Squash | 195 | 194.8 | 189.6 |
| Pumpkin | 165 | 170.4 | 173.8 |
| Sweet Pepper | 41.8 | 42.6 | 42.8 |
| Cherry tomato | 103.8 | 103.8 | 93.3 |
| Globe tomato | 48.3 | 45.5 | 40.6 |

TABLE 4

Root Rating (scale of 0-5) at 6 weeks

| | Seed Pod (F1) | Seed Pod (F1) | Direct planting |
|---|---|---|---|
| Basil | 3.8 | 3.8 | 1.3 |
| Cilantro | 3.5 | 3.5 | 3.3 |
| Thyme | 0.8 | 1.5 | 1 |
| Dill | 3 | 3.5 | 2.3 |

TABLE 2

Percent Germination

| | Seed Pod (F1) at 7 days | Seed Pod (F1) at 19 days | Seed Pod (F2) at 7 days | Seed Pod (F2) at 19 days | Direct planting 7 days | Direct planting 19 days |
|---|---|---|---|---|---|---|
| Basil | 66 | 75 | 91.7 | 91.7 | 8.3 | 41.7 |
| Cilantro | 83.33[#] | 91.7 | 91.67[#] | 100 | 91.67[#] | 91.7 |
| Thyme | 16.7 | 25 | 41.7 | 58.3 | 0 | 25 |
| Dill | 58.3[#] | 83.3 | 75[#] | 75 | 58.3[#] | 83.3 |
| Bush beans | 91.7 | 91.7 | 83.3 | 91.7 | 83.3 | 100 |
| Snap peas | 83.3 | 100 | 100 | 100 | 58.3 | 58.3 |
| Spinach | 16.7 | 66.7 | 50 | 91.7 | 41.7 | 58.3 |
| Loose leaf lettuce | 58.3[#] | 58.3 | 50[#] | 50 | 91.7[#] | 91.7 |
| Butterhead lettuce | 58.3 | 66.7 | 58.3 | 66.7 | 75 | 83.3 |
| Romaine lettuce | 33.3 | 83.3 | 50 | 100 | 91.7 | 91.7 |
| Watermelon | 0 | 100 | 16.7 | 100 | 0 | 75 |
| Cucumber | 100 | 100^ | 100 | 100^ | 91.7 | 100^ |
| Summer Squash | 75 | 91.7^ | 83.3 | 100^ | 75 | 83.3^ |
| Pumpkin | 50 | 58.3^ | 50 | 66.7^ | 58.3 | 75^ |
| Sweet Pepper | 16.7[#] | 83.3 | 8.3[#] | 75 | 0[#] | 83.3 |
| Cherry tomato | 50 | 91.7 | 66.7 | 100 | 91.7 | 91.7 |
| Globe tomato | 25 | 66.7 | 25 | 75 | 100 | 100 |

[#]= 10 days
^= 12 days

TABLE 4-continued

| | Root Rating (scale of 0-5) at 6 weeks | | |
|---|---|---|---|
| | Seed Pod (F1) | Seed Pod (F1) | Direct planting |
| Bush beans | 4.8 | 4.8 | 4.5 |
| Snap peas | 3.8 | 4.5 | 3 |
| Spinach | 4 | 3.5 | 3 |
| Loose leaf lettuce | 3.5 | 3.8 | 2.8 |
| Butterhead lettuce | 1.8 | 2.5 | 2 |
| Romaine lettuce | 1.5 | 1.8 | 1.3 |
| Watermelon | 2.3 | 2.3 | 1.8 |
| Cucumber | 3.5 | 3.3 | 3.3 |
| Summer Squash | 3.5 | 3.8 | 3 |
| Pumpkin | 3.5 | 3.5 | 4 |
| Sweet Pepper | 1.3 | 1.5 | 1.5 |
| Cherry tomato | 4 | 4 | 3.5 |
| Globe tomato | 2 | 2 | 1.8 |

TABLE 5

| | Dry Weight (grams) at 6 weeks | | |
|---|---|---|---|
| | Seed Pod (F1) | Seed Pod (F1) | Direct planting |
| Basil | 0.34 | 0.43 | 0.1 |
| Cilantro | 0.44 | 0.46 | 0.33 |
| Thyme | 0.048 | 0.085 | 0.052 |
| Dill | 0.218 | 0.233 | 0.165 |
| Bush beans | 2.25 | 2.17 | 2.21 |
| Snap peas | 1.568 | 1.863 | 1.365 |
| Spinach | 0.838 | 0.689 | 0.826 |
| Loose leaf lettuce | 0.613 | 0.680 | 0.595 |
| Butterhead lettuce | 0.035 | 0.1 | 0.085 |
| Romaine lettuce | 0.068 | 0.075 | 0.093 |
| Watermelon | 0.620 | 0.550 | 0.255 |
| Cucumber | 1.143 | 1.215 | 0.925 |
| Summer Squash | 2.810 | 2.680 | 2.533 |
| Pumpkin | 2.318 | 2.130 | 2.5 |
| Sweet Pepper | 0.165 | 0.150 | 0.105 |
| Cherry tomato | 1.820 | 2.070 | 1.348 |
| Globe tomato | 0.105 | 0.125 | 0.095 |

1. Basil

Basil grown in the seed pods produced better emergence at 7 days after seeding when compared to direct seeding into amended native soil. This was likely due to difficulties of the basil seedling emerging through the clay-like soil with a high bulk density and a tendency of surface crusting after watering. Germination at 19 days showed no statistical differences between treatments. Dry weight, growth indices and root ratings at 6 weeks showed significantly more growth with the plants grown in the Seed Pod compared to directly sown seed. In this study the seed pods provided basil a germination advantage as well as an overall growth, dry weight accumulation, and root growth advantage for basil compared to directly sown seed.

2. Cilantro

Cilantro seed performed similarly when grown from the Seed Pods or when direct seeded. Percent germination at 7 and 19 days was not statistically different among treatments. Final dry weights and root ratings were also not statistically different. However, growth indices showed that cilantro grown in Seed Pods was significantly larger than plants that were directly seeded. Overall, cilantro growth was comparable when grown from seed in the Seed Pods or directly seeded into native soil.

3. Thyme

Thyme responded similarly to the three treatments. Germination at 7 and 19 days was not statistically different among treatments. Dry weight, root ratings, and growth indices were also not statistically different among treatments. Thyme germination, growth and development was comparable when grown in the Seed Pods or when directly sown into native soil.

4. Dill

Dill seed germination was statistically similar for the three treatments at both 10 and 19 days after sowing. Even though overall growth of dill in the Seed Pods was significantly greater than direct-seeded into native soil, the dry weights of the three treatments two weeks later (at the end of the trial) were not significantly different. Seed Pods tended to have better root ratings than the direct-seed treatment. In summary, the performance of dill in the Seed Pods showed tendencies of improved growth and development when compared to direct seed.

5. Bush Bean

Bean seeds grown in Seed Pods or directly seeded had comparable germination rates at 7 and 19 days. Growth indices taken at 4 weeks showed the F-2 Seed Pod produced a significantly larger plant than the direct seeded control. The F-1 Seed Pod was no different than the control. However, by 6 weeks dry weights and root ratings showed no significant difference among the three treatments. Overall, beans grown in Seed Pods or in native soil have similar germination, dry weight production, and root growth.

6. Snap Pea

There was a tendency for pea seeds in the Seed Pods to germinate better than seeds sown directly into native soil. The Seed Pod with F-2 fertilizer produced pea plants with significantly greater dry weight accumulation than Seed Pod with F-1 fertilizer or directly sown seeds. Overall growth measured at 4 weeks and 6 week root ratings were statistically similar for all treatments. In summary pea seed germination tended to be better in Seed Pods but the subsequent vegetative growth and root growth were quite similar for each of the three treatments.

7. Spinach

Spinach plants had similar germination at 7 and 19 days for all treatments. Growth indices taken at 4 weeks showed that spinach plants grown from direct seed in soil tended to have greater growth than those grown in Seed Pods. However, by 6 weeks dry weights and root ratings indicated there were no significant differences among the three treatments. Overall, spinach performed similarly when grown in Seed Pods or when directly seeded into native soil.

8. Lettuce

Several varieties of lettuce were tested in these studies, including loose leaf lettuce, butterhead lettuce, and romaine lettuce. All three cultivars of lettuce grown from the Seed Pods had statistically similar germination rate at 7 and 19 days as those planted directly into native soil. At four weeks, overall growth of lettuce plants for each variety was similar for each treatment. At six weeks, the dry weight for loose leaf and romaine lettuce showed that the three treatments were not statistically different from one another however, dry weights of butterhead lettuce showed that native soil and Seed Pods with F2 level of nutrition had significantly more growth than plants grown in Seed Pods with F1. Root ratings of loose leaf lettuce, butterhead lettuce, and romaine lettuce showed no statistical differences among treatments. In summary, all three lettuces grown from seed in the Seed Pod performed similarly as lettuce grown in native soil. One parameter, butterhead lettuce dry weight, showed that the F-1 Seed Pod was inferior to the F-2 Seed Pod and the native soil control. However, all other butterhead lettuce ratings showed no statistical differences among the three treatments.

9. Watermelon

Watermelon performed similarly in both Seed Pods and when seeded directly into the native soil. The rate of germination was statistically similar for all treatments at 7 and 19 days. The dry weight, root ratings, and overall growth were not statistically different among treatments. Overall, watermelon seed can be started from either Seed Pods or directly sown to obtain the same rate of germination and plant growth for 6 weeks after seeding.

10. Cucumber

Cucumber performed similarly in both Seed Pods and when seeded directly into the native soil. The rate of germination was similar for all treatments at 7 and 12 days. The dry weight, root ratings, and overall growth were not statistically different among the three treatments. Overall, the success of growing cucumber in Seed Pods or direct seed is very similar.

11. Summer Squash (Zucchini)

Zucchini performed similarly in both Seed Pods and when grown in a direct-seed setting. The rate of germination was similar for all treatments at 7 and 12 days. The dry weight, root ratings, and overall growth were not statistically different among treatments. Overall, zucchini can be grown from seed equally well using the Seed Pods or when directly sown in native soil.

12. Pumpkin

Pumpkin performed similarly in both Seed Pods and when directly seeded into native soil. The rate of germination was similar for all treatments at 7 and 12 days. The dry weight, root ratings, and overall growth were not statistically different among treatments. Overall, pumpkin can be grown equally well from seed using Seed Pods or when direct sown into native soil.

13. Sweet Pepper

Sweet Pepper performed similarly in both Seed Pods and when seeded directly into native soil. The rate of germination was similar for all treatments at 10 and 19 days. The dry weight, root ratings, and overall growth were not statistically different among treatments. Overall, sweet pepper performs equally well when seed is planted using the Seed Pod system or when directly seeded into native soil.

14. Tomato

Two types of tomatoes (Cherry and Globe) were evaluated in this set of trials. Cherry tomato had statistically similar germination rates for all three treatments at both 7 and 19 days. Globe tomatoes that were direct seeded into native soil had better germination than Seed Pods at 7 days after seeding but by 19 days there was no statistical difference among treatments. The delay of germination of Globe tomatoes in Seed Pods could not be explained. At 4 weeks the overall growth of both Cherry and Globe tomato plants in the Seed Pods was not significantly different than directly sown plants. However, at 6 weeks Cherry tomato plants in the Seed Pods had significantly more dry weight accumulation than directly seeded into the soil. This was likely due to the added nutrition in the growing media of the Seed Pods. Interestingly this nutritional advantage was not expressed in the Globe tomato plants. The root ratings for both tomato cultivars indicted no differences among the treatments. Overall, Cherry and Globe tomatoes performed similarly when grown from Seed Pods or when directly seeded.

While the foregoing description includes details and specific examples, it is to be understood that these have been included for purposes of explanation only, and are not to be interpreted as limitations of the preferred embodiments. It will be appreciated that variations and modifications may be effected by a person of ordinary skill in the art without departing from the scope of the preferred embodiments. Furthermore, one of ordinary skill in the art will recognize that such processes and systems do not need to be restricted to the specific embodiments described herein. Other embodiments, combinations of the present embodiments, and uses and advantages will be apparent to those skilled in the art from consideration of the specification and practice of the embodiments disclosed herein. The specification and examples should be considered exemplary.

G. Example 8

Experiments to determine whether the contents of the rooting media and/or techniques in fabricating the rooting media affected the germination rates of a variety of seed types were conducted. Seed pods were tested by altering the type of rooting media with (1) only coconut coir pith, (2) coconut coir pith and bark fines, (3) the coconut coir pith and peat moss held in place by x-tack and subjected to heat drying, or (4) seeds were placed directly into the planting surface (i.e., no seed pod) (see table below):

| | TREATMENTS |
|---|---|
| 1 | Seed placed into seed pods filled with 100% coconut coir pith + 3.0 grams Osmocote 18-6-12 100% coir |
| 2 | Seed placed into seed pods filled with 50% coconut coir pith and 50% bark fines + 3.0 grams Osmocote 18-6-12 |
| 3 | Seed placed into seed pods filled with 50% coir and 50% bark fines including x-tack and heat drying + 3.0 grams Osmocote 18-6-12 |
| 4 | Seed directly placed into Professional Growing Media |

The manufacturing process of the plug may require the use of a special adhesive call X-tack and requires drying the seed pod in a dryer at high temperatures to remove moisture. Seed pods were seeded with two to three seeds (depending on the seed type and size). Each seed was placed at a depth of 0.25 inches below the surface of the planting area (measured from the top of the seed). As a control the same number of seeds will be seeded directly into the planting area without the use of a seed pod. All seed pods and seeds were planted in Fafard 3B professional potting mix (i.e., soil) and placed into 4" plastic pots filled with the soil so that the rim of the pod is level with the surface of the soil. Finished pots were watered to settle the soil and establish the moisture level for seed germination. Observations were noted as seeds germinate and grow. The experiment terminated at the end of the germination period, which is approximately 3 to 4 weeks after initiation. The following species of vegetables/herbs were tested: Basil Genovese (*Ocimum basilicum* 'Genovese'), Cilantro (*Coriandrum sativum* 'Santo'), Dill (*Anethum graveolens* 'Fernleaf'), Bush Bean (*Phaseolus vulgaris* 'Jade'), Snap Pea (*Pisum sativum* 'Sugar Bon'), Spinach (*Spinacia oleracea* 'Baker'), Looseleaf Lettuce (*Lactuca sativa* 'Lola Rosa'), Butterhead Lettuce (*Lactuca sativa* 'Butter Crunch'), Romaine Lettuce (*Lactuca sativa* 'Winter Density'), Watermelon (*Citrullus lanatus* var. *lanatus* 'SugarBaby'), Cucumber (*Cucumis sativus* 'Tasty Green'), Zucchini Squash (*Cucurbita pepo* 'Fiesta'), Yellow Zucchini Squash (*Cucurbita pepo* 'Star Dust'), Pumpkin (*Cucurbita pepo* 'Spartan'), Sweet Pepper (*Capsica annuum* 'Red Bull'), Cherry Tomato (*Solanum lycopersicum* 'Sweet Million'), Globe Tomato (*Solanum lycopersicum* 'RedPride').

Figure 58:
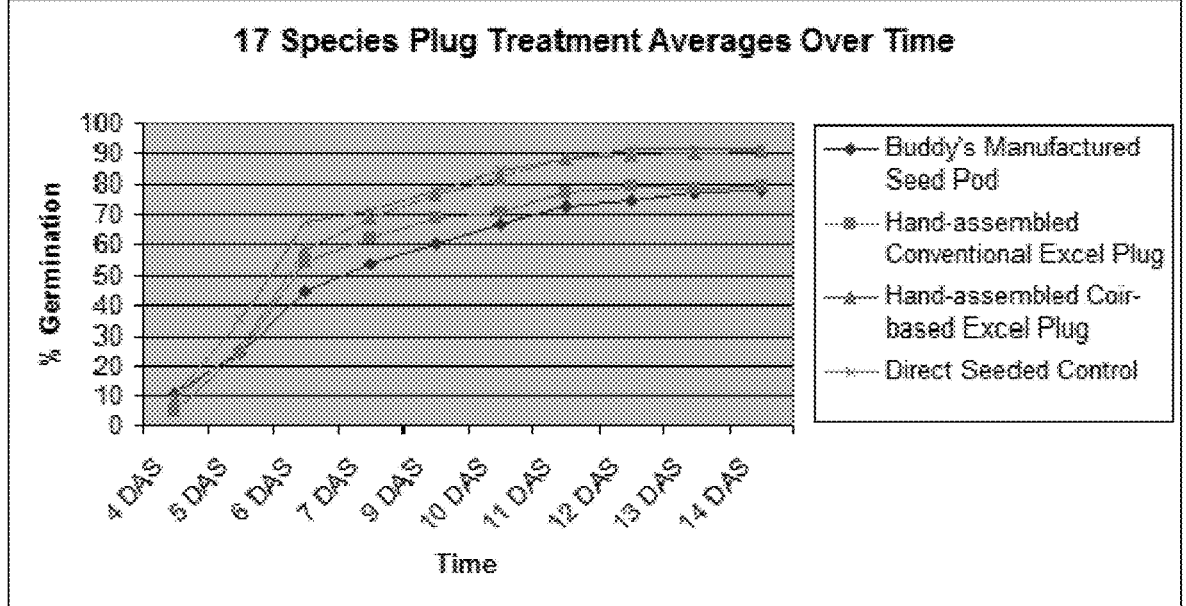
FIG. 58 is a graph comparing percent germination of the seed pod rooting media as a function of time.
Figure 59:
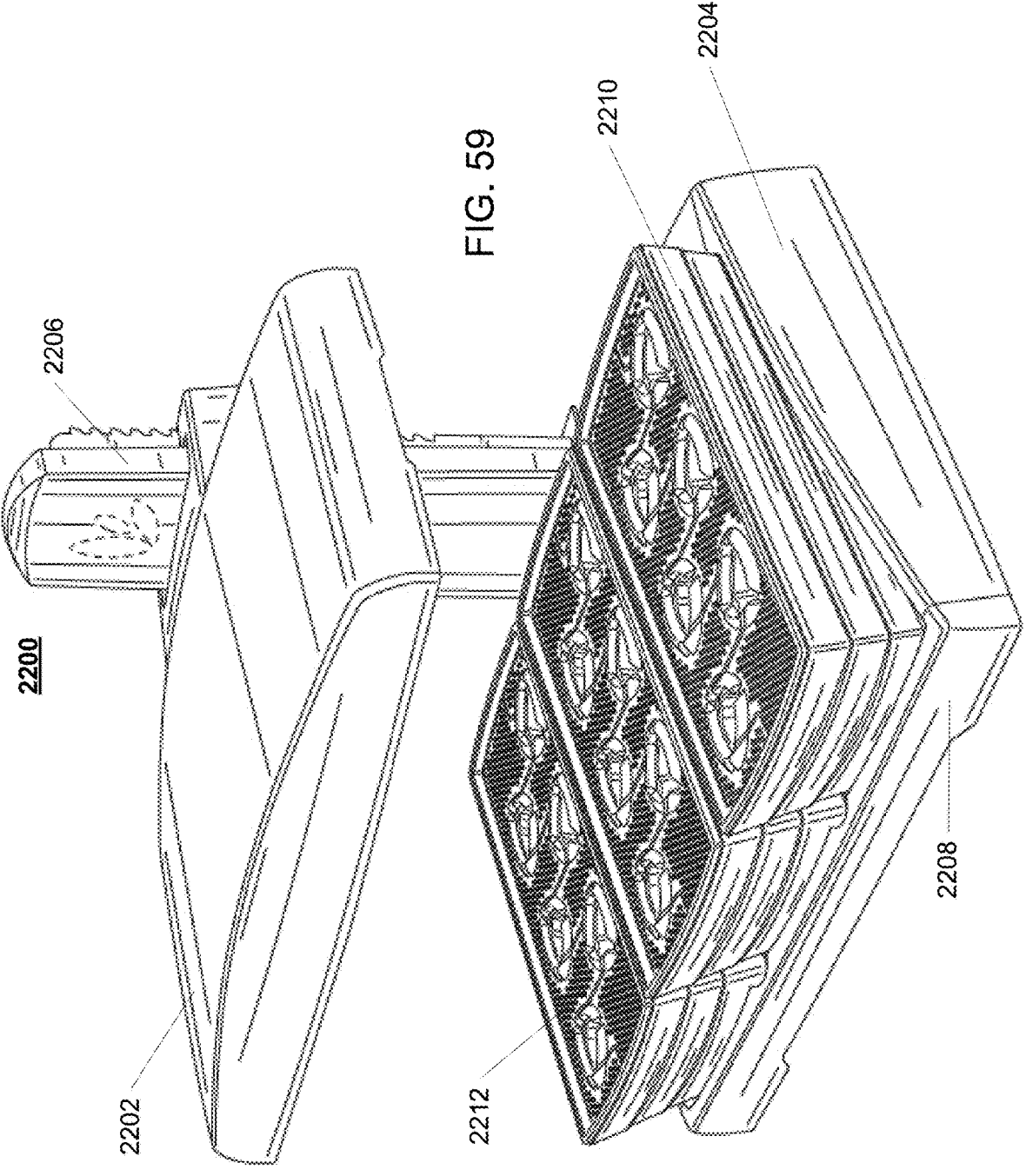
FIG. 59 is a front perspective view of a seventh embodiment of an indoor growing unit according to exemplary embodiments.

Following the 3 to 4 week experimentation period, the germination rates for planted species were compared. The results of the experiments are provided in FIG. 58. Seed pods comprising only coconut coir pith germinated at a rate that was similar to seeds placed directly into the soil. Depending on the seed type, seed pods comprising only coconut coir pith performed similar to or better than seed pods comprised of both coconut coir pith and bark fines, with or without X-tack and heat process. Lettuce cultivars had a better initial rate of germination in the coconut coir pith seed pods compared to coconut coir pith and bark fines, with or without the X-tack and heat process.

H. Example 9

In-field trials were conducted using the seed pods at five locations worldwide, including Ohio, Oregon, Florida, France, and England. The primary goal of this trial was to determine the viability of various seed types/cultivars of garden vegetables and herbs in the seed pod system. Germination and early growth were the primary parameters evaluated in this trial. The success of the seed pods were based on comparing the seed pod germination rates to the germination rate of directly planting the seeds into native soil.

Materials and Methods

Trials were conducted in 4.0 foot wide garden rows and marked off in 4.0 foot segments, where each segment is the equivalent of one replicate. Each replicate was sub-divided into four 2 foot×2 foot squares—each accommodating one of the four treatments (according to the plot plan in the Addendum). Each species will occupy a total of 16 linear feet of the garden row. For all 18 seed types a total of 288 linear feet of garden row will be needed.

Prior to planting, the garden rows (at Marysville only) were topped with 3.0 inches of Miracle Grow Flower and Vegetable Garden Soil per garden soil directions and tilled to a depth of 6 inches using a tractor-mounted rotor-tiller or similar implement. Seed pods and seed were planted in the center of their 2 foot×2 foot plots. Seed pods were planted according to labeled instructions, such that they were pressed into the soil up to the flange. The direct-seed control treatments were planted directly into the prepared soil. Large-seeded species were planted at 0.75 inches deep and small-seeded species will be at 0.25 inches deep. Table 6 below provides a species list to determine large-seeded and small-seeded species.

TABLE 6

| Small-seeded: | Large Seeded |
|---|---|
| 1. Basil, (Ocimum basilicum 'Genovese Compact') | 1. Bush Bean, *Phaseolus vulgaris* 'Jade' |
| 2. Cilantro, *Conandrum sativum* 'Santo' | 2. Snap Pea, *Pisum sativum* 'Sugar Bon' |
| 3. Thyme, *Thymus* spp. 'German Winter' | 3. Watermelon, *Citrullus lanatus* var. *lanatus* 'Sugar Baby' |
| 4. Dill, *Anethum graveolens* 'Fernleaf' | 4. Cucumber, *Cucumis sativus* 'Tasty Green' |
| 5. Spinach, *Spinacia oleracea* 'Emu' | 5. Summer Squash *Cucurbita pepo* 'Fiesta' |

36

TABLE 6-continued

| Small-seeded: | Large Seeded |
|---|---|
| 6. Leaf Lettuce, *Lactuca sativa* 'Lola Rossa' | 6. Summer Squash *Cucurbita pepo* Yellow zucchini 'Sunbeam' |
| 7.Butterhead Lettuce, *Lactuca sativa* 'Buttercrunch' | 7. Pumpkin, *Cucurbita pepo* 'Spartan' |
| 8. Romaine, *Lactuca sativa* 'WinterDensity' | |
| 9. Sweet Pepper, *Capsica annuum* 'Red Bull' | |
| 10. Cherry Tomato, *Solanum lycopersicum* 'Sweet Million' | |
| 11. Globe Tomato Solanum *lycopersicum* 'Red Pride' | |

After planting and fertilizing, the plots were watered until the area appeared thoroughly wetted—as a homeowner would and applied to all plots as equally as possibly. Water was applied on a daily basis. At 30 days, additional fertilizer was applied to treatments 2 and 4 (see Table 7 below), using a shaker jar to the 1 square foot area of soil surrounding the seedling and lightly raked into the soil. Treatments were monitored for germination beginning at 4 days after planting. The dates of emergence and the number of seeds germinated in each plot were recorded.

TABLE 7

| TREAT-MENT | MG SHAKE 'N FEED FERTILIZER TIMING | LB N/ 1000 SQ.FT. | FERT. RATE PER 1.0 SQ.FT. PLOT | APPLI-CATION TECH-NIQUE |
|---|---|---|---|---|
| 1 Direct Seed - No Fertilizer | N/A | 0.0 | N/A | N/A |
| 2 Seed Pod | N/A | 0.0 | N/A | N/A |

Results

Results were recorded as a percentage of seeds that germinated vs. the number of seeds planted (i.e. if only one of three seeds germinated, that site had 33% germination). The controls (i.e., seeds planted directly into the soil) were seeded at the same depth and spacing as the seed pods. In several instances the seed pod had Percent Germination greater than 100%. This is because: 1) Some small-seeded seeds pods were manufactured with more than the specified number of 3 seeds, or 2) Some species such as cilantro and dill sometimes appear to have 2 seedlings emerging from the same seed. It will also be noticed that germination occasionally decreased over time. Seedlings can die or be eaten and when 'blind' ratings are conducted and this would not be noticed until the data are analyzed. The results from each location are summarized below.

Ohio Results:

TABLE 8

| Crop | Seed Method | 3 DAS | 5 DAS | 6 DAS | 8 DAS | 12 DAS | 14 DAS | 16 DAS | 19 DAS | 21 DAS | Failed Seeding per 8 Sites |
|---|---|---|---|---|---|---|---|---|---|---|---|
| | | | | | | Percent Germination | | | | | |
| Basil | Direct Seed | | 41.8 | 45.9 | 58.4 | 66.8 | 66.8 | 66.8 | | | 1 |
| | Seed Pod | | 91.8 | 91.8 | 91.8 | 91.8 | 91.8 | 91.8 | | | 0 |
| Cilantro | Direct Seed | | | | 33.3 | 70.9 | 79.3 | 83.6 | 87.7 | 83.6 | 0 |
| | Seed Pod | | | | 54.3 | 87.7 | 91.8 | 91.8 | 95.9 | 95.9 | 0 |
| Dill | Direct Seed | | | | 24.9 | 24.9 | 24.9 | 33.3 | 24.9 | 24.9 | 3 |
| | Seed Pod | | | | 41.8 | 50.2 | 70.9 | 70.9 | 58.3 | 58.3 | 0 |
| Spinach | Direct Seed | | 41.6 | 37.4 | 37.3 | 37.3 | 37.3 | 37.3 | | | 1 |
| | Seed Pod | | 91.8 | 91.8* | 91.8* | 91.8* | 91.8* | 91.8* | | | 0 |
| Leaf Lettuce | Direct Seed | | 66.8* | 75.2* | 75.2* | 75.2 | 79.3 | 83.4 | 87.6 | | 0 |
| | Seed Pod | | 4.2 | 4.2 | 8.3 | 41.7 | 95.9 | 95.9 | 95.9 | | 0 |
| Butterhead Lettuce | Direct Seed | | 54.2 | 58.3 | 58.3 | 62.6 | 66.8 | 62.6 | 62.6 | 62.6 | 0 |
| | Seed Pod | | 54.2 | 62.6 | 62.6 | 79.3 | 95.9 | 100.0 | 100.0 | 100.0 | 0 |
| Romaine Lettuce | Direct Seed | | 8.3 | 12.4 | 12.4 | 29.3 | 70.9 | 70.8 | 66.8 | 70.9 | 0 |
| | Seed Pod | | 0.0 | 0.0 | 0.0 | 0.0 | 83.4 | 95.9 | 95.9 | 95.9 | 0 |
| Sweet Pepper | Direct Seed | | | | 0.0 | 54.2 | 62.7 | 62.6 | 70.9 | 70.9 | 0 |
| | Seed Pod | | | | 16.6 | 70.9 | 83.6 | 91.8 | 95.9 | 95.9 | 0 |
| Cherry Tomato | Direct Seed | | 33.3 | 75.2 | 87.7 | 87.7 | 87.7 | 83.4 | | | 0 |
| | Seed Pod | | 8.3 | 33.4 | 71.1 | 75.3 | 75.3 | 83.6 | | | 0 |
| Globe Tomato | Direct Seed | | 16.7 | 50.1 | 79.3 | 83.4 | 83.4 | 83.4 | | | 0 |
| | Seed Pod | | 8.3 | 45.8 | 87.6 | 87.6 | 87.6 | 79.2 | | | 0 |
| Bush Bean | Direct Seed | 0.0 | 81.3 | 87.5 | 87.5 | 75.0 | 75.0 | 43.8 | 43.8 | 43.8 | 4 |
| | Seed Pod | 18.8 | 87.5 | 100.0 | 100.0 | 100.0 | 100.0 | 100.0 | 100.0 | 100.0 | 0 |
| Snap Pea | Direct Seed | | 43.8 | 68.8 | 75.0 | 75.0 | 75.0 | | | | 2 |
| | Seed Pod | | 68.8 | 93.8 | 100.0 | 100.0 | 100.0 | | | | 0 |
| Watermelon | Direct Seed | | 56.3 | 75.0 | 75.0 | 87.5 | 87.5 | 81.3 | | | 1 |
| | Seed Pod | | 81.3 | 87.5 | 87.5 | 93.8 | 93.8 | 93.8 | | | 0 |
| Cucumber | Direct Seed | 56.3 | 87.5 | 87.5 | 87.5 | 87.5 | | | | | 0 |
| | Seed Pod | 75.0 | 100.0 | 100.0 | 100.0 | 100.0 | | | | | 0 |
| Green Zucchini | Direct Seed | 0.0 | 100.0 | 100.0 | 100.0 | 100.0 | 100.0 | | | | 0 |
| | Seed Pod | 31.3 | 93.8 | 93.8 | 93.8 | 93.8 | 93.8 | | | | 0 |
| Yellow Zucchini | Direct Seed | 0.0 | 100.0 | 100.0 | 100.0 | | | | | | 0 |
| | Seed Pod | 12.5 | 87.5 | 100.0 | 100.0 | | | | | | 0 |
| Pumpkin | Direct Seed | 0.0 | 100.0 | 100.0 | 100.0 | | | | | | 0 |
| | Seed Pod | 18.8 | 93.8 | 93.8 | 100.0 | | | | | | 0 |

*Significantly Improved Germination

Oregon Results:

TABLE 9

| Crop | Seed Method | 6 DAS | 8 DAS | 11 DAS | 13 DAS | 15 DAS | 18 DAS | 20 DAS | 22 DAS | Failed Seeding per 8 Sites |
|---|---|---|---|---|---|---|---|---|---|---|
| | | | | | Percent Germination | | | | | |
| Basil | Direct Seed | | 0.0 | 5.0 | 71.7 | 38.3 | 46.7 | 50.0 | 55.0 | 1 |
| | Seed Pod | | 13.3 | 51.7 | 83.3* | 83.3 | 83.3 | 83.3 | 83.3 | 0 |
| Cilantro | Direct Seed | | | 71.7 | 160.0 | 168.3 | 168.3 | 168.3 | 168.3 | 0 |
| | Seed Pod | | | 71.7 | 151.7 | 155.0 | 150.0 | 150.0 | 150.0 | 0 |
| Dill | Direct Seed | | | 55.0 | 85.0 | 96.7 | 96.7 | 96.7 | 96.7 | 0 |
| | Seed Pod | | | 66.7 | 101.7 | 105.0 | 105.0 | 105.0 | 105.0 | 0 |
| Spinach | Direct Seed | 5.0 | 16.7 | 93.3 | 93.3 | 93.3 | 85.0 | 80.0 | 46.7 | 2 |
| | Seed Pod | 50.0 | 83.3* | 88.3 | 88.3 | 85.0 | 75.0 | 75.0 | 75.0 | 0 |
| Leaf Lettuce | Direct Seed | 16.7 | 46.7 | 80.0 | 80.0 | 80.0 | 80.0 | 80.0 | 80.0 | 0 |
| | Seed Pod | 46.7 | 76.7 | 93.3 | 113.3 | 113.3 | 113.3 | 113.3 | 113.3 | 0 |
| Butterhead Lettuce | Direct Seed | 46.7 | 83.3 | 83.3 | 88.3 | 88.3 | 88.3 | 88.3 | 88.3 | 0 |
| | Seed Pod | 38.3 | 58.3 | 76.7 | 96.7 | 100.0 | 100.0 | 100.0 | 100.0 | 0 |
| Romaine Lettuce | Direct Seed | | 13.3 | 68.3 | 71.7 | 76.7 | 76.7 | 76.7 | 76.7 | 0 |
| | Seed Pod | | 0.0 | 96.7 | 100.0 | 100.0 | 100.0 | 100.0 | 100.0 | 0 |
| Sweet Pepper | Direct Seed | | | | | 0.0 | 18.3 | 50.0 | 71.7 | 0 |
| | Seed Pod | | | | | 38.3 | 55.0 | 88.3 | 91.7 | 0 |
| Cherry Tomato | Direct Seed | | | 25.0 | 93.3 | 93.3 | 100.0 | 100.0 | 100.0 | 0 |
| | Seed Pod | | | 96.7* | 113.3 | 113.3 | 113.3 | 113.3 | 113.3 | 0 |
| Globe Tomato | Direct Seed | | | 46.7 | 80.0 | 88.3 | 88.3 | 88.3 | 88.3 | 0 |
| | Seed Pod | | | 38.3 | 60.0 | 63.3 | 63.3 | 63.3 | 63.3 | 0 |
| Bush Bean | Direct Seed | | | 95.0 | 95.0 | 95.0 | 95.0 | 95.0 | 95.0 | 0 |
| | Seed Pod | | | 77.5 | 95.0 | 90.0 | 90.0 | 90.0 | 90.0 | 0 |
| Snap Pea | Direct Seed | 45 | 100.0 | 100.0 | 100.0 | 100.0 | 100.0 | 100.0 | 100.0 | 0 |
| | Seed Pod | 25 | 57.5 | 90.0 | 95.0 | 100.0 | 100.0 | 100.0 | 100.0 | 0 |

TABLE 9-continued

| Crop | Seed Method | 6 DAS | 8 DAS | 11 DAS | 13 DAS | 15 DAS | 18 DAS | 20 DAS | 22 DAS | Failed Seeding per 8 Sites |
|------|-------------|-------|-------|--------|--------|--------|--------|--------|--------|----------------------------|
|      |             |       |       |        | Percent Germination | | | | | |
| Watermelon | Direct Seed |  |  | 7.5 | 50.0 | 90.0 | 102.5 | 107.5 | 107.5 | 0 |
|  | Seed Pod |  | 27.5 | 82.5 | 95.0 | 100.0 | 100.0 | 100.0 | 0 |
| Cucumber | Direct Seed |  | 57.5 | 75.0 | 75.0 | 75.0 | 75.0 | 75.0 | 75.0 | 1 |
|  | Seed Pod |  | 65.0 | 95.0 | 100.0 | 100.0 | 100.0 | 107.5 | 107.5 | 0 |
| Green Zucchini | Direct Seed |  | 25.0 | 100.0 | 100.0 | 100.0 | 100.0 | 100.0 | 100.0 | 0 |
|  | Seed Pod |  | 50.0 | 90.0 | 95.0 | 95.0 | 95.0 | 95.0 | 95.0 | 0 |
| Yellow Zucchini | Direct Seed |  | 0.0 | 100.0 | 100.0 | 100.0 | 100.0 | 100.0 | 100.0 | 0 |
|  | Seed Pod |  | 27.5 | 70.0 | 90.0 | 95.0 | 95.0 | 95.0 | 95.0 | 0 |
| Pumpkin | Direct Seed |  | 32.5 | 100.0 | 100.0 | 100.0 | 100.0 | 100.0 | 100.0 | 0 |
|  | Seed Pod |  | 7.5 | 37.5 | 57.5 | 65.0 | 70.0 | 77.5 | 77.5 | 1 |

*Significantly Improved Germination

Florida Results:

TABLE 10

| Crop | Seed Method | 5 DAS | 7 DAS | 10 DAS | 13 DAS | Failed Seeding per 8 Sites |
|------|-------------|-------|-------|--------|--------|----------------------------|
|      |             | Percent Germination | | | | |
| Basil | Direct Seed | 71.1 | 76.7 | 68.3 | 68.3 | 0 |
|  | Seed Pod | 96.7 | 101.7 | 96.7 | 96.7 | 0 |
| Cilantro | Direct Seed | 0.0 | 0.0 | 26.7 | 30.0 | 3 |
|  | Seed Pod | 0.0 | 0.0 | 21.7 | 16.7 | 6 |
| Dill | Direct Seed | 0.0 | 0.0 | 18.3 | 13.3 | 6 |
|  | Seed Pod | 0.0 | 0.0 | 0.0 | 0.0 | 8 |
| Spinach | Direct Seed | 35.0 | 46.7 | 35.0 | 38.3 | 2 |
|  | Seed Pod | 38.3 | 46.7 | 50.0 | 46.7 | 2 |
| Leaf Lettuce | Direct Seed | 63.3* | 68.3* | 71.7* | 68.3* | 0 |
|  | Seed Pod | 0.0 | 0.0 | 0.0 | 0.0 | 8 |
| Butterhead Lettuce | Direct Seed | 30.0 | 46.7 | 50.0 | 46.7 | 1 |
|  | Seed Pod | 0.0 | 0.0 | 0.0 | 0.0 | 8 |
| Romaine Lettuce | Direct Seed | 0.0 | 8.3 | 0.0 | 0.0 | 8 |
|  | Seed Pod | 0.0 | 0.0 | 0.0 | 0.0 | 8 |
| Sweet Pepper | Direct Seed | 0.0 | 5.0 | 88.3 | 88.3 | 0 |
|  | Seed Pod | 0.0 | 0.0 | 66.7 | 91.7 | 0 |
| Cherry | Direct Seed | 0.0 | 51.7 | 55.0 | 55.0 | 1 |

TABLE 10-continued

| Crop | Seed Method | 5 DAS | 7 DAS | 10 DAS | 13 DAS | Failed Seeding per 8 Sites |
|------|-------------|-------|-------|--------|--------|----------------------------|
|      |             | Percent Germination | | | | |
| Tomato Globe | Seed Pod | 0.0 | 41.7 | 63.3 | 68.3 | 1 |
|  | Direct Seed | 0.0 | 80.0 | 80.0 | 71.7 | 0 |
| Tomato Bush Bean | Seed Pod | 0.0 | 80.0 | 80.0 | 75.0 | 1 |
|  | Direct Seed | 65.0 | 65.0 | 65.0 | 70.0 | 2 |
|  | Seed Pod | 70.0 | 87.5 | 82.5 | 77.5 | 1 |
| Snap Pea | Direct Seed | 45.0 | 100.0 | 100.0 | 95.0 | 0 |
|  | Seed Pod | 25.0 | 77.5 | 82.5 | 82.5 | 0 |
| Watermelon | Direct Seed | 95.0 | 100.0 | 100.0 | 100.0 | 0 |
|  | Seed Pod | 65.0 | 70.0 | 82.5 | 82.5 | 1 |
| Cucumber | Direct Seed | 100.0 | 100.0 | 95.0 | 95.0 | 0 |
|  | Seed Pod | 100.0 | 100.0 | 100.0 | 100.0 | 0 |
| Green Zucchini | Direct Seed | 100.0 | 100.0 | 100.0 | 100.0 | 0 |
|  | Seed Pod | 75.0 | 75.0 | 70.0 | 70.0 | 1 |
| Yellow Zucchini | Direct Seed | 100.0 | 100.0 | 100.0 | 100.0 | 0 |
|  | Seed Pod | 95.0 | 95.0 | 95.0 | 95.0 | 0 |
| Pumpkin | Direct Seed | 100.0 | 100.0 | 100.0 | 100.0 | 0 |
|  | Seed Pod | 87.5 | 95.0 | 100.0 | 100.0 | 0 |

*Significantly Improved Germination

France Results:

TABLE 11

| Crop | Seed Method | 6 DAS | 10 DAS | 13 DAS | 17 DAS | 20 DAS | Failed Seeding per 8 Sites |
|------|-------------|-------|--------|--------|--------|--------|----------------------------|
|      |             | Percent Germination | | | | | |
| Basil | Direct Seed | 26.27 | 30.0 | 33.3 | 38.3 | 38.3 | 2 |
|  | Seed Pod | 63.3 | 63.3 | 66.7 | 66.7 | 66.7 | 0 |
| Cilantro | Direct Seed | 0.0 | 58.3 | 126.7 | 105.0 | 71.7 | 1 |
|  | Seed Pod | 0.0 | 121.7 | 163.3 | 130.0 | 96.7 | 0 |
| Dill | Direct Seed | 0.0 | 16.7 | 46.7 | 46.7 | 41.7 | 2 |
|  | Seed Pod | 0.0 | 80.0 | 121.7 | 105.0 | 93.3 | 0 |
| Spinach | Direct Seed | 26.7 | 30.0 | 18.3 | 18.3 | 21.7 | 4 |
|  | Seed Pod | 96.7 | 100.0 | 96.7* | 100.0* | 100.0* | 0 |
| Leaf Lettuce | Direct Seed | 26.7 | 38.3 | 51.7 | 43.3 | 41.7 | 2 |
|  | Seed Pod | 26.7 | 101.7 | 135.0 | 116.7 | 96.7 | 0 |
| Butterhead Lettuce | Direct Seed | 41.7 | 80.0 | 80.0 | 75.0 | 60.0 | 2 |
|  | Seed Pod | 80.0 | 101.7 | 101.7 | 96.7 | 88.3 | 0 |
| Romaine Lettuce | Direct Seed | 13.3 | 38.3 | 35.0 | 30.0 | 25.0 | 4 |
|  | Seed Pod | 0.0 | 66.7 | 93.3* | 96.7* | 96.7* | 0 |
| Sweet Pepper | Direct Seed | 0.0 | 0.0 | 18.3 | 30.0 | 35.0 | 4 |
|  | Seed Pod | 0.0 | 5.0 | 63.3 | 96.7* | 96.7* | 0 |
| Cherry Tomato | Direct Seed | 46.7 | 68.3 | 71.7 | 75.0 | 80.0 | 0 |
|  | Seed Pod | 43.3 | 66.7 | 76.7 | 80.0 | 75.0 | 0 |
| Globe Tomato | Direct Seed | 5.0 | 30.0 | 30.0 | 30.0 | 21.7 | 4 |
|  | Seed Pod | 21.7 | 66.7 | 76.7 | 76.7 | 76.7 | 0 |

TABLE 11-continued

| Crop | Seed Method | Percent Germination | | | | | Failed Seeding per 8 Sites |
|------|-------------|-------|--------|--------|--------|--------|------|
|      |             | 6 DAS | 10 DAS | 13 DAS | 17 DAS | 20 DAS |      |
| Bush Bean | Direct Seed | 75.0 | 70.0 | 75.0 | 75.0 | 65.0 | 1 |
|  | Seed Pod | 82.5 | 70.0 | 70.0 | 70.0 | 70.0 | 0 |
| Snap Pea | Direct Seed | 25.0 | 65.0 | 77.5 | 82.5 | 77.5 | 1 |
|  | Seed Pod | 70.0 | 87.5 | 87.5 | 87.5 | 95.0 | 0 |
| Watermelon | Direct Seed | 65.0 | 75.0 | 82.5 | 75.0 | 75.0 | 0 |
|  | Seed Pod | 65.0 | 75.0 | 90.0 | 90.0 | 90.0 | 0 |
| Cucumber | Direct Seed | 77.5 | 87.5 | 82.5 | 82.5 | 82.5 | 1 |
|  | Seed Pod | 95.0 | 95.0 | 95.0 | 95.0 | 95.0 | 0 |
| Green Zucchini | Direct Seed | 95.0 | 95.0 | 95.0 | 95.0 | 95.0 | 0 |
|  | Seed Pod | 100.0 | 100.0 | 100.0 | 100.0 | 100.0 | 0 |
| Yellow Zucchini | Direct Seed | 57.5 | 77.5 | 77.5 | 77.5 | 77.5 | 1 |
|  | Seed Pod | 95.0 | 100.0 | 95.0 | 100.0 | 95.0 | 0 |
| Pumpkin | Direct Seed | 70.0 | 87.5 | 87.5 | 87.5 | 87.5 | 0 |
|  | Seed Pod | 77.5 | 77.5 | 95.0 | 95.0 | 100.0 | 0 |

*Significantly Improved Germination

England Results:

TABLE 12

| Crop | Seed Method | Percent Germination | | | | | Failed Seeding per 4 Sites |
|------|-------------|-------|--------|--------|--------|--------|------|
|      |             | 5 DAS | 7 DAS | 10 DAS | 12 DAS | 18 DAS |      |
| Basil | Direct Seed |  |  |  | 0.0 | 0.0 | 4 |
|  | Seed Pod |  |  |  | 83.3* | 93.3* | 0 |
| Cilantro | Direct Seed |  |  | 16.7 | 43.3 | 83.3 | 0 |
|  | Seed Pod |  |  | 50.0 | 93.3 | 93.3 | 0 |
| Dill | Direct Seed |  |  | 0.0 | 0.0 | 0.0 | 4 |
|  | Seed Pod |  |  | 50.0* | 66.7* | 66.7* | 0 |
| Spinach | Direct Seed | 10.0 | 10.0 | 60.0 | 83.3 | 83.3 | 0 |
|  | Seed Pod | 26.7 | 93.3* | 100.0* | 100.0 | 100.0 | 0 |
| Leaf Lettuce | Direct Seed | 0.0 | 60.0 | 50.0 | 66.7 | 33.3 | 0 |
|  | Seed Pod | 16.7 | 50.0 | 43.3 | 100.0 | 100.0* | 0 |
| Butterhead Lettuce | Direct Seed | 10.0 | 10.0 | 16.7 | 26.7 | 26.7 | 2 |
|  | Seed Pod | 16.7 | 76.7 | 76.7 | 83.3 | 76.7* | 1 |
| Romaine Lettuce | Direct Seed | 16.7 | 26.7 | 50.0 | 66.7 | 26.7 | 0 |
|  | Seed Pod | 0.0 | 26.7 | 10.0 | 100.0 | 93.3 | 0 |
| Sweet Pepper | Direct Seed |  |  |  |  | 10.0 | 3 |
|  | Seed Pod |  |  |  |  | 43.3 | 2 |
| Cherry Tomato | Direct Seed |  |  | 0.0 | 26.7 | 66.7 | 0 |
|  | Seed Pod |  |  | 16.7 | 110.0* | 110.0 | 0 |
| Globe Tomato | Direct Seed |  |  | 0.0 | 10.0 | 26.7 | 2 |
|  | Seed Pod |  |  | 10.0 | 43.3 | 16.7 | 1 |
| Bush Bean | Direct Seed |  |  | 100.0 | 100.0 | 100.0 | 0 |
|  | Seed Pod |  |  | 90.0 | 100.0 | 100.0 | 0 |
| Snap Pea | Direct Seed |  |  | 90.0 | 90.0 | 90.0 | 0 |
|  | Seed Pod |  |  | 90.0 | 100.0 | 100.0 | 0 |
| Watermelon | Direct Seed |  |  | 15.0 | 0.0 | 0.0 | 4 |
|  | Seed Pod |  |  | 0.0 | 25.0 | 115.0* | 0 |
| Cucumber | Direct Seed |  |  | 65.0 | 65.0 | 65.0 | 1 |
|  | Seed Pod |  |  | 100.0 | 100.0 | 75.0 | 0 |
| Green Zucchini | Direct Seed |  |  | 50.0 | 50.0 | 65.0 | 1 |
|  | Seed Pod |  |  | 90.0 | 100.0 | 100.0 | 0 |
| Yellow Zucchini | Direct Seed |  |  | 65.0 | 65.0 | 75.0 | 1 |
|  | Seed Pod |  |  | 90.0 | 100.0 | 100.0 | 0 |
| Pumpkin | Direct Seed |  |  | 50.0 | 75.00 | 75.00 | 0 |
|  | Seed Pod |  |  | 50.0 | 90.00 | 100.0 | 0 |

*Significantly Improved Germination

CONCLUSION

The results from the five locations provided great insight despite the variable climatic conditions of seed pods testing. In general, seeds planted in seed pods performed as well or better than directly planting the seed. When temperatures cooled in Ohio, the seeds germinated fine and even tended to surpass directly planted seeds, which indicates a possible effect of temperature on lettuce seed pods. Previous research has shown that no large temperature difference occurs within seed pods when compared to native Ohio soil at various times during the day. No other species really showed this anomaly.

What is claimed is:

1. A system, comprising:
a base plate;
a stand;
an adjustable lighting fixture that overhangs the base plate and is attached to the stand;
a growing container that fits within the base plate; and
a pod tray that fits within the growing container and that accommodates a plant growing system, the plant growing system comprising:
a biodegradable outer shell,
a rooting media,
a fertilizer or nutrient, and
a removable lid;
wherein the plant growing system receives water through wicking water in the base plate that is in direct contact with the plant growing system.

2. The system of claim 1, wherein seeds are planted in the rooting media.

3. The system of claim 2, wherein the seeds receive water through wicking through the rooting media.

4. The system of claim 1, wherein a height of the adjustable lighting fixture is adjustable.

5. The system of claim 1, wherein the base plate is removably attached to the stand.

6. The system of claim 1, further comprising a cover that fits over the growing container.

7. The system of claim 6, wherein the cover is transparent.

8. The system of claim 1, comprising two or more pod trays and two or more growing containers, wherein the pod trays fit within the growing containers.

9. The system of claim 8, wherein each of the pod trays accommodate a plurality of plant growing systems.

10. The system of claim 9, wherein the plurality of plant growing systems comprises six plant growing systems.

11. The system of claim 1, wherein the system comprises three growing containers.

12. The system of claim 1, wherein the adjustable lighting fixture is programmable with respect to an on/off cycle of the adjustable lighting fixture.

13. The system of claim 1, wherein the adjustable lighting fixture comprises two light bulbs.

14. The system of claim 1, wherein the adjustable lighting fixture is removably attached to the stand.

15. The system of claim 1, further comprising a water reservoir that automatically dispenses water to the growing container via the base plate.

16. The system of claim 15, wherein the water reservoir is removably attached to the base plate.

17. The system of claim 1, wherein a bottom surface of the growing container defines one or more holes, wherein the growing container has one or more pedestals, and wherein the holes are defined in a bottom portion of each of the one or more pedestals.

18. The system of claim 17, wherein the base plate has one or more raised projections, and wherein the one or more raised projections mate with the one or more pedestals to secure the growing container.

19. The system of claim 17, wherein the base plate has one or more raised projections, and wherein the one or more raise projections support the bottom surface of the growing container to maintain the growing container at an optimum height for interaction between the plant growing system and the water in the base plate.

* * * * *